United States Patent
Hirabayashi et al.

[11] Patent Number: 5,841,451
[45] Date of Patent: Nov. 24, 1998

[54] SCAN INTERVAL CONTROL IN INK JET RECORDING APPARATUS

[75] Inventors: Hiromitsu Hirabayashi, Yokohama; Shigeyasu Nagoshi; Atsushi Arai, both of Kawasaki; Yuji Akiyama, Yokohama; Hitoshi Sugimoto, Kawasaki; Miyuki Matsubara, Tokyo; Fumihiro Gotoh, Yokohama; Masaya Uetuki, Kawasaki, all of Japan

[73] Assignee: Canon Kabushiki Kaisha, Tokyo, Japan

[21] Appl. No.: 877,312

[22] Filed: Jun. 17, 1997

Related U.S. Application Data

[63] Continuation of Ser. No. 9,320, Jan. 26, 1993, abandoned.

[30] Foreign Application Priority Data

Jan. 28, 1992 [JP] Japan ................................. 4-013046

[51] Int. Cl.⁶ ......................................................... B41J 2/47
[52] U.S. Cl. ................................................................ 347/41
[58] Field of Search ................................ 347/40, 41, 37, 347/9, 43

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,819,556 | 4/1989 | Abe et al. .......................... 101/93.04 |
| 4,889,052 | 12/1989 | Matsumoto et al. ............... 101/93.04 |
| 4,943,813 | 7/1990 | Palmer et al. . |
| 5,142,374 | 8/1992 | Tajika et al. ......................... 358/298 |
| 5,359,355 | 10/1994 | Nagoshi et al. ......................... 347/9 |

FOREIGN PATENT DOCUMENTS

| | | |
|---|---|---|
| 0294156 | 12/1988 | European Pat. Off. . |
| 0300743 | 1/1989 | European Pat. Off. . |
| 0430451 | 6/1991 | European Pat. Off. . |
| 516420 | 12/1992 | European Pat. Off. ......... B41J 2/205 |
| 54-56847 | 5/1979 | Japan . |
| 58-194541 | 11/1983 | Japan . |
| 59-123670 | 7/1984 | Japan . |
| 59-138461 | 8/1984 | Japan . |
| 60-71260 | 4/1985 | Japan . |
| 60-107975 | 6/1985 | Japan . |
| 63-312155 | 12/1988 | Japan . |
| 9101888 | 2/1991 | WIPO . |

OTHER PUBLICATIONS

Off. Search Report for Eur. Pat. Appln. No. 9300493.9.

*Primary Examiner*—Mark J. Reinhart
*Attorney, Agent, or Firm*—Fitzpatrick, Cella, Harper & Scinto

[57] ABSTRACT

When image formation on an image area corresponding to a recording section of a recording head is completed by executing a plurality of number of times of record scans of the recording head using a plurality of complementary thin-out patterns, scan intervals are gradually increased before execution of pre-ejection (Nos. 29 to 33), and scan intervals are gradually decreased after execution of pre-ejection (Nos. 36 to 40), so that a variation in scan intervals of the plurality of times of record scans for a single image area is limited to fall within a predetermined time range.

36 Claims, 43 Drawing Sheets

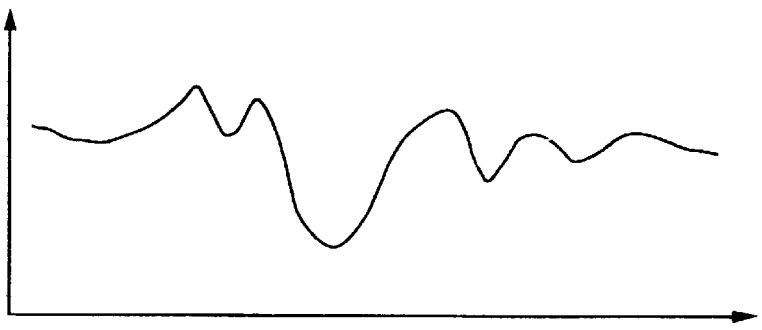
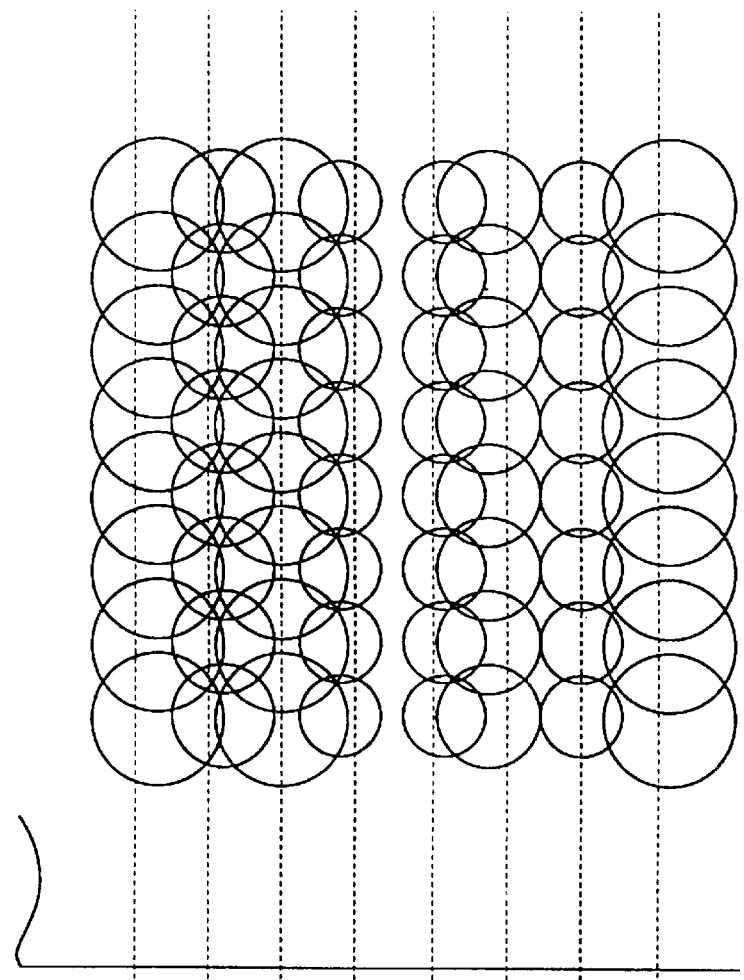
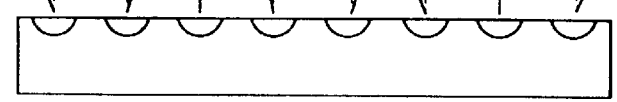

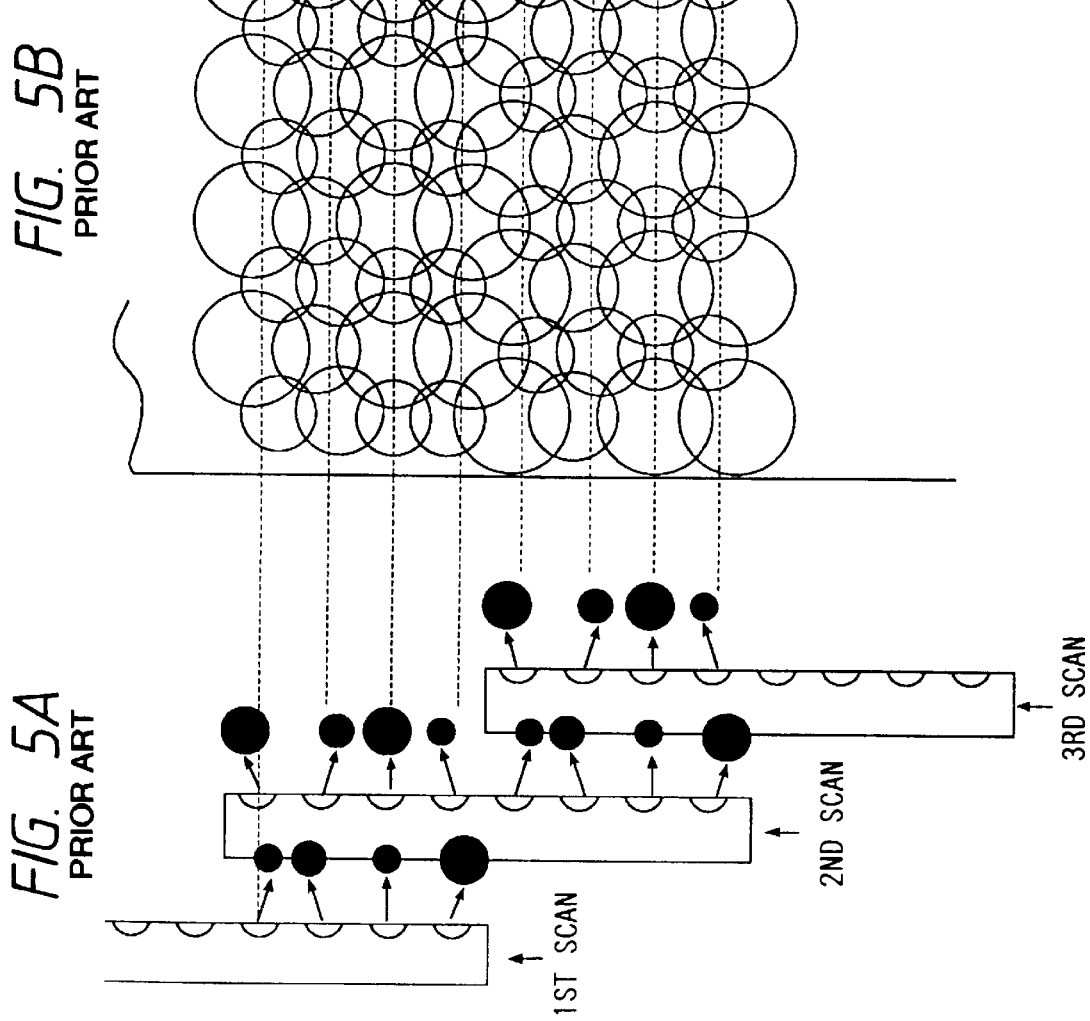

○ CHECKER (hatched)
○ REVERSE CHECKER

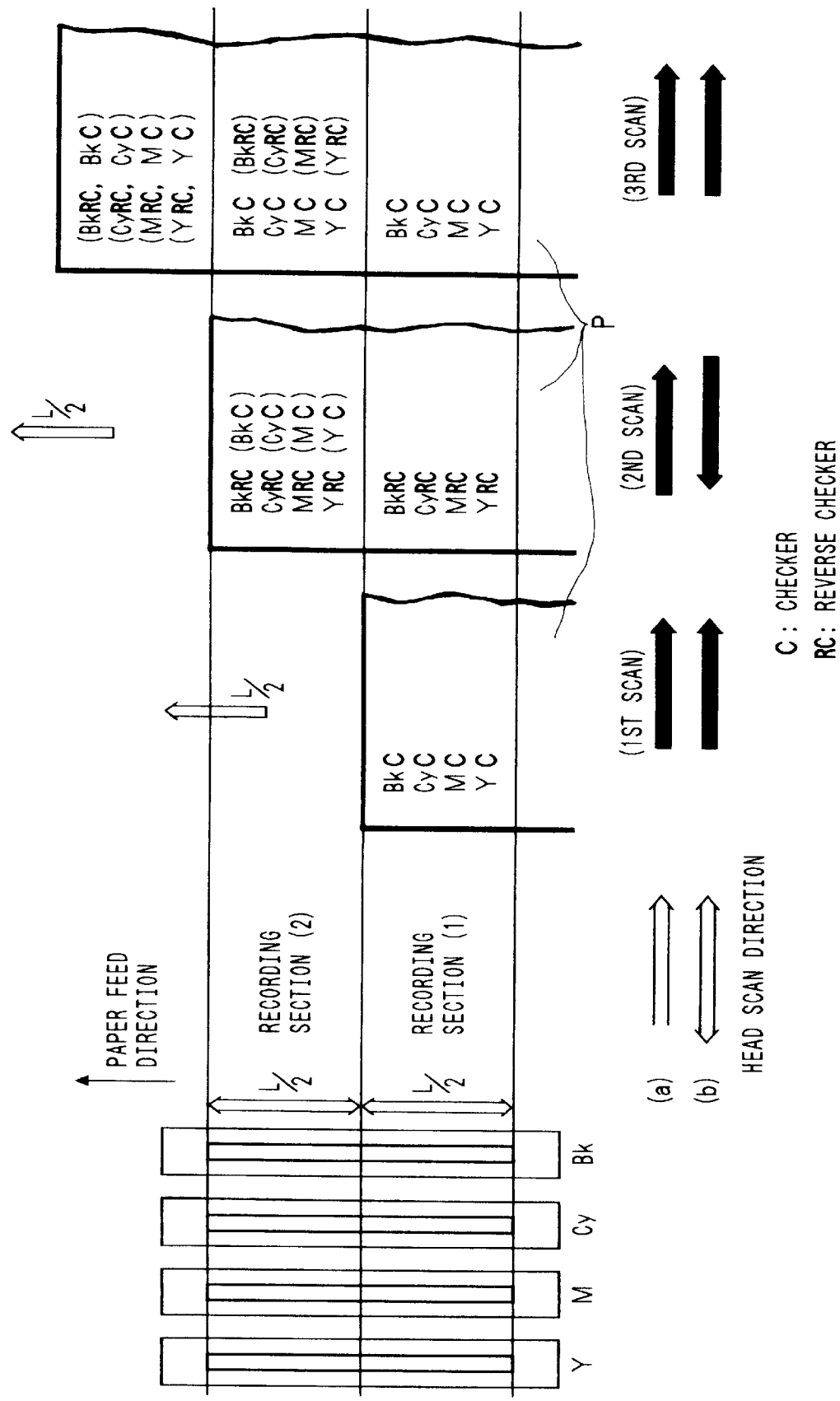

FIG. 14

| CHECKER / REVERSE | 1.2 | 1.3 | 1.4 | 1.5 | 1.6 | 1.7 | 1.8 | 1.9 | 2.0 | 2.1 |
|---|---|---|---|---|---|---|---|---|---|---|
| 1.2 | ○ | ○ | △ | △ | △ | × | × | × | × | × |
| 1.3 | ○ | ○ | ○ | △ | △ | △ | × | × | × | × |
| 1.4 | △ | ○ | ○ | ○ | △ | △ | △ | × | × | × |
| 1.5 | △ | △ | ○ | ○ | ○ | △ | △ | △ | × | × |
| 1.6 | △ | △ | △ | ○ | ○ | ○ | △ | △ | △ | △ |
| 1.7 | × | △ | △ | △ | ○ | ○ | ○ | △ | △ | △ |
| 1.8 | × | × | △ | △ | △ | ○ | ○ | ○ | ○ | △ |
| 1.9 | × | × | × | △ | △ | △ | ○ | ○ | ○ | ○ |
| 2.0 | × | × | × | × | △ | △ | ○ | ○ | ○ | ○ |
| 2.1 | × | × | × | × | △ | △ | △ | ○ | ○ | ○ |

FIG. 20

| JOB NO. | RECORD OPERATION | SCAN INTERVAL (SEC) |
|---|---|---|
| 1 | PAPER FEED | |
| 2 | PRE-EJECTION | |
| 3 | RECORD SCAN 1 | |
| 4 | RECORD SCAN 2 | 1.2 |
| ⋮ | ⋮ | |
| 29 | RECORD SCAN 27 | 1.2 |
| 30 | RECORD SCAN 28 + WAITING FOR 0.1 SEC | 1.3 |
| 31 | RECORD SCAN 29 + WAITING FOR 0.2 SEC | 1.4 |
| 32 | RECORD SCAN 30 + WAITING FOR 0.3 SEC | 1.5 |
| 33 | RECORD SCAN 31 + WAITING FOR 0.4 SEC | 1.6 |
| 34 | RECORD SCAN 32 | |
| 35 | PRE-EJECTION (0.5 SEC) | 1.7 |
| 36 | RECORD SCAN 33 + WAITING FOR 0.4 SEC | 1.6 |
| 37 | RECORD SCAN 34 + WAITING FOR 0.3 SEC | 1.5 |
| 38 | RECORD SCAN 35 + WAITING FOR 0.2 SEC | 1.4 |
| 39 | RECORD SCAN 36 + WAITING FOR 0.1 SEC | 1.3 |
| 40 | RECORD SCAN 37 | 1.2 |
| 41 | RECORD SCAN 38 | 1.2 |
| ⋮ | ⋮ | |

FIG. 22

|     | 1.2 | 1.6 | 2.0 | 2.4 | 2.8 | 3.2 | 3.6 | 4.0 | 4.4 | 4.8 |
|-----|-----|-----|-----|-----|-----|-----|-----|-----|-----|-----|
| 1.2 | ○ | ○ | △ | △ | △ | × | × | × | × | × |
| 1.6 | ○ | ○ | ○ | △ | △ | △ | × | × | × | × |
| 2.0 | △ | ○ | ○ | ○ | △ | △ | △ | × | × | × |
| 2.4 | △ | △ | ○ | ○ | ○ | △ | △ | △ | × | × |
| 2.8 | △ | △ | △ | ○ | ○ | ○ | △ | △ | △ | △ |
| 3.2 | × | △ | △ | △ | ○ | ○ | ○ | △ | △ | △ |
| 3.6 | × | × | △ | △ | △ | ○ | ○ | ○ | ○ | △ |
| 4.0 | × | × | × | △ | △ | △ | ○ | ○ | ○ | ○ |
| 4.4 | × | × | × | × | △ | △ | ○ | ○ | ○ | ○ |
| 4.8 | × | × | × | × | △ | △ | △ | ○ | ○ | ○ |

FIG. 44

|     | 0.7 | 0.8 | 0.9 | 1.0 | 1.1 | 1.2 | 1.3 | 1.4 | 1.5 | 1.6 |
|-----|-----|-----|-----|-----|-----|-----|-----|-----|-----|-----|
| 0.7 | ○ | ○ | △ | △ | × | × | × | × | × | × |
| 0.8 | ○ | ○ | ○ | △ | △ | × | × | × | × | × |
| 0.9 | △ | ○ | ○ | ○ | △ | △ | × | × | × | × |
| 1.0 | △ | △ | ○ | ○ | ○ | △ | △ | × | × | × |
| 1.1 | × | △ | △ | ○ | ○ | ○ | △ | △ | △ | × |
| 1.2 | × | × | △ | △ | ○ | ○ | ○ | △ | △ | △ |
| 1.3 | × | × | × | △ | △ | ○ | ○ | ○ | △ | △ |
| 1.4 | × | × | × | × | △ | △ | ○ | ○ | ○ | ○ |
| 1.5 | × | × | × | × | △ | △ | △ | ○ | ○ | ○ |
| 1.6 | × | × | × | × | × | △ | △ | ○ | ○ | ○ |

FIG. 45

| JOB No. | RECORD OPERATION | SCAN INTERVAL (SEC) |
|---|---|---|
| 1 | PAPER FEED | |
| 2 | PRE-EJECTION | |
| 3 | RECORD SCAN 1 | |
| 4 | RECORD SCAN 2 | 0.7 |
| ⋮ | ⋮ | |
| 29 | RECORD SCAN 27 | 0.7 |
| 30 | RECORD SCAN 28 + WAITING FOR 0.1 SEC | 0.8 |
| 31 | RECORD SCAN 29 + WAITING FOR 0.2 SEC | 0.9 |
| 32 | RECORD SCAN 30 + WAITING FOR 0.3 SEC | 1.0 |
| 33 | RECORD SCAN 31 + WAITING FOR 0.4 SEC | 1.1 |
| 34 | RECORD SCAN 32 | |
| 35 | PRE-EJECTION (0.5 SEC) | 1.2 |
| 36 | RECORD SCAN 33 + WAITING FOR 0.4 SEC | 1.1 |
| 37 | RECORD SCAN 34 + WAITING FOR 0.3 SEC | 1.0 |
| 38 | RECORD SCAN 35 + WAITING FOR 0.2 SEC | 0.9 |
| 39 | RECORD SCAN 36 + WAITING FOR 0.1 SEC | 0.8 |
| 40 | RECORD SCAN 37 | 0.7 |
| 41 | RECORD SCAN 38 | 0.7 |
| ⋮ | ⋮ | |

FIG. 46

|     | 0.7 | 1.1 | 1.5 | 1.9 | 2.3 | 2.7 | 3.1 | 3.5 | 3.9 | 4.3 |
|-----|-----|-----|-----|-----|-----|-----|-----|-----|-----|-----|
| 0.7 | O | O | △ | △ | × | × | × | × | × | × |
| 1.1 | O | O | O | △ | △ | × | × | × | × | × |
| 1.5 | △ | O | O | O | △ | △ | △ | × | × | × |
| 1.9 | △ | △ | O | O | O | △ | △ | △ | × | × |
| 2.3 | × | △ | △ | O | O | O | △ | △ | △ | × |
| 2.7 | × | × | △ | △ | O | O | O | △ | △ | △ |
| 3.1 | × | × | △ | △ | △ | O | O | O | △ | △ |
| 3.5 | × | × | × | △ | △ | △ | O | O | O | O |
| 3.9 | × | × | × | × | △ | △ | △ | O | O | O |
| 4.3 | × | × | × | × | △ | △ | △ | O | O | O |

SCAN INTERVAL CONTROL IN INK JET RECORDING APPARATUS

This application is a continuation of application Ser. No. 08/009,320, filed Jan. 26, 1993, now abandoned

BACKGROUND OF THE INVENTION

1. Field of the Invention

The present invention relates to an ink jet recording apparatus for performing recording by ejecting ink droplets onto a recording medium using a recording head having a plurality of ejection portions.

2. Related Background Art

In recent years, OA equipment such as computers, wordprocessors, copying machines, and the like have been widely spread, and many recording methods of recording apparatuses therefor have been developed. Of these recording apparatuses, an ink jet recording apparatus has excellent features, i.e., allows easy high-definition, high-speed, and low-noise recording at low cost as compared to other recording methods. Meanwhile, needs for color recording have also been increasing, and a large number of color ink jet recording apparatuses have been developed, too. An ink jet recording apparatus forms an image in such a manner that an ink ejected from nozzles is attached to a recording sheet. In order to increase the recording speed, a head obtained by integrating a plurality of ink ejection orifices as ink ejection portions and nozzles is used as a recording head (to be referred to as a multi-head hereinafter) obtained by integrating and arranging a plurality of recording elements, and a plurality of multi-heads are normally used to achieve color recording.

FIG. 1 shows an arrangement of a printer unit when a print operation is performed on a sheet surface using the multi-head. Referring to FIG. 1, each of ink cartridges 701 is constituted by an ink tank filled with a corresponding one of four color inks, i.e., black, cyan, magenta, and yellow inks, and a multi-head 702. FIG. 2 shows the state of multi-nozzles 801 aligned on the multi-head from the z-direction. In FIG. 2, n multi-nozzles are aligned on the multi-head 702. Referring back to FIG. 1, a paper feed roller 703 is rotated together with an auxiliary roller 704 in a direction of an arrow in FIG. 1, while pressing a print sheet P, thereby feeding the print sheet P in the y-direction. A paper supply roller 705 is used for supplying a print sheet, and also serves to press the print sheet P as in the rollers 703 and 704. A carriage 706 supports the four ink cartridges, and moves these cartridges according to a print operation. When the print operation is not performed, or when a recovery operation of the multi-head is performed, the carriage 706 stands by at a home position (h) indicated by a dotted line in FIG. 1.

Upon reception of a print start command, the carriage (706), which is located at the illustrated position (home position) before the print operation is started, performs a print operation by a width L on a sheet surface using n multi-nozzles (801) on the multi-head (702), while being moved in the x-direction. When the carriage completes the data print operation up to the sheet surface end portion, it returns to the home position, and performs the print operation in the x-direction again. During this interval after the first print operation is ended and before the second print operation is started, the paper feed roller (703) is rotated in the direction of the arrow to feed the print sheet by the width L in the y-direction. In this manner, the print operation and the paper feed operation are repeated by the width L of the multi-head for each scan of the carriage, thus achieving the data print operation on one sheet surface.

However, when a monochrome printer prints an image, various factors such as color development characteristics, gradation characteristics, evenness, and the like are required unlike in a printer for printing only characters. In particular, as for the evenness, a small variation in units of nozzles, which may have occurred in a multi-head manufacturing process, influences the ejection amount and ejection direction of the inks from the nozzles, and finally causes density unevenness of a printed image, thus deteriorating image quality.

An example of density unevenness will be described below with reference to FIGS. 3A to 4C. In this example, a monochrome recording head is used for the sake of simplicity. In FIG. 3C, a multi-head 91 is the same as that shown in FIG. 1, and is assumed to be constituted by eight multi-nozzles (92) for the sake of simplicity. Ink droplets 93 are ejected from the multi-nozzles 92. In general, it is ideal that the ink droplets 93 are ejected in uniform ejection quantities in the same direction, as shown in FIG. 3C. If such an ejection is performed, dots having the same size land on a sheet surface, as shown in FIG. 3B, and a uniform image free from density unevenness is obtained (FIG. 3A).

However, in practice, each nozzle suffers from a variation, and when the print operation is performed in the same manner as described above, ink droplets ejected from the nozzles have various sizes and directions, and land on the sheet surface, as shown in FIG. 4C. As shown in FIG. 4B, blank portions which do not satisfy an area factor of 100%, portions where dots unnecessarily overlap each other, and a white stripe pattern (e.g., a pattern at the center of FIG. 4B) periodically appear in the main scan direction of the head. A group of dots which land in such a state have a density distribution shown in FIG. 4A with respect to the aligning direction of the nozzles, and consequently, these phenomena are visually sensed as density unevenness. In addition, a stripe pattern caused by a variation in paper feed amount may sometimes become conspicuous.

As a countermeasure against this density unevenness•connection stripe, Japanese Laid-Open Patent Application No. 60-107975 discloses the following method for a monochrome ink jet recording apparatus. The method will be briefly described below with reference to FIGS. 5A to 6C. According to this method, the multi-head 91 is scanned three times to complete a print area shown in FIGS. 3A to 4C (FIG. 5C). However, an area in units of four pixels, i.e., an area half a print area is completed by two passes. In this case, eight nozzles of the multi-head are divided into two groups, i.e., upper four nozzles and lower four nozzles. Dots printed by a single nozzle in a single scan correspond to a pattern obtained by thinning out predetermined image data to about half according to a predetermined image data arrangement. In the second scan, dots are printed for the remaining half image data, thus achieving the print operation of an area in units of four pixels. The above-mentioned recording method will be referred to as a divisional recording method hereinafter.

Using such a recording method, even when a head equivalent to the multi-head shown in FIG. 4C is used, since the influences of the nozzles on a printed image are halved, a printed image shown in FIG. 5B is obtained, and black and white stripe patterns in FIG. 4B do not become conspicuous. Therefore, density unevenness is greatly reduced, as shown in FIG. 5A, as compared to FIG. 4A.

Upon execution of such recording, in the first and second scans, image data is divided into complementary patterns according to a predetermined arrangement. As the image data arrangement (thin-out pattern), as shown in FIG. 6A, dots are printed at every other position in the vertical and horizontal directions, i.e., a checker pattern is most popularly used. Therefore, in a unit print area (constituted by four pixels in this case), the print operation is achieved by the first scan for printing a checker pattern, and the second scan for printing a reverse checker pattern. FIGS. 6A, 6B, and 6C are views for explaining how to achieve a recording operation of a predetermined area using checker and reverse checker patterns and the multi-head having eight nozzles like in FIGS. 3A to 5C.

In the first scan, a checker pattern is recorded using lower four nozzles (FIG. 6A). In the second scan, a recording sheet is fed by a width corresponding to four pixels (½ the head length), and a reverse checker pattern is recorded (FIG. 6B). In the third scan, the recording sheet is fed by another width corresponding to four pixels (½ the head length) again, and a checker pattern is recorded again (FIG. 6C). In this manner, when the paper feed operation in units of four pixels, and recording operations of the checker and reverse checker patterns are alternately executed, a recording area in units of four pixels is completed in each scan. As described above, since a single print area is completed by two different groups of nozzles, a high-quality image free from density unevenness can be obtained.

As another technical problem of the ink jet recording apparatus, malformation and unexpected coupling of dots which are formed upon landing of ink droplets are known in association with absorption characteristics and evaporation characteristics of the ink on a recording sheet. Furthermore, in a color ink jet recording apparatus for sequentially landing a plurality of different color inks at overlapping or adjacent dot positions, suppression of deterioration of image quality caused by unexpected blurring or mixing of the inks is known. The above-mentioned conventional recording method is also effective for solving these problems since the ink quantity ejected per record scan is set to be small. A so-called multi-pass recording method for thinning out data by simply dividing a single image area into a plurality of record scans without executing special paper feed control unlike in the conventional recording method, and for executing color-sequential recording is also proposed as a countermeasure against the above-mentioned problems.

The conventional method can eliminate density unevenness caused by landing precision (e.g., a variation in nozzle positions) and the ejection quantity, and can also solve image problems caused by malformation of landing dots.

However, since an image is completed by a plurality of number of times of record scans for a single image area, the interval between adjacent record scans may vary according to a time required for recovery processing of a recording head, which processing is performed during such interval between adjacent record scans, or a time required for image processing or transfer of image data to be recorded. As a result, the landing times of adjacent dots on a recording sheet vary in units of divided image areas, and density unevenness caused by different penetration•fixing states of the ink on the recording sheet may occur.

FIGS. 7A to 7D show the landing-fixing state of the ink on a recording sheet. FIGS. 7A to 7D reveal that the degree of fixing of a previously landed ink influences the fixing state of an ink which lands on a recording sheet next. More specifically, when the previously landed ink is sufficiently fixed, it always presents a state similar to a black-painted ink portion. However, when the previously landed ink is not sufficiently fixed, the next landed ink reaches slightly under the previously landed ink, as indicated by a hatched portion in FIG. 7D, resulting in a different fixing state.

Such scan interval density unevenness is further outstanding in color recording. When a solid print operation of an intermediate color formed by printing different color inks at proper overlapping or adjacent dot positions is performed, considerable color shading occurs.

Color development, which is important in color recording, will be described in detail below. When a dot is printed to overlap a previously recorded dot, the dot recorded later tends to penetrate deeper in the direction of depth of the sheet than the previously recorded dot, and tends to blur around the previously recorded dot. The same applies to a case wherein a new dot is printed adjacent to a previously recorded dot. FIGS. 7A to 7D are sectional views illustrating the spread of the ink when a new dot is printed adjacent to a previously recorded dot.

The above-mentioned tendency appears for the following reason. That is, a coloring material such as a dye in the ejected ink is physically and chemically coupled to a recording medium. At this time, since coupling between the recording medium and the coloring material is limited, coupling between the previously ejected ink coloring material and the recording medium has priority as long as there is no large difference in coupling force depending on the types of coloring materials. For this reason, the previously ejected ink coloring material remains in a large quantity in the surface portion of the recording medium, and the ink coloring material printed next is difficult to couple in the surface portion of the recording medium, and penetrates in the direction of depth of the sheet and is fixed. This is because a difference in dot form associated with color development between a new dot which lands on an image area where an adjacent dot has been pre-recorded, and a dot which lands on an image area where no dot is recorded appears as a difference in color tone between image areas since the number of landing dots per scan varies in units of image areas.

As described above, in a conventional L/n paper feed print method, since the number of landing dots per record scan varies when a print operation for a single image area is achieved by a plurality of number of times of record scans, undesirable color shading occurs in a mixed-color recorded portion, resulting in deterioration of a color recorded image. In the conventional L/n paper feed print method, in order to eliminate density unevenness caused by a variation in nozzles, the required number of times of record scans must be almost doubled, resulting in a decrease in recording speed.

In order to increase the recording speed, back-and-forth scan recording may be proposed. In this case, as a problem inherent to color ink jet recording, a technical problem, i.e., a difference in color tone caused by a back-and-forth difference in landing order of inks is posed. More specifically, back-and-forth scan recording has already been put into practical applications in a monochrome ink jet recording apparatus. However, when color recording is performed, since the landing order of color inks is reversed in forward and backward scans, a difference in color tone between image areas occurs like in the above-mentioned case, and this method has not often been put into a practical application. This is because the ink which lands later spreads around and in the direction of depth of the previously landed dot, as described above.

A recording method for reducing a difference in color tone in the back-and-forth recording is disclosed in Japanese Laid-Open Patent Application No. 58-194541. This method is effective for a so-called solid image in which color dots are recorded in a predetermined area at high density. However, in halftone image data, which requires area-gradation recording, since an image itself to be recorded is originally thinned out according to a predetermined gradation pattern so as to achieve gradation expression, the gradation pattern interferes with a thin-out pattern for each back-and-forth record scan, thus causing the above-mentioned color shading. Although two, i.e., back and forth record scans are performed for a predetermined image area, density unevenness caused by a variation in nozzles cannot be removed, and a simple application of this method is difficult to achieve. For this reason, the recording method is not put into a practical application yet.

SUMMARY OF THE INVENTION

The present invention has been made to solve the above-mentioned problems, and has as its object to provide an ink jet recording apparatus, which can prevent generation of scan interval density unevenness, and can satisfactorily perform image recording in a recording method such as a divisional recording method in which a recording operation for a single image area is achieved by a plurality of number of times of record scans.

It is another object of the present invention to provide an ink jet recording apparatus, which can prevent generation of scan interval density unevenness, and can satisfactorily perform image recording in color recording, especially in back-and-forth color recording as well.

It is still another object of the present invention to provide an ink jet recording apparatus, which can prevent generation of scan interval density unevenness, and can satisfactorily perform image recording even when recovery processing is performed during recording.

In order to achieve the above objects, according to the present invention, there is provided an ink jet recording apparatus for performing recording using a recording head having a plurality of ink ejection portions, comprising: image forming means for completing image formation by complementarily performing a plurality of number of times of record scans for an image area, the image area corresponding to each of sections obtained by dividing a recording section of the recording head; and scan interval management means for controlling an interval between adjacent record scans of the recording head, the scan interval management means controlling scan intervals, so that a difference between scan intervals of continuous record scans of the plurality of number of times of record scans for a single image area by the image forming means falls within a predetermined time range.

There is also provided an ink jet recording method for performing recording using a recording head having a plurality of ink ejection portions, comprising the steps of: performing first recording on an image area by scanning the recording head, the image area corresponding to each of sections obtained by dividing a recording section of the recording head; causing the recording head to wait for a predetermined period of time after the first recording step; performing second recording on the image area by scanning the recording head after the waiting step, the recording in the second recording step complementing the recording in the first recording step; and repeating the second recording step and the waiting step to complete an image on the image area, wherein the waiting step includes the step of causing the recording head to wait for the predetermined period of time, so that a difference between scan intervals of the continuous recording steps of the recording steps for the image area falls within a predetermined time range.

Furthermore, there is provided an ink jet recording apparatus comprising: a recording head, having a recording section (L), for ejecting an ink from a plurality of ink ejection portions; image forming means for completing image formation on n image areas divided in correspondence with the recording section (L) of the recording head by executing recording in a plurality of number of times of record scans of the recording head using a plurality of complementary thin-out patterns, and sequentially executing a paper feed operation by an L/n width; and scan interval management means for limiting a variation in scan intervals of the plurality of number of times of record scans for a single image area by the image forming means to fall within a predetermined time range.

BRIEF DESCRIPTION OF THE DRAWINGS

FIGS. 4A to 4C are views showing a print state of an ink jet printer suffering from density unevenness;

FIGS. 5A to 5C are views for explaining elimination of density unevenness by an L/n paper feed print method;

FIG. 8 is a schematic explanatory view of a recording method according to the first embodiment of the present invention;

FIG. 14 is a table showing estimation results of scan interval density unevenness in color recording;

FIG. 20 is a table showing record scan intervals in a pre-ejection mode in the first embodiment;

FIG. 22 is a table showing estimation results of scan interval density unevenness in monochrome recording in the first embodiment;

FIG. 44 is a table showing estimation results of scan interval density unevenness in color recording;

FIG. 45 is a table showing record scan intervals in a pre-ejection mode in the fourth embodiment; and FIG. 46 is a table showing estimation results of scan interval density unevenness in monochrome recording of the fourth embodiment.

DESCRIPTION OF THE PREFERRED EMBODIMENTS

Figure 1:
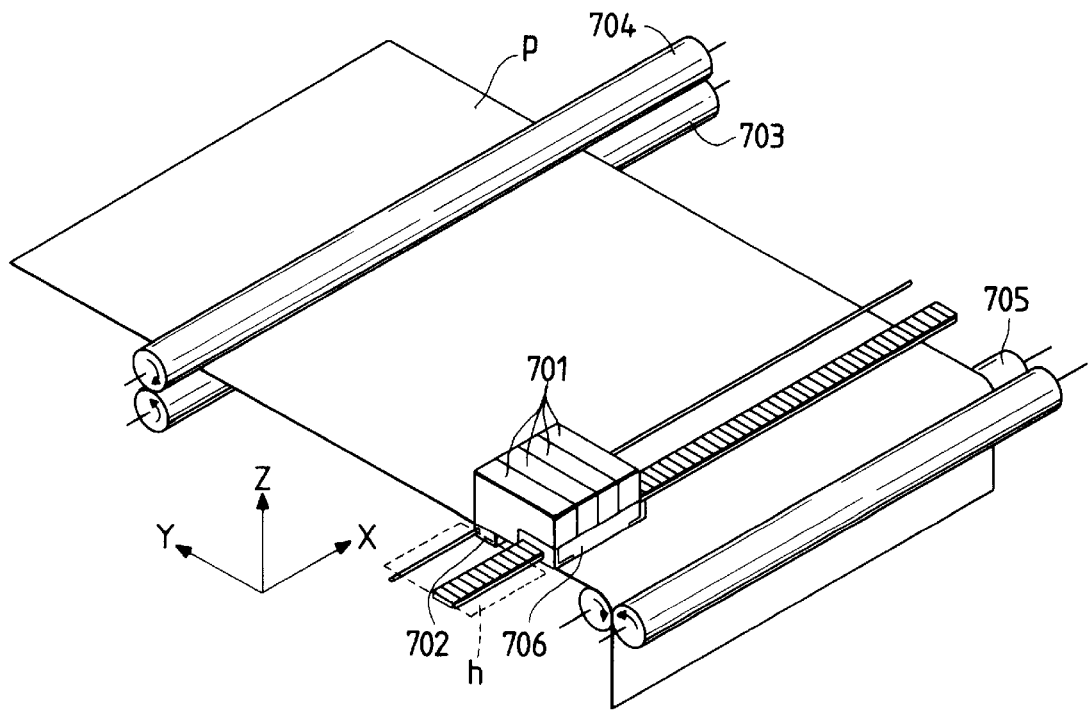
FIG. 1 is a schematic perspective view for explaining an ink jet recording apparatus to which the present invention can be applied.
Figure 2:
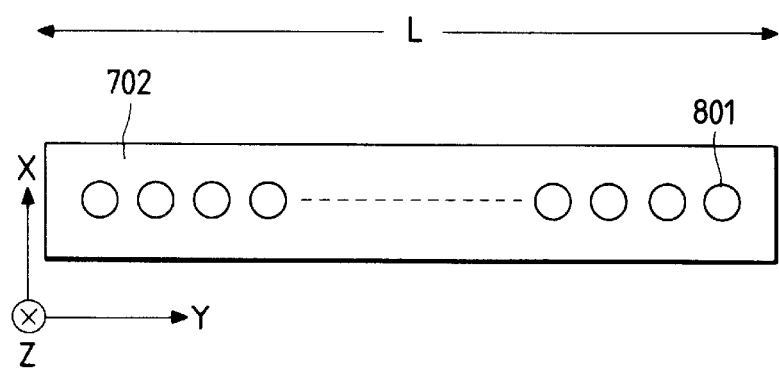
FIG. 2 is a partial explanatory view of a recording head to which the present invention can be applied.
Figure 3A:
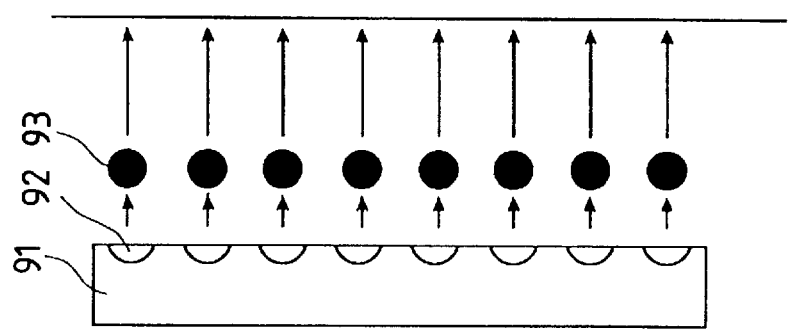
FIGS. 3A to 3C are views showing an ideal print state of an ink jet printer.
Figure 3B:
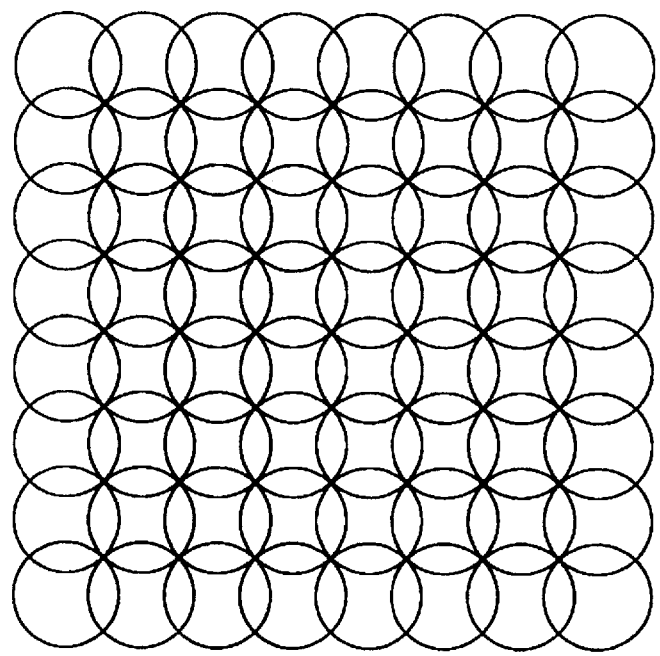
Figure 3C:
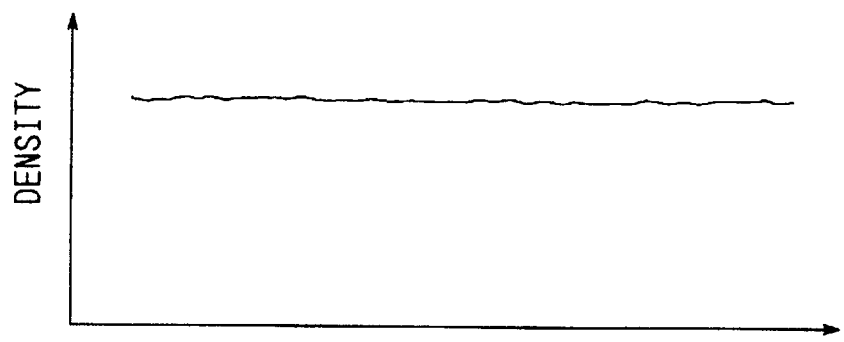
Figure 6A:
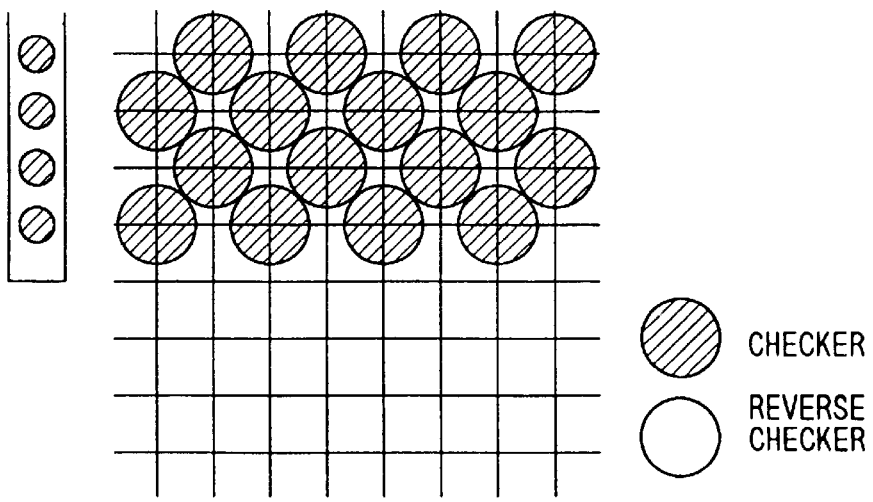
FIGS. 6A to 6C are views for explaining elimination of density unevenness by the L/n paper feed print method.
Figure 6B:
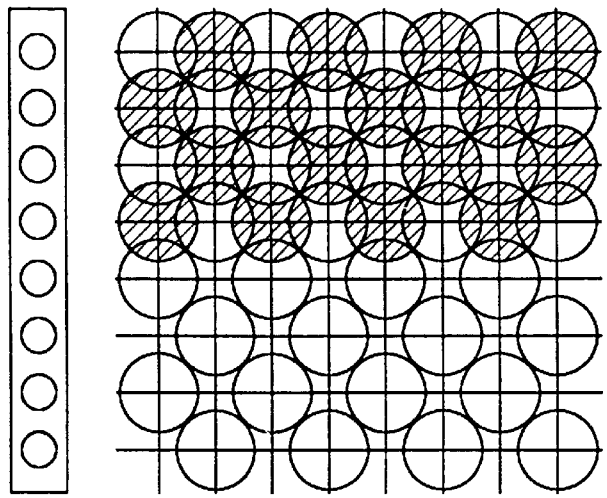
Figure 6C:
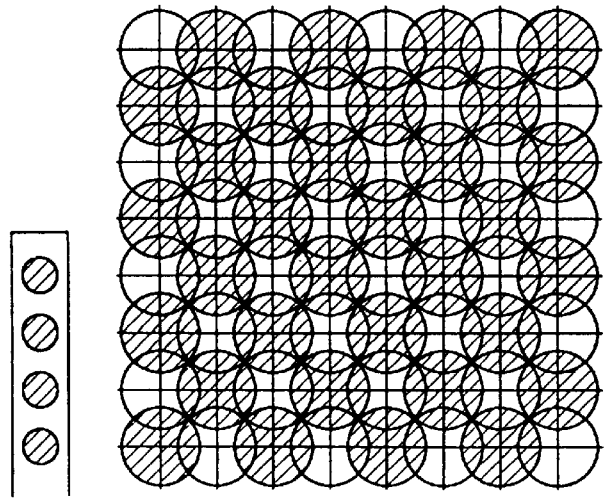
Figure 7A:
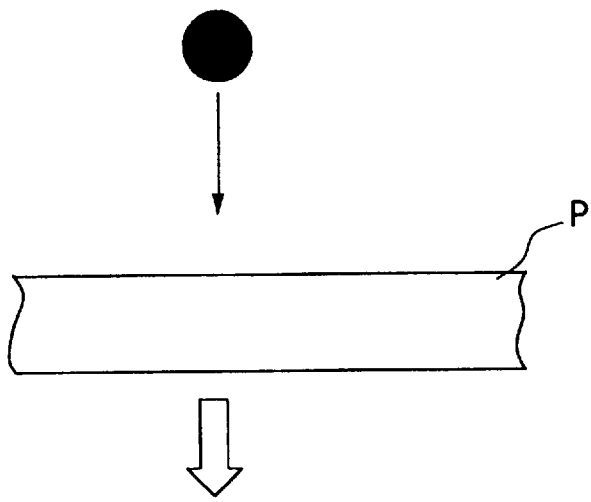
FIGS. 7A to 7D are sectional views of a recording medium for explaining an overlapping state of dots.
Figure 7B:
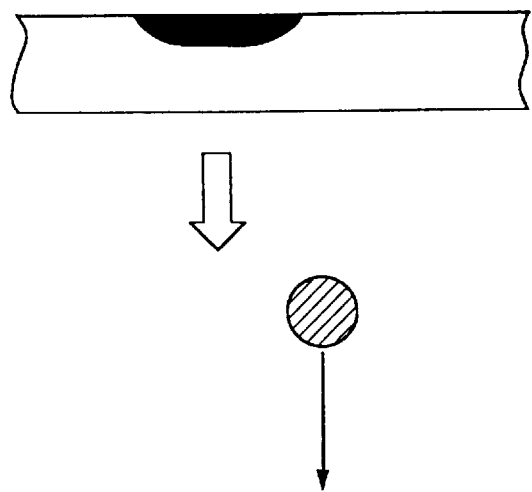
Figure 7C:
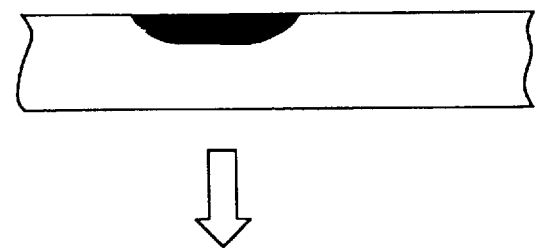
Figure 7D:

The preferred embodiment of the present invention will be described in detail hereinafter with reference to the accompanying drawings. In this embodiment, a black ink (to be abbreviated as Bk hereinafter), a cyan ink (to be abbreviated as Cy hereinafter), a magenta ink (to be abbreviated as M hereinafter), and a yellow ink (to be abbreviated as Y hereinafter) are used like in four ink jet cartridges mounted on the carriage 706 shown in FIG. 1 above, and the inks are overlaid in this order. An intermediate color can be realized by properly overlapping Cy, M, and Y ink dots. In general, black can be realized by overlapping three colors, i.e., Cy, M, and Y. However, at this time, black formed in this manner has poor color development, and a chromatic edge is formed since it is difficult to overlap the three ink dots with high precision. In addition, the ink ejection density per unit time becomes too high. For these reasons, only black is separately printed (the black ink is used).

FIG. 8 shows the outline of the recording method of this embodiment. In this embodiment, color recording is performed. Since scans are performed, as indicated by a head scan direction (a) of FIG. 8, the ink print order of in each record scan is Bk→Cy→M→Y.

Figure 9:
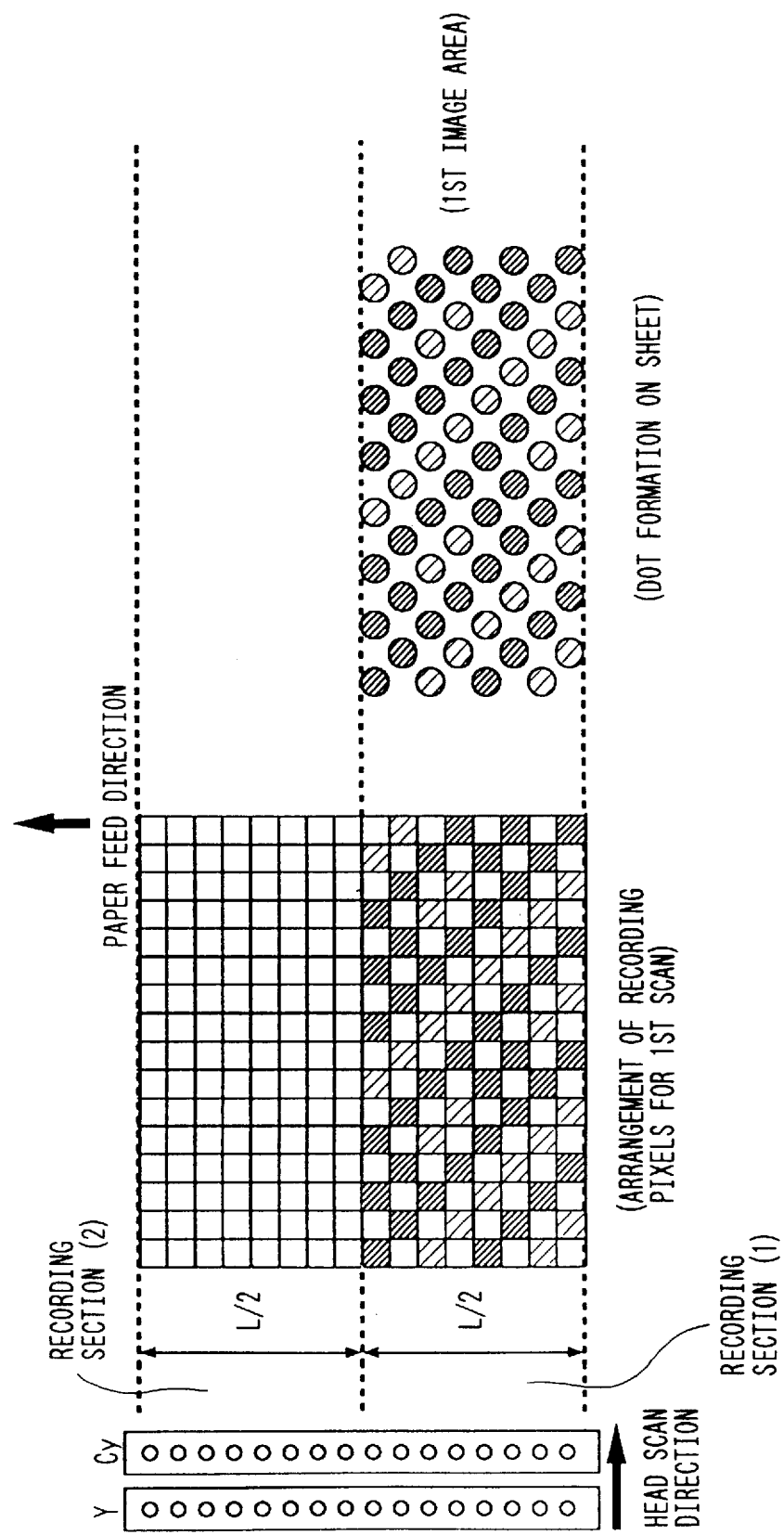
FIGS. 9 to 11 are views showing dot formation states in the first to third scans in the first embodiment.
Figure 10:
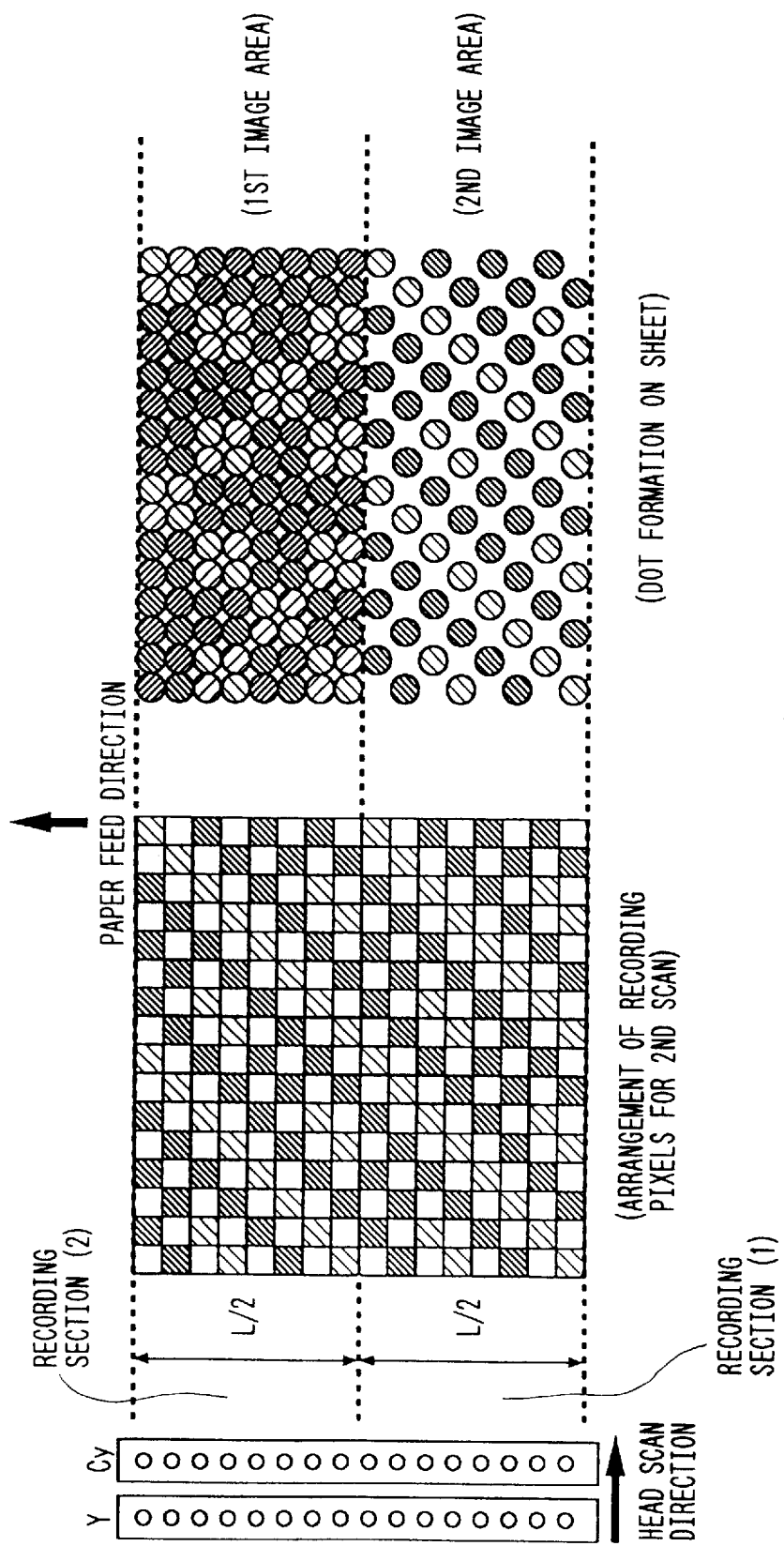

On the first image area, dots are printed in a pattern obtained by thinning out original image data in a checker pattern using lower half nozzles in recording sections (1) of recording heads in the first scan (FIG. 9). Then, a recording sheet is fed by an L/2 width. In the second scan, the recording heads print dots in a pattern obtained by thinning out the image data in a reverse checker pattern which complements the checker pattern in the first scan, using upper half nozzles in the recording section (1) and lower half nozzles in the recording section (2). At this time, on the first image area, dots are printed on recording pixels, which are not printed in the first scan, according to image data thinned out to the reverse checker pattern, thus completing image data recording. The dots recorded on the first image area are printed on recording pixels in the checker pattern, and are then printed on recording pixels in the reverse checker pattern, which complements the checker pattern (FIG. 10).

Figure 11:
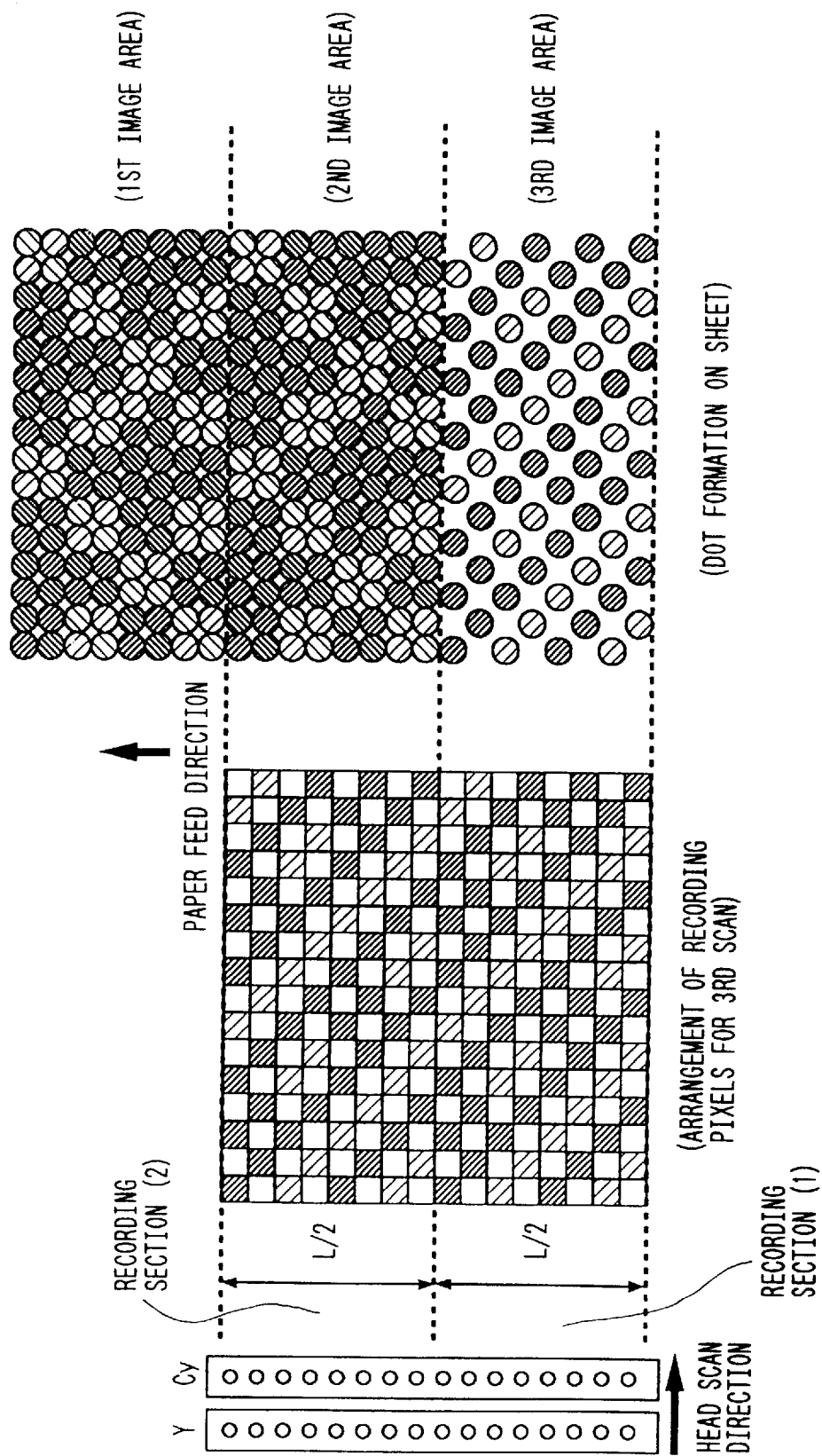

The recording sheet is then fed by another L/2 width. Thereafter, in the third scan, image data is thinned out to a checker pattern like in the first scan, and dots are printed on a second image area using the upper half nozzles and on a third image area using the lower half nozzles. The recording operation on the second image area is completed in the third scan. The dots printed on the second image area are printed on recording pixels in the reverse checker pattern, and are then printed in the landing order on recording pixels in the checker pattern, which complements the reverse checker pattern (FIG. 11). When the same operations are repeated, image areas divided in correspondence with the ½ width (L/2 width) of the recording heads are sequentially subjected to recording, and the recording operation of all the image data is completed. In FIG. 8, data in the parentheses indicate previously printed portions.

Figure 12:
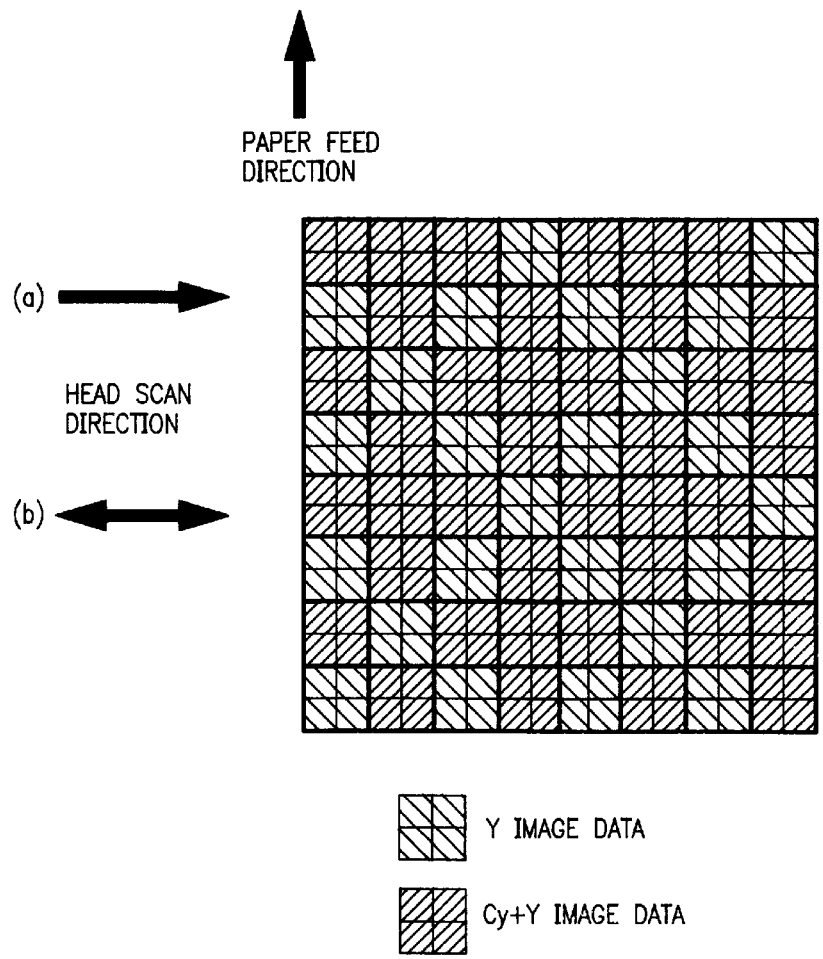
FIG. 12 is a view showing an example of image data.

In this embodiment, in order to uniform the number of landing dots in each record scan, as shown in FIG. 12 (head scan direction (a)), an ink jet recording head having a recording density twice that of image data is used, and one pixel of image data is recorded while being divided into four recording pixels subjected to the same recording operation. Using the recording head having the recording density twice that of image data like in this embodiment, when image data is complemented using simple checker and reverse checker thin-out patterns shown in FIG. 13 (head scan direction (a)) in thin-out recording using the recording head, the number of landing dots in each record scan in each image area can be uniformed regardless of image data to be recorded. For this reason, no density difference•color tone difference between image areas caused by a difference in the number of landing dots will occur.

In this embodiment, density unevenness caused by landing precision (e.g., a variation in nozzle positions) or the ejection quantity can be eliminated, and an image problem caused by malformation of landing dots can also be solved.

However, since an image is completed by a plurality of number of times of record scans for a single image area, the interval between adjacent record scans may vary according to a time required for recovery processing of a recording head, which processing is performed during the interval between adjacent record scans, or a time required for image processing or transfer of image data to be recorded. As a result, the landing times of adjacent dots on a recording sheet vary in units of divided image areas, and density unevenness caused by different penetration•fixing states of the ink on the recording sheet may occur. Such scan interval density unevenness is further outstanding in color recording of this embodiment. When a solid print operation of an intermediate color formed by printing different color inks at proper overlapping or adjacent dot positions is performed, considerable color shading occurs.

In this embodiment, the recording section (L) of the recording head is divided into n sections, and the recording operation is achieved by a plurality of number of times of record scans of the recording head for each of image areas obtained by dividing the entire image area in units of L/n widths, while a recording sheet is sequentially fed by the L/n width. In addition, a scan interval management means for limiting variations of scan intervals of the plurality of number of times of record scans for a single image area to fall within a predetermined time range is arranged to suppress scan interval density unevenness. More specifically, as the scan interval management means, an image memory for the entire image area to be subjected to divisional recording is provided, and the record scan timing including a paper feed time and a recovery processing time of the recording head is set in advance.

(First Embodiment)

The scan interval management of this embodiment will be described in detail below. FIG. 14 shows visual discrimination results of a density difference•color tone difference when adjacent image areas are subjected to recording in various combinations of scan interval time differences, i.e., time differences between scan times for checker and reverse checker print operations on the image areas upon color recording, and so it provides an estimation of color scan interval density unevenness. In this table, ○ represents a case wherein no density difference•color tone difference is observed at all, Δ represents a case wherein no problem is posed in actual use although a slight density difference•color tone difference is notified if a printed image is observed carefully, and χ represents a case wherein a density difference•color tone difference is obvious, and a printed image is unfit for actual use. In FIG. 14, when scan intervals for the checker and reverse checker print operations are equal to each other, no problem about the density difference•color tone difference is posed. However, as another problem, when the absolute value of the scan interval becomes large, a stripe pattern having a relatively high density may often be observed at a connection part between adjacent scans. For this reason, it is preferable that the scan interval is not increased too much. However, as the absolute value of the scan interval becomes larger, an allowable range of the density difference•color tone difference with respect to a scan interval difference tends to widen, and a long scan interval is advantageous in this respect.

The control arrangement of this embodiment will be described below with reference to FIG. 15. A color ink jet recording apparatus 501 of this embodiment comprises an image data memory 503 for storing image data for one A4-size page, which data is supplied from a host apparatus 502. A CPU 504 can check all image data before recording is started. When the above-mentioned print mode for sequentially completing an image by the plurality of number of times of scans is designated, the CPU 504 determines in advance an ejection condition of a recording head 505 on the basis of image data, and sets an optimal timing of recovery processing (e.g., pre-ejection and wiping) of a recovery system 506 according to the ejection condition. Thereafter, the CPU 504 sets in advance record scan timings as well as recovery processing timings and paper feed timings with reference to FIG. 14 so as not to cause scan interval density unevenness, and then starts recording. The record scan timings are managed by controlling the driving start timings of a head driver 508 by a scan interval manager unit 507, and image data for one scan is supplied from a print data register 509 to the head driver 508.

In this embodiment, the paper feed time is fixed, and the time required for each record scan is also fixed since all the areas are subjected to recording at the same recording speed. In addition, image data is stored in advance in the image data memory 503 after it is subjected to image processing to have a format suitable for recording. Therefore, the scan interval mainly varies according to the recovery processing timing. Of course, as a modification of this embodiment, when a variable paper feed speed can be set or a variable scan area can be set according to image data, or when the record scan timings are set on the basis of image data transferred from a host apparatus in consideration of an image processing time in addition to the recovery processing time, and the image processing can be sequentially performed while executing recording, the record scan timings may be set in consideration of the times requires for these operations.

In this embodiment, the record scan timings are set after the recovery processing timings are set. In this embodiment, as recovery processing during a print operation, pre-ejection, which is performed as needed between adjacent record scans according to the number of recording dots and the recording time, and requires 0.5 sec, and wiping, which is performed as needed between adjacent record scans according to the number of recording dots, and requires 2.5 sec, are normally performed. A timing required for wiping is longer than that required for pre-ejection, and pre-ejection for preventing color mixing by wiping is performed after the wiping. For this reason, in the record scan timing setting flow shown in FIG. 16, the wiping timing is set first.

In this embodiment, when at least one of four color recording heads (360 DPI, 64 nozzles) has ejected five million dots or more, the wiping is simultaneously performed for all the four color recording heads before the next record scan. More specifically, every time dots in a single color are formed on pixels half those for one A4-size page, wiping is executed. Therefore, no wiping may be performed within one page depending on image data, and conversely wiping may be performed a maximum of twice within one page. In this embodiment, in processing for converting image data transferred from the host apparatus 502 in step S11 into data suitable for recording in step S12, the numbers of dots in units of recording heads 505 are counted by an electrical hardware circuit, and wiping timings are set (step S13).

When non-recording pixels continue for forty thousand dots or more in units of nozzles of at least one of the recording heads 505, pre-ejection from all the nozzles of all the four color recording heads is performed onto a pre-ejection pad in units of 16 dots. More specifically, if a color recording head, which has no recording dots corresponding to an area about ⅕ one A4-size page is found, it is set to execute pre-ejection (step S14). When a monochrome mode is set as the recording mode, or when some recording heads record no dot within one page, these recording heads may be excluded from the setting operation of the pre-ejection timings. Since the number of dots in pre-ejection including the pre-ejection (in units of 100 dots for each nozzle) after wiping is considerably smaller than the number of dots for setting the wiping timing, the wiping timing is not re-corrected according to the number of times of pre-ejections in this embodiment. However, the wiping timing may be corrected in consideration of parameters including the wiping timing.

The setting operation of the record scan timings in step S15 will be described below. In this embodiment, the unit record scan time including the paper feed time and excluding the recovery processing time is constant, i.e., 1.2 sec. Therefore, when the pre-ejection (required time=0.5 sec) is performed after a given scan, the record scan time requires 1.7 sec (1.2+0.5); when the wiping is performed, it requires 3.7 sec (1.2+2.5). Therefore, as shown in FIG. 14, scan interval density unevenness occurs in this state, and image quality is considerably deteriorated.

In this embodiment, the record scan timings are set so as not to deteriorate image quality before recording is started. In this embodiment, different record scan timing correction methods are selected with reference to the degree of image deterioration in FIG. 14 in correspondence with the pre-ejection mode and the wiping mode, respectively.

In the wiping mode, since the time difference from the normal scan time becomes large, the density difference•color tone difference becomes conspicuous. For this reason, an image in an image area associated with the wiping timing is formed before wiping, and after the end of wiping, recording on the next image area is started. The following description will be made with reference to FIGS. 17 to 19 as in the above description of the recording method. The head scan direction is indicated by (a) in FIGS. 17 to 19.

Figure 17:
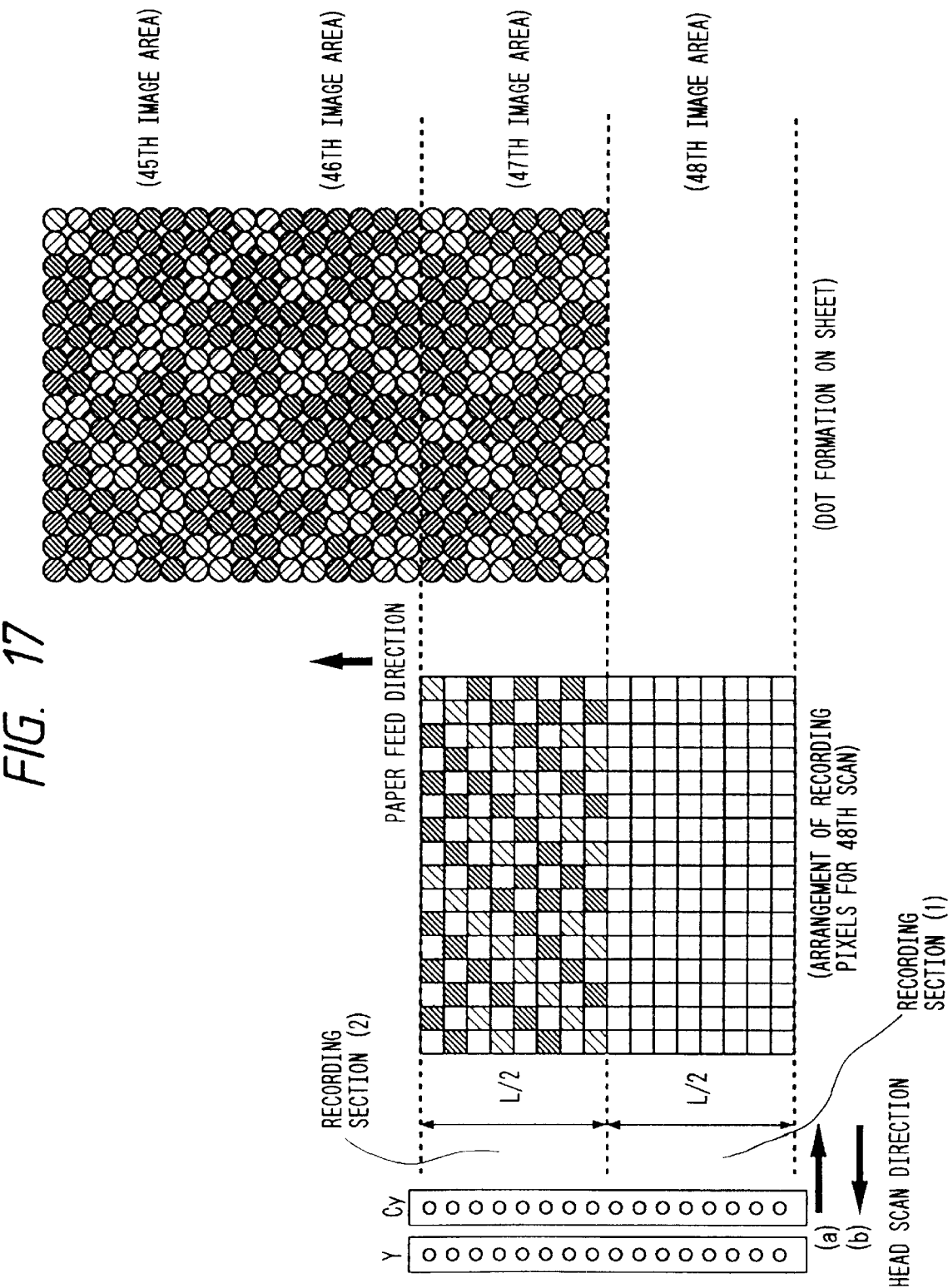
FIGS. 17 and 18 are explanatory views of record scans in a wiping mode in the first and fourth embodiments.
Figure 18:
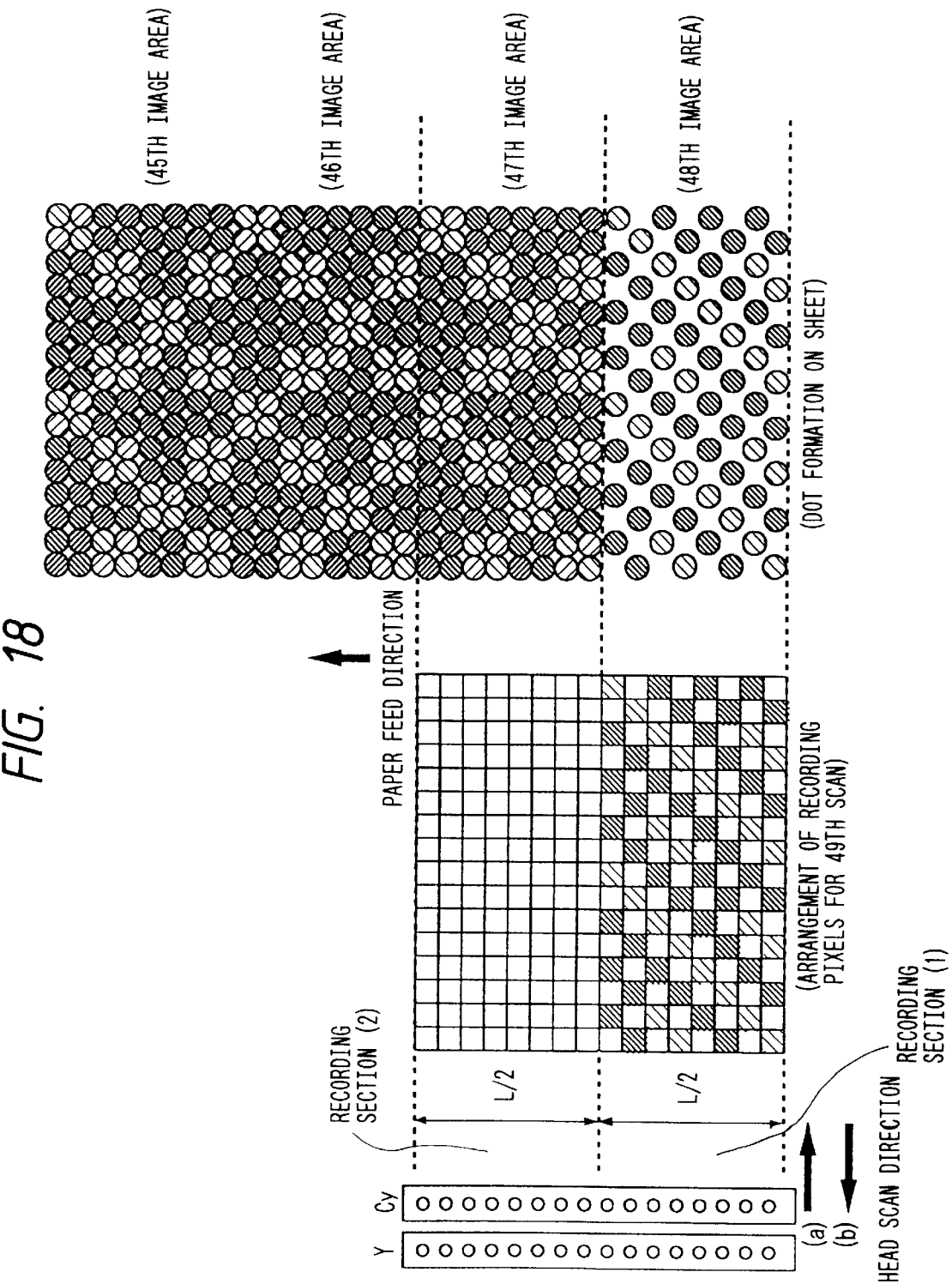
Figure 19:
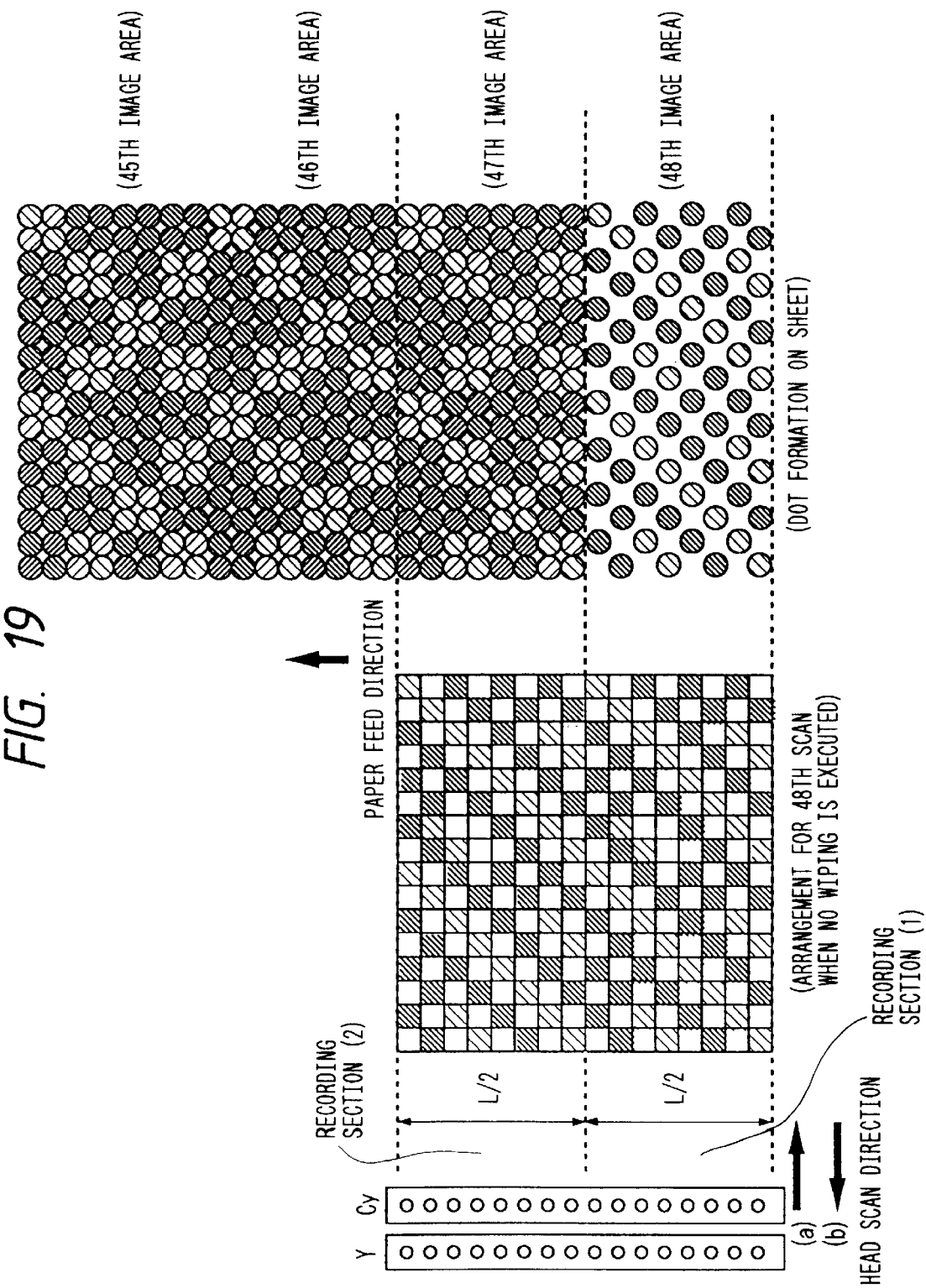
FIG. 19 is an explanatory view of record scans in a normal mode in the first and fourth embodiments.

For example, when wiping is planned upon completion of the 48th scan for performing image formation on the 47th and 48th image areas, no recording is performed on the 48th image area in the 48th scan, and an image in the 47th image area is completed using the upper half nozzles in the recording section (2), as shown in FIG. 17. Upon completion of the 48th scan, wiping is executed, and recording is performed on the 48th image area by the recording section (1) using the lower half nozzles in the 49th scan, as shown in FIG. 18. During this interval, no paper feed operation (L/2 width) is performed, and upon completion of the 49th scan, a paper feed operation (L/2 width) is performed. Thereafter, in the 50th scan, an image in the 48th image area is completed, and new recording is performed on the 49th image area. Therefore, in this embodiment, the number of times of record scans is increased by one when the wiping is executed. Note that FIG. 19 shows a recording state in the 48th scan when no wiping is executed.

Since the scan interval upon execution of pre-ejection has a relatively small time difference from the normal scan interval, the density difference•color tone difference is not conspicuous. In addition, the frequency of pre-ejection is higher than that of wiping. For these reasons, in order to eliminate the density difference-color tone difference without increasing the number of times of scans, the scan intervals are gradually increased toward a record scan corresponding to the execution timing of pre-ejection according to the table shown in FIG. 14, and the scan intervals after execution of pre-ejection are gradually decreased. For example, as shown in FIG. 20, when pre-ejection is prearranged after completion of the 32nd scan, a wait time of 0.1 sec is sequentially added to the basic scan time (1.2 sec) from the 28th scan, so that a total wait time of 0.4 sec is added to set the scan time of 1.6 sec in the 31st scan. Contrary to this, the wait time is gradually subtracted from the scan time by 0.1 sec from the 33rd scan, so as to restore the normal scan interval (1.2 sec) from the 37th scan. As described above, since the record scan intervals before and after the scan interval (1.7 sec) upon execution of pre-ejection are caused to gradually approach the target scan interval, any difference between adjacent image areas where the density difference•color tone difference is particularly conspicuous can be decreased. Therefore, an image free from such a problem can be formed.

In order to set a constant scan interval, each record scan may be performed to have the longest scan interval, i.e., the scan interval (1.7 sec) upon execution of pre-ejection, so that scan interval density unevenness can be prevented. However, since the recording time is increased with this method, the method of this embodiment is more advantageous.

Note that Japanese Laid-Open Patent Application No. 63-312155 discloses a technique for providing a predetermined time difference to scan intervals so as to prevent dots from being mixed. However, this patent application gives no suggestion about density unevenness caused by variations of scan intervals.

In this embodiment, as described above, different timing correction methods are adopted in correspondence with the wiping mode and the pre-ejection mode, respectively. However, in an ink jet recording apparatus in which the degree of scan interval density unevenness or the time required for recovery processing varies according to ink characteristics or absorption characteristics of a recording sheet, either one of the methods may be adopted. Furthermore, one of these methods may be selected according to the recording sheet or the print mode. In the above-mentioned case, when no wiping is executed, and only pre-ejection is executed, constant scan intervals equal to or slightly shorter than the scan interval upon execution of pre-ejection may be set so as not to cause a conspicuous density difference•color tone difference.

As described above, in this embodiment, color image recording can be satisfactorily realized without causing scan interval density unevenness, which tends to occur upon printing of a solid image in mixed color, in such a manner that different color inks are printed at proper overlapping and adjacent positions, while utilizing the feature of the L/n paper feed print method, which can eliminate density unevenness caused by landing precision (e.g., a variation in nozzle positions) and the ejection quantity. Therefore, image quality can be improved.

In this embodiment, the print operation is performed based on image data thinned out to a simple checker pattern such as checker and reverse checker patterns. However, the thin-out pattern is not limited to the checker pattern since image data need only be thinned out to obtain almost uniform numbers of dots in units of record scans in the present invention. More specifically, the recording sections (1) and (2) need only have a complementary relationship therebetween, and the numbers of dots upon execution of divisional recording of image data need only be almost equal to each other.

Figure 21:
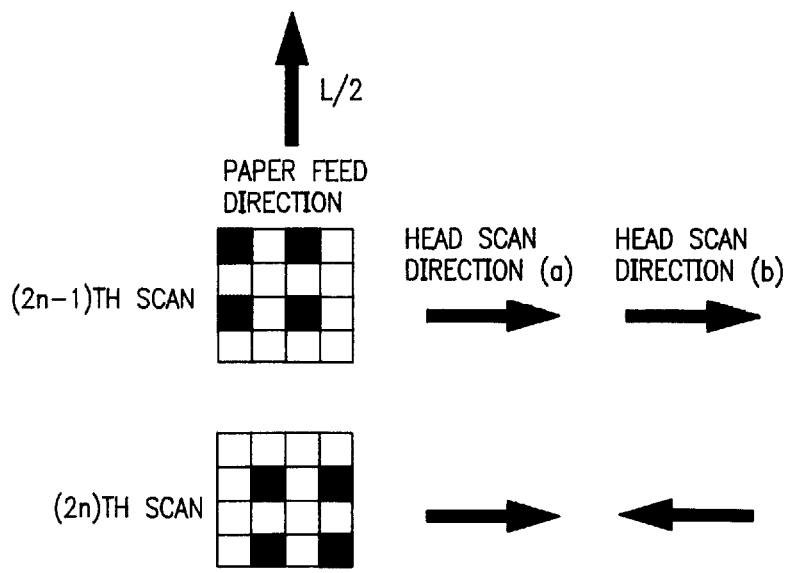
FIG. 21 is an explanatory view of another thin-out method of the first embodiment.

In this embodiment, the thin-out ratio in each recording section of each recording head is set to be 50%, and an image to be recorded is completed by two scans. When the ink ejection quantity is to be increased to increase the print density, the thin-out print ratio in each section may be set to be 75% to achieve a ratio of 150% by two scans although the thinned-out image data in this case do not become faithful to original image data. Contrary to this, when the ink ejection quantity is decreased to eliminate blurring at a boundary of inks, the thin-out print ratio may be set to be, e.g., 40%, so that the ejection quantity may be suppressed to 80% by two scans. For example, the ink ejection quantity is decreased by thinning out recording pixels without adversely affecting image data, as shown in FIG. 21, and the numbers of dots in units of record scans can be uniformed.

In this embodiment, since the recording head having the recording density twice that of image data is used, the number of recording dots in each scan is the same. In contrast to this, thin-out multi-pass recording may be performed while the thin-out method is set, so that the number of recording dots in each scan are the same after pixel density conversion for decreasing the pixel density of image data to ½ or less in at least one direction is executed. In this case, the pixel density conversion and generation of thinned-out image data may be performed by the ink jet recording apparatus main body, or may be performed by a host apparatus such as a personal computer for transmitting image data in correspondence with the ink jet recording apparatus.

Furthermore, this embodiment exemplifies the divisional recording method with the L/2 paper feed operation. However, the present invention can also be applied to a multi-pass recording method wherein a single image area is subjected to a plurality of number of times of scans without executing the paper feed operation. In this case, scan interval density unevenness between adjacent image areas can be eliminated.

FIG. 22 shows visual discrimination results of a density difference when adjacent image areas are subjected to recording in various combinations of scan interval time differences, i.e., time differences between checker and reverse checker print operations on the image areas upon monochrome recording. In FIG. 22, the discrimination results are expressed by the same estimation criterions as those in FIG. 14, namely an estimation of monochrome scan interval density unevenness. In the case of monochrome recording, the allowable range of the scan interval difference associated with the density difference is relatively wider than that in the color recording. Therefore, the record scan timing correction in the above embodiment can be relatively simplified. For example, correction upon execution of the pre-ejection may be omitted. More specifically, different scan interval management methods may be selected in correspondence with the color recording mode and the monochrome recording mode, respectively.

In this embodiment, the ink jet recording apparatus having the image memory for one A4-size page has been exemplified. When the capacity of the image memory is smaller than one A4-size page, the record scan intervals may be set for each recording image area according to the capacity of the image memory, and thereafter, the print operation may be sequentially executed. In this case, the recovery timings are set by accumulating information associated with recovery processing, and the same record scan as that in the wiping mode is executed at the final line of the recording image area according to the capacity of the image memory, thereby eliminating scan interval density unevenness caused by the data transfer wait time or the image processing time.

Thus, this embodiment pertains to an ink jet recording apparatus which includes a scan interval management device for managing a scan interval. The scan interval is managed so that the difference between a relatively long scan interval and a relatively short scan interval relating to continuous record scans of a plural number of times of record scans for an image area by an image forming means falls within a predetermined time range. This is done by varying an interval between continuous record scans, so that the scan interval comprises a record scan time and the interval between continuous record scans, and during the interval a process other than a recording process, such as recovery or wiping, can be performed.

(Second Embodiment)

FIG. 23 and FIGS. 24 to 29 show a recording method according to the second embodiment of the present invention.

In this method, a recording section (L) of each recording head is divided into four sections. Each recording head records recording pixels thinned out to 25% in the first scan, and thereafter, a recording sheet is fed by an L/4 width. In the second scan, each recording head prints another 25% recording pixels using different nozzles, and the recording sheet is fed by another L/4 width. In the third scan, each recording head prints still another 25% recording pixels, and the recording sheet is fed by another L/4 width. In the fourth scan, each recording head prints the remaining 25% recording pixels, thus completing the print operation.

Figure 23:
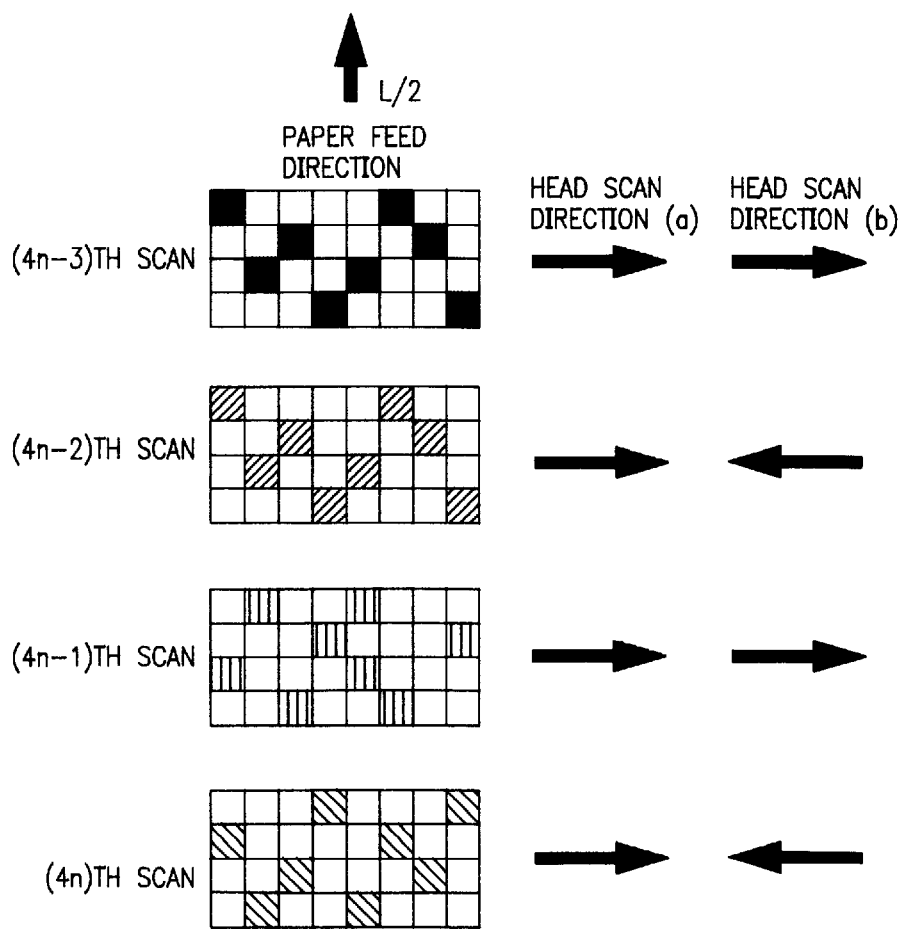
FIG. 23 is an explanatory view of a thin-out method of the second embodiment.
Figure 24:
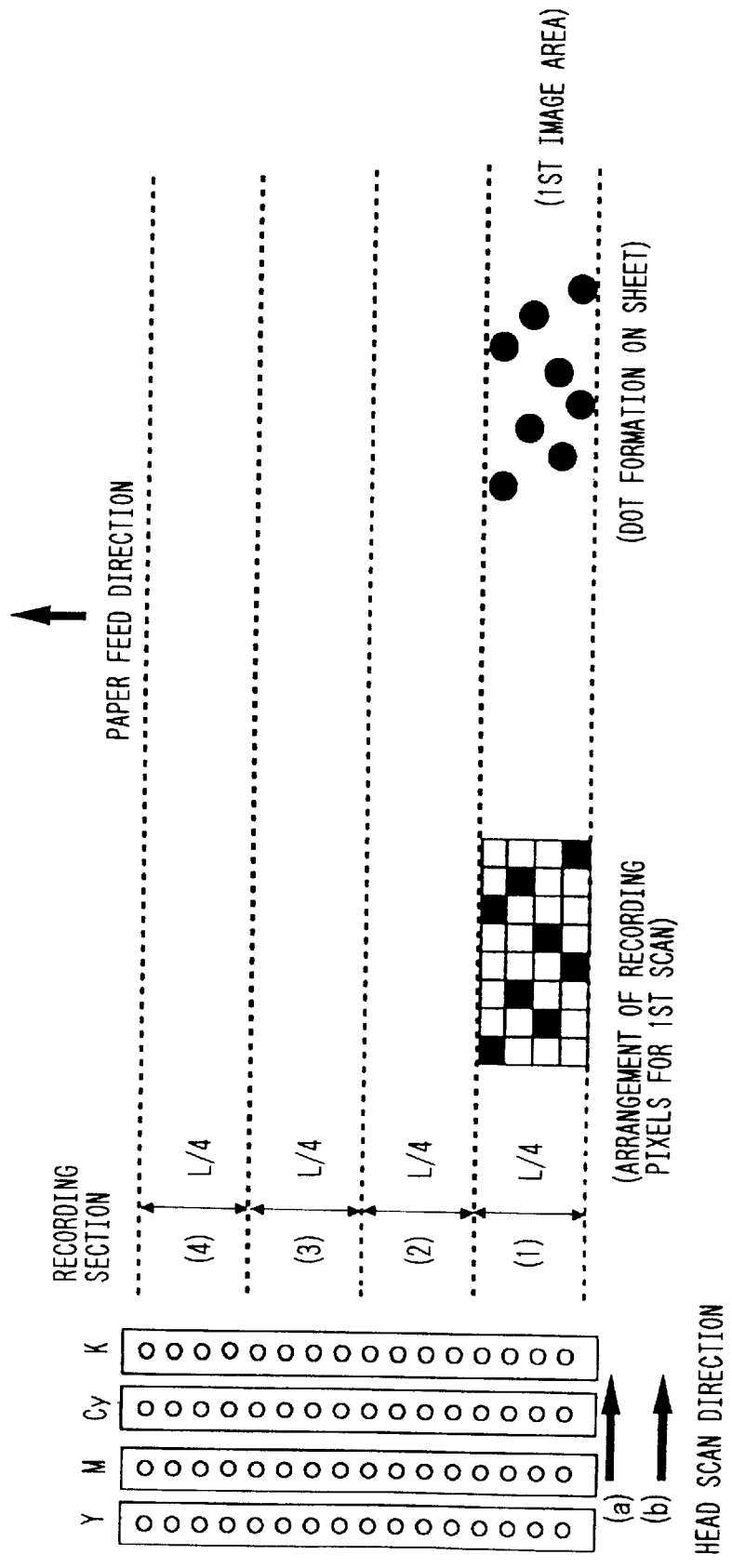
FIGS. 24 to 29 are schematic explanatory views of recording methods according to the second and fifth embodiments of the present invention.

FIG. 23 shows an example of a 25% thin-out method in this embodiment, and illustrates 4×8 recording pixel thin-out patterns in units of scans. In FIGS. 24 to 29, ejection orifice arrays are viewed from the above for the sake of simplicity although they cannot be seen in the illustrated direction in practice. Image data and recording heads are the same as those in the first embodiment. In FIGS. 23 to 29, the head scan direction of this embodiment is indicated by (a).

Figure 25:
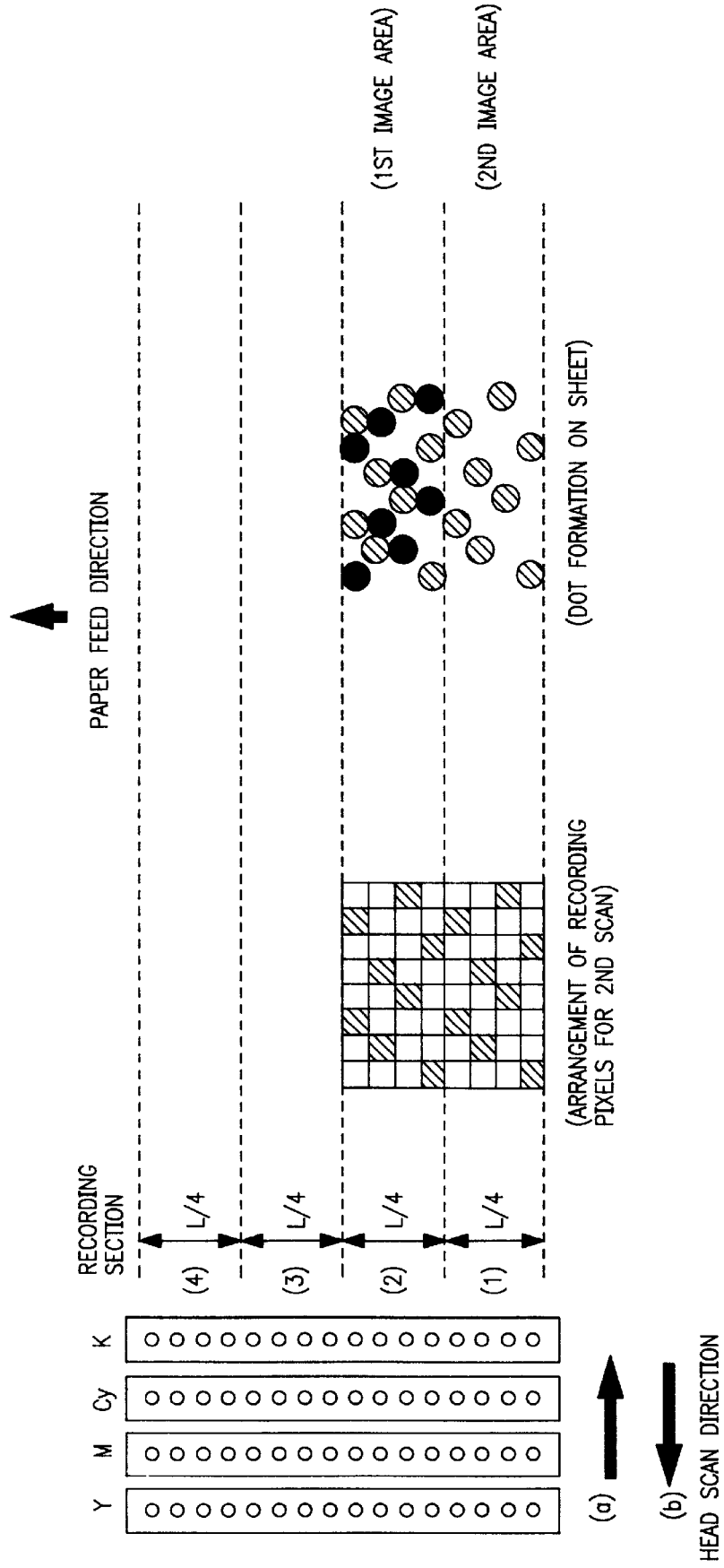

A further detailed explanation will be given with reference to FIGS. 24 to 29. In the first scan, dots thinned out to 25% are printed on the first image area using nozzles in a recording section (1) of each recording head. At this time, in the 25% thin-out method, pixels corresponding to the positions in the (4n−3)th scan shown in FIG. 23 are printed, and dots are formed on a sheet surface in an arrangement of recording pixels shown in FIG. 24. Then, a recording sheet is fed by an L/4 width, and the first image area subjected to recording by the recording section (1) is shifted to a recording section (2). In the second scan, dots are printed on the second and first image areas according to a thin-out pattern of the (4n−2)th scan shown in FIG. 23 using nozzles in the recording sections (1) and (2), respectively. FIG. 25 shows the recording state in the second scan. Then, the recording sheet is fed by another L/4 width, so that the first image area is shifted to a recording section (3), and the second image area is shifted to the recording section (2).

Figure 26:
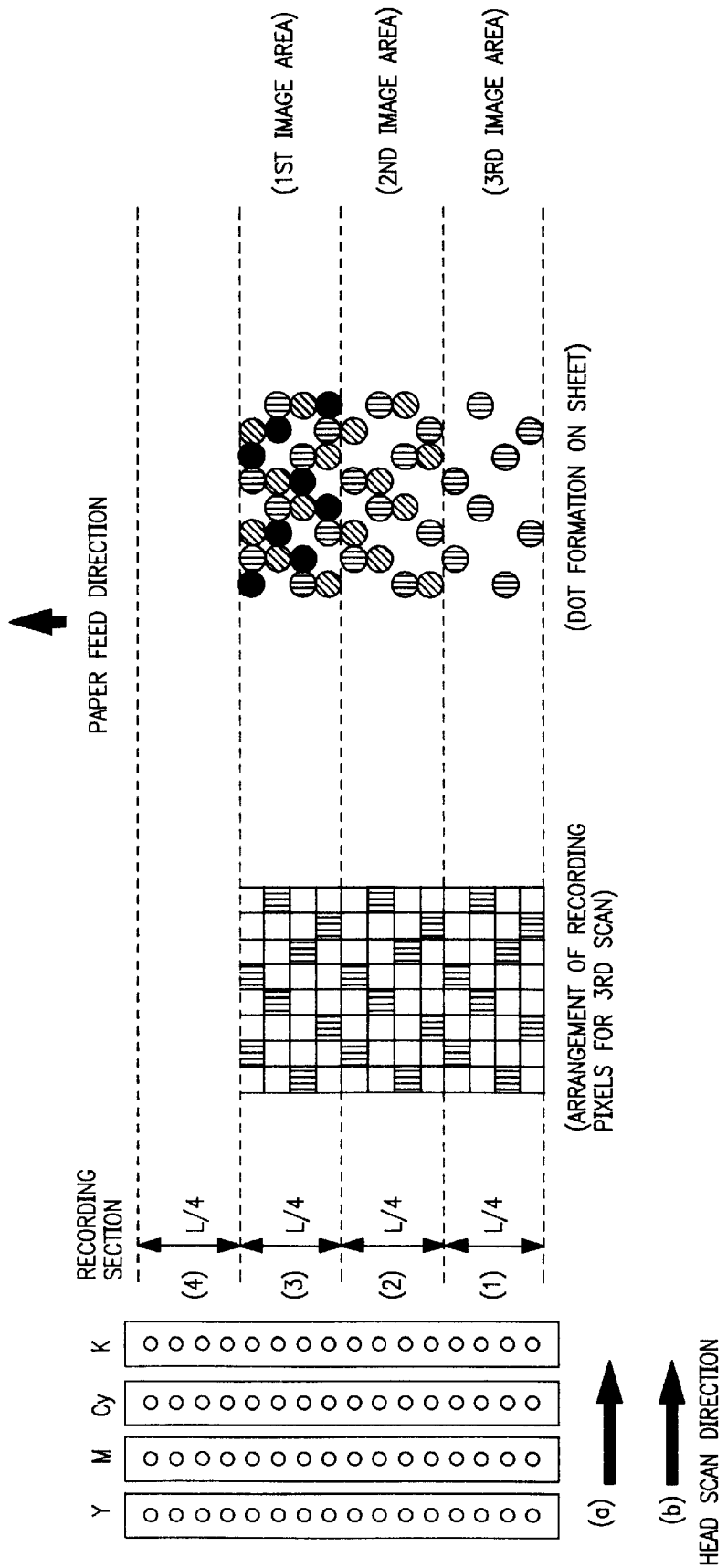
Figure 27:
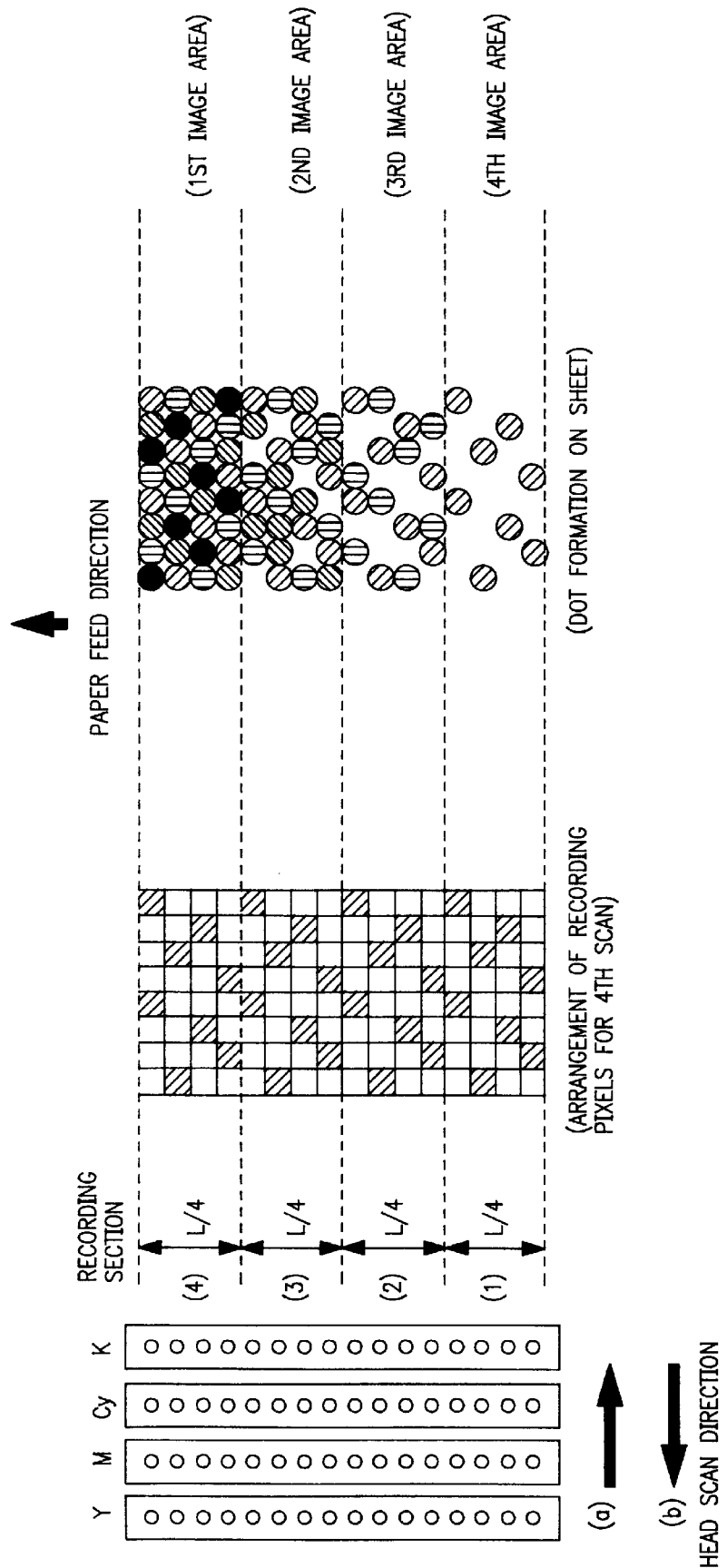
Figure 28:
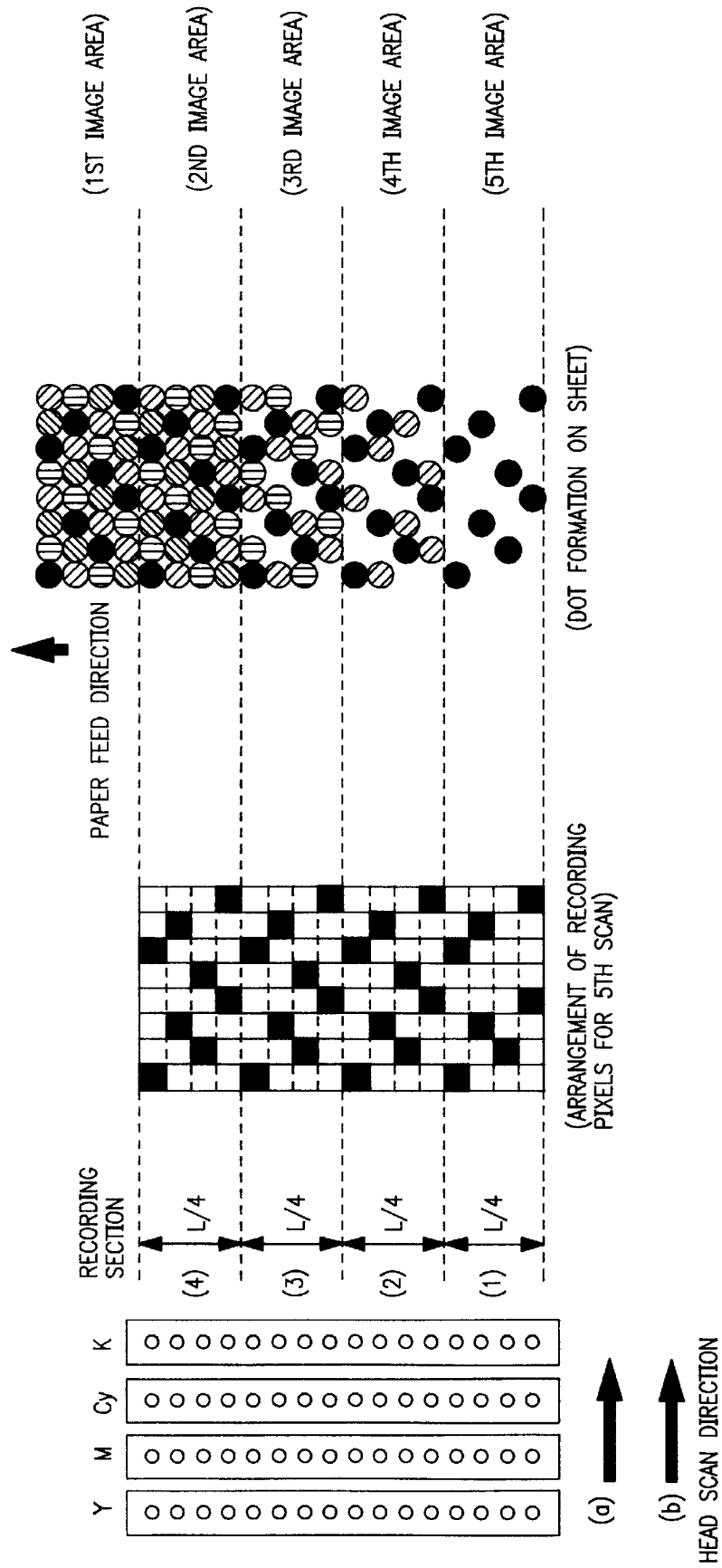
Figure 29:
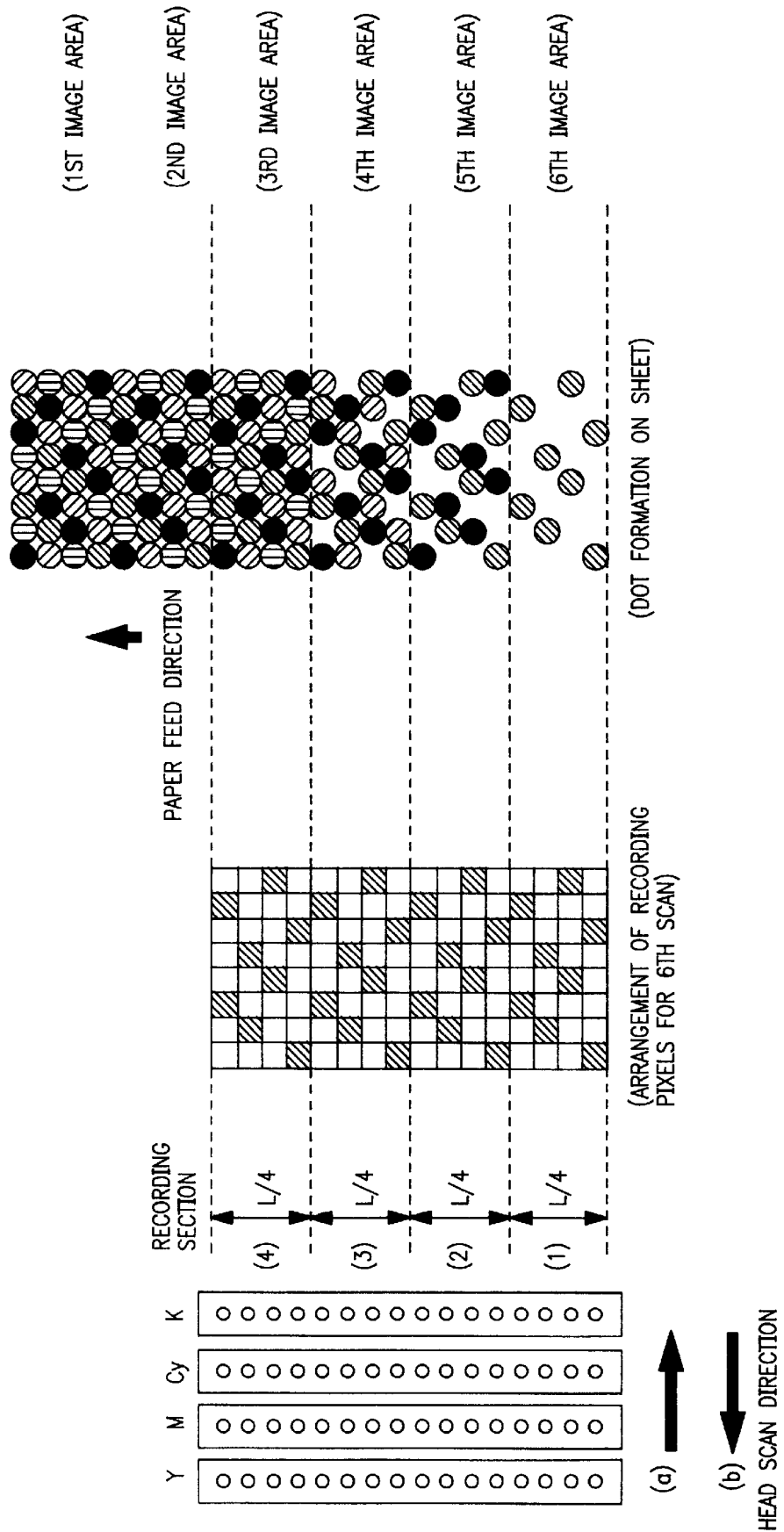

Subsequently, in the third scan, the print operation is performed on areas corresponding to the recording sections (1), (2), and (3), as shown in FIG. 26. In the third scan, the recording operation is performed according to a thin-out pattern of the (4n−1)th scan shown in FIG. 23. The recording sheet is then fed by another L/4 width, and, as shown in FIG. 27, the recording operation is performed according to a pattern in the (4n)th scan shown in FIG. 23. Thereafter, the recording operation continues, as shown in FIGS. 28 and 29. Thereafter, the above-mentioned paper feed operation and the head scan operation are sequentially repeated to achieve the recording operation.

In FIG. 29, paying attention to the dot formation state on the first to third image areas on which recording has already been completed, dots are formed on recording pixels, where pixels of original image data are adjacent to each other, in four different record scans. For this reason, even when the above-mentioned recovery processing is performed in at least one of the four record scans, the degree of density difference•color tone difference caused by a difference in scan interval becomes about half that in the first embodiment. Therefore, in this embodiment, the scan interval difference upon execution of pre-ejection does not so serially influence the density difference•color tone difference.

For this reason, in this embodiment, the record scan timing is corrected as in the above embodiment only when wiping is executed. Since the setting operation of record scan timings is simplified, the record scan timings can be easily corrected even if recovery processing timings are not set in advance. For this reason, when wiping is required during recording, an image in an image area, associated with the wiping timing is completed before execution of the wiping, and recording for the next image area is started after the wiping is completed. For this reason, scan interval density unevenness can be suppressed even when an image data memory has a small capacity.

Figure 30:
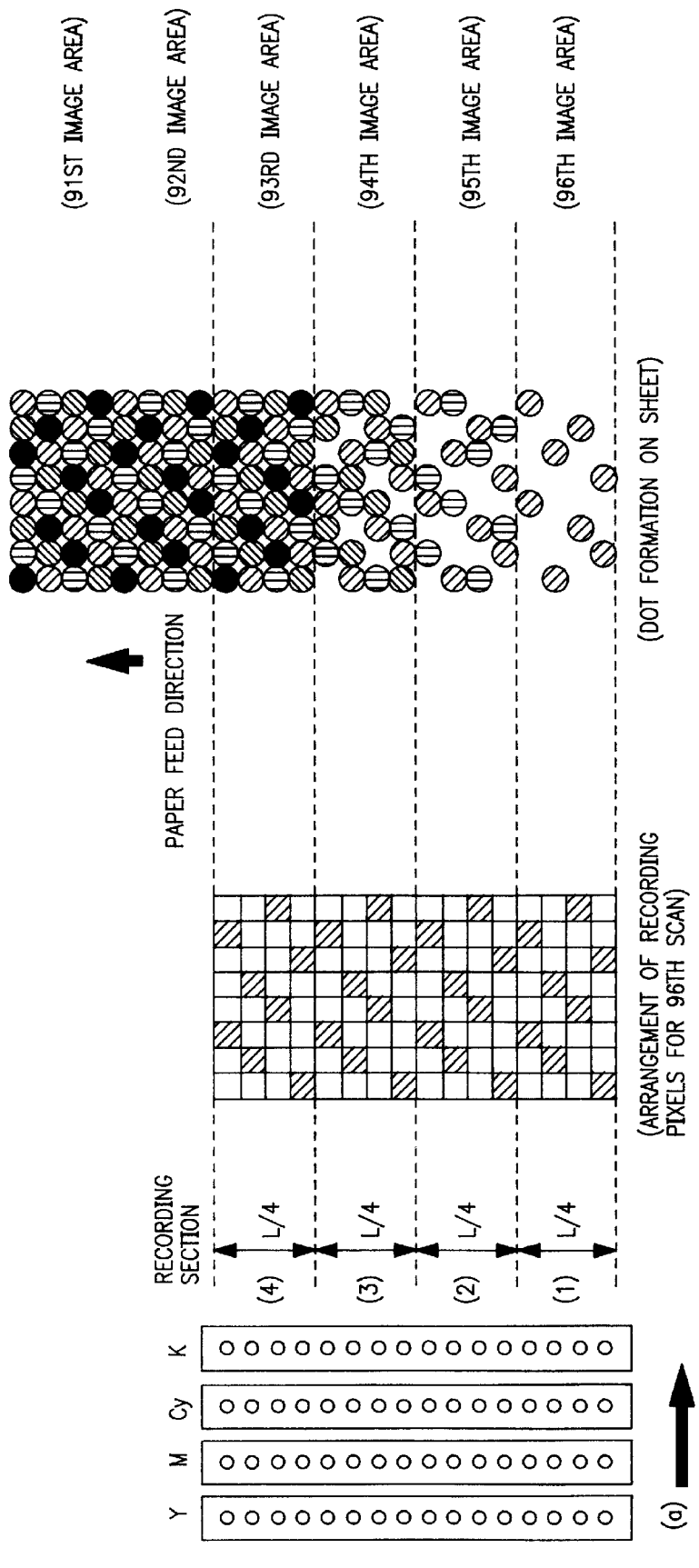
FIGS. 30 to 38 are explanatory views of record scans in a recording interruption mode for a long period of time in the second and fifth embodiments.
Figure 37:
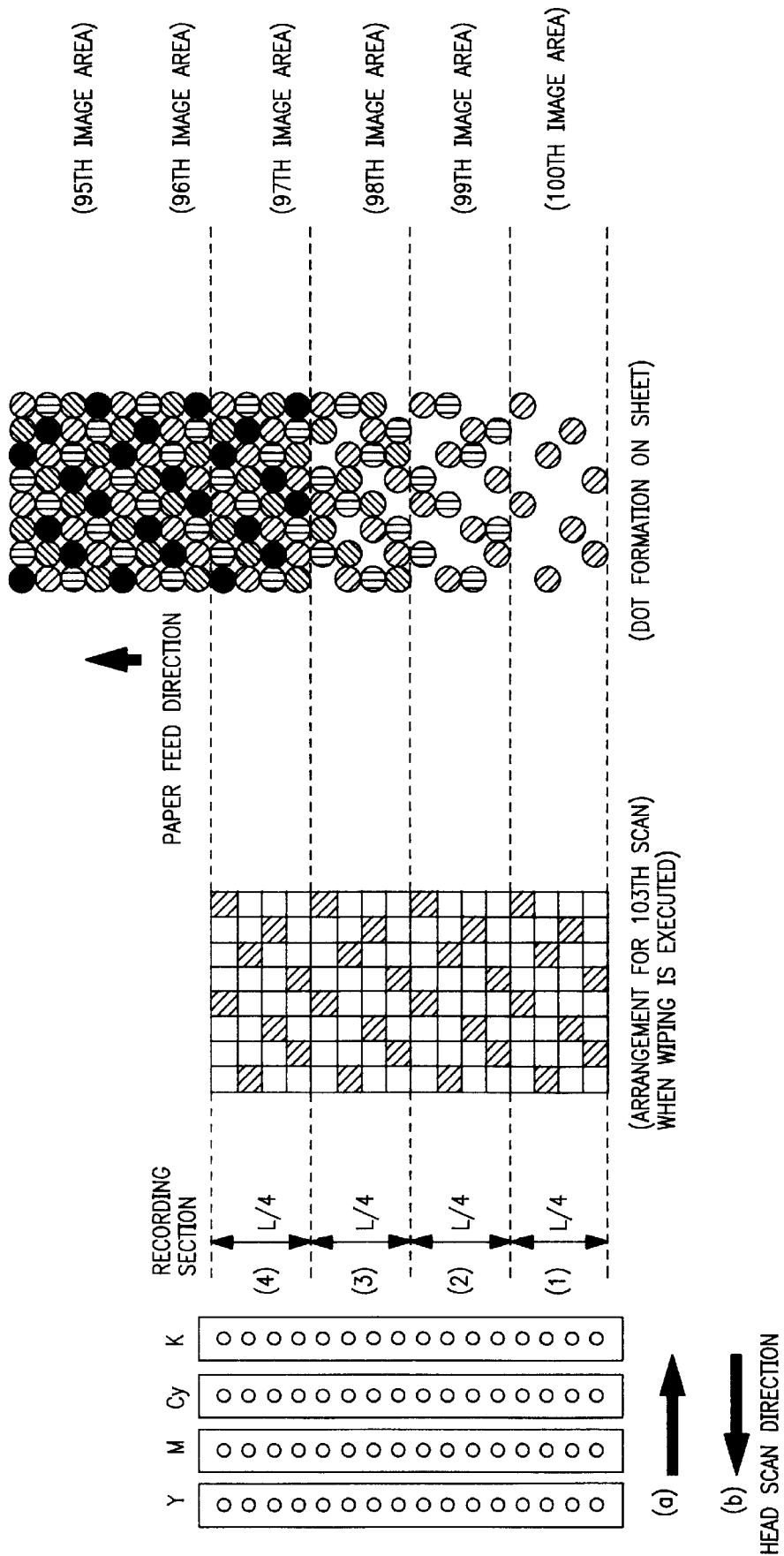
Figure 38:
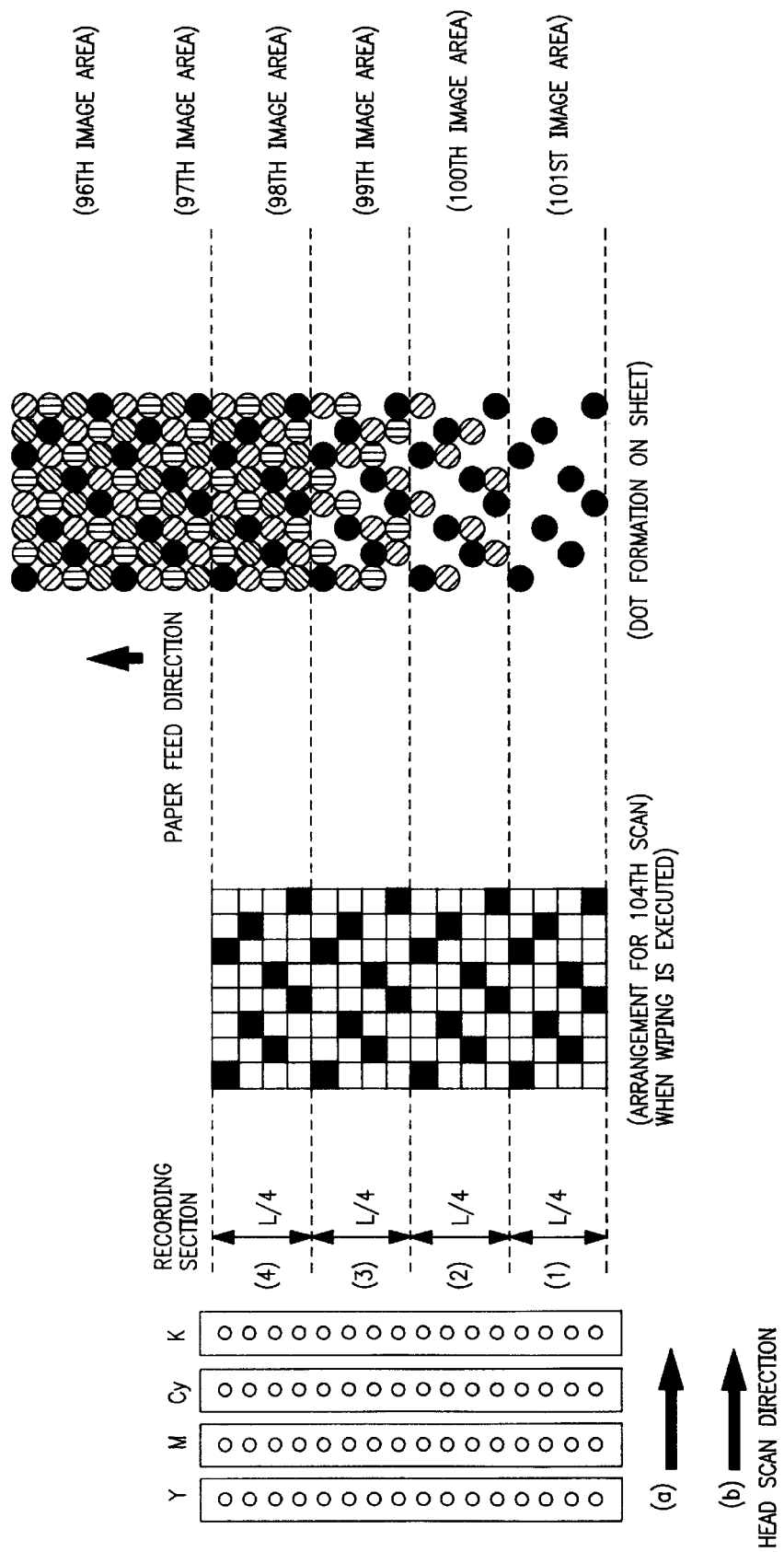
Figure 39:
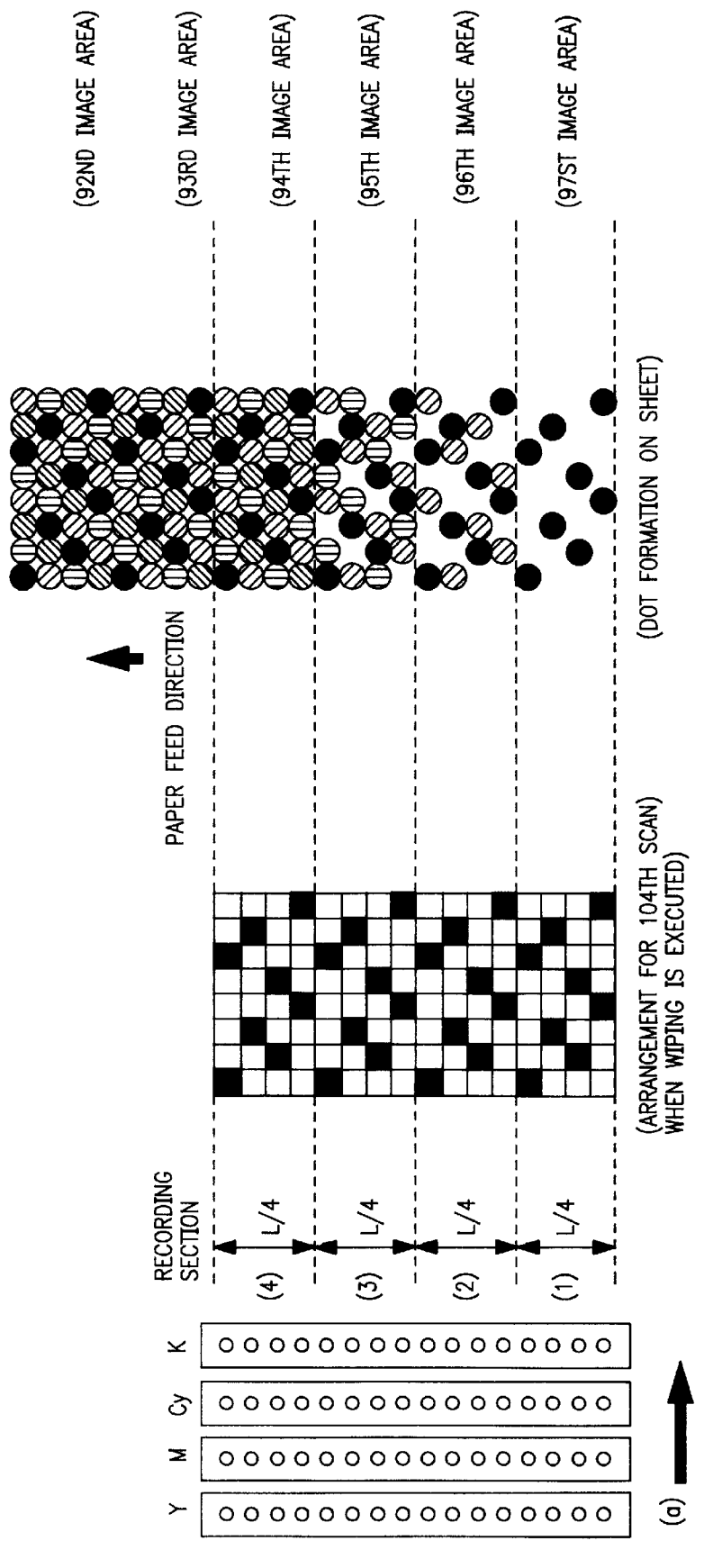
FIG. 39 is an explanatory view of record scans in a normal mode for a long period of time in the second and fifth embodiments.

However, since this embodiment executes the four-divisional print operation, a relatively complicated record scan is required as follows so as to complete an image before wiping unlike in the above embodiment. FIG. 30 shows a normal record scan state in the 96th scan. When a long scan interval is required since, for example, wiping is required upon completion of the 96th scan, or since no image data is transferred, record scans shown in FIGS. 31 to 38 are executed. Note that FIG. 39 shows a normal recording state in the 97th scan, and the head scan direction is indicated by (a). A detailed explanation will be given below.

Figure 31:
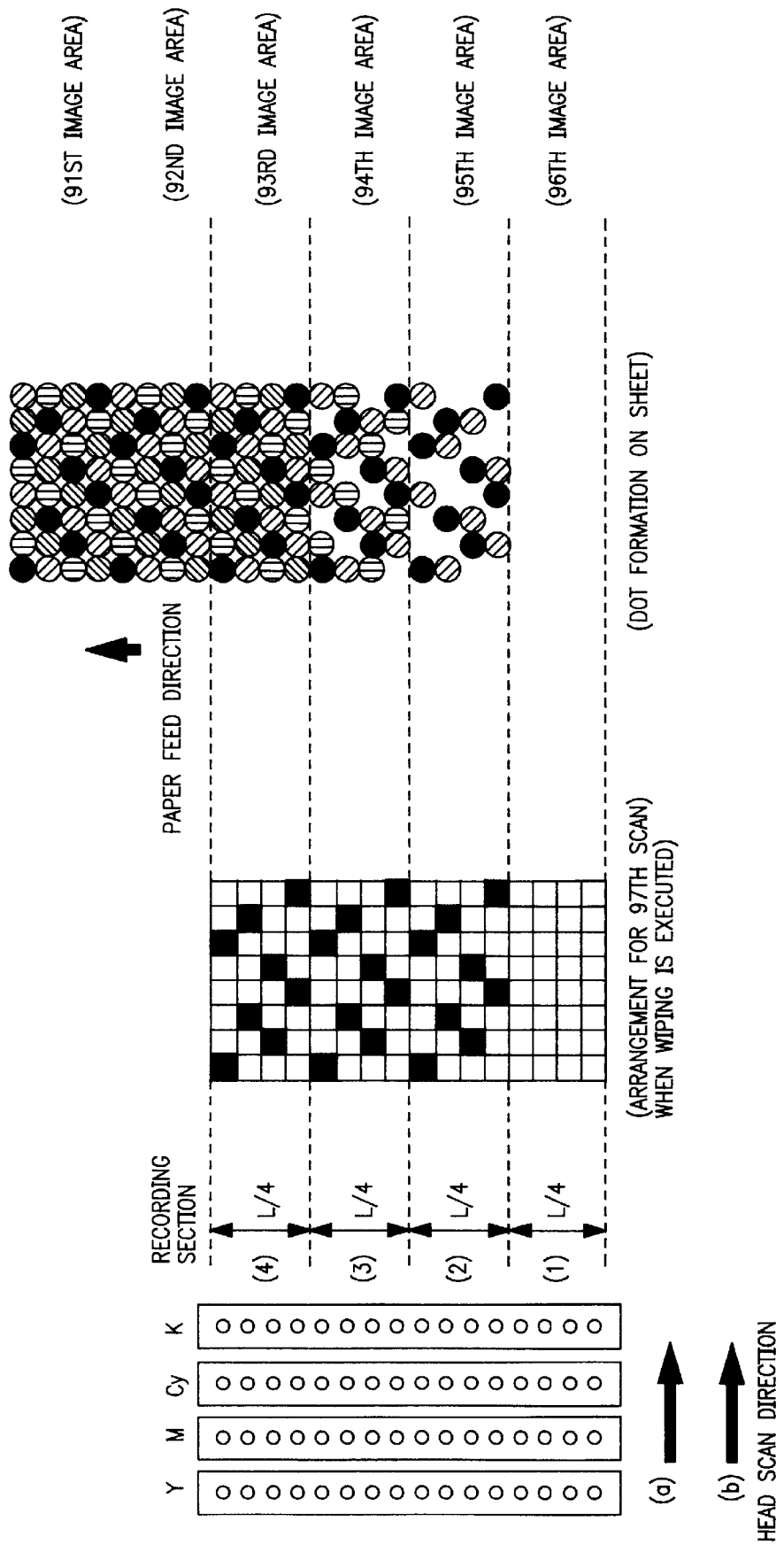
Figure 32:
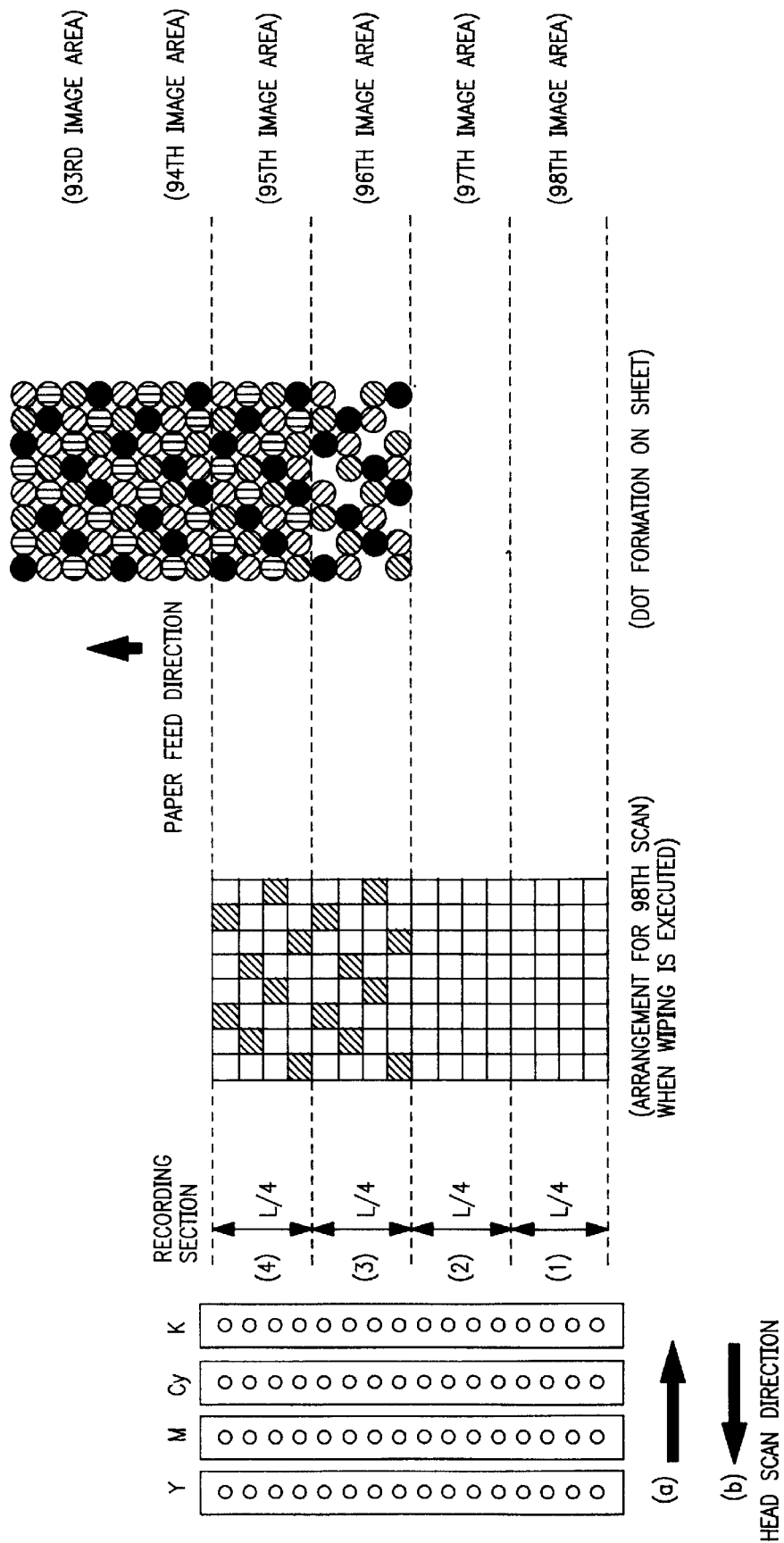
Figure 33:
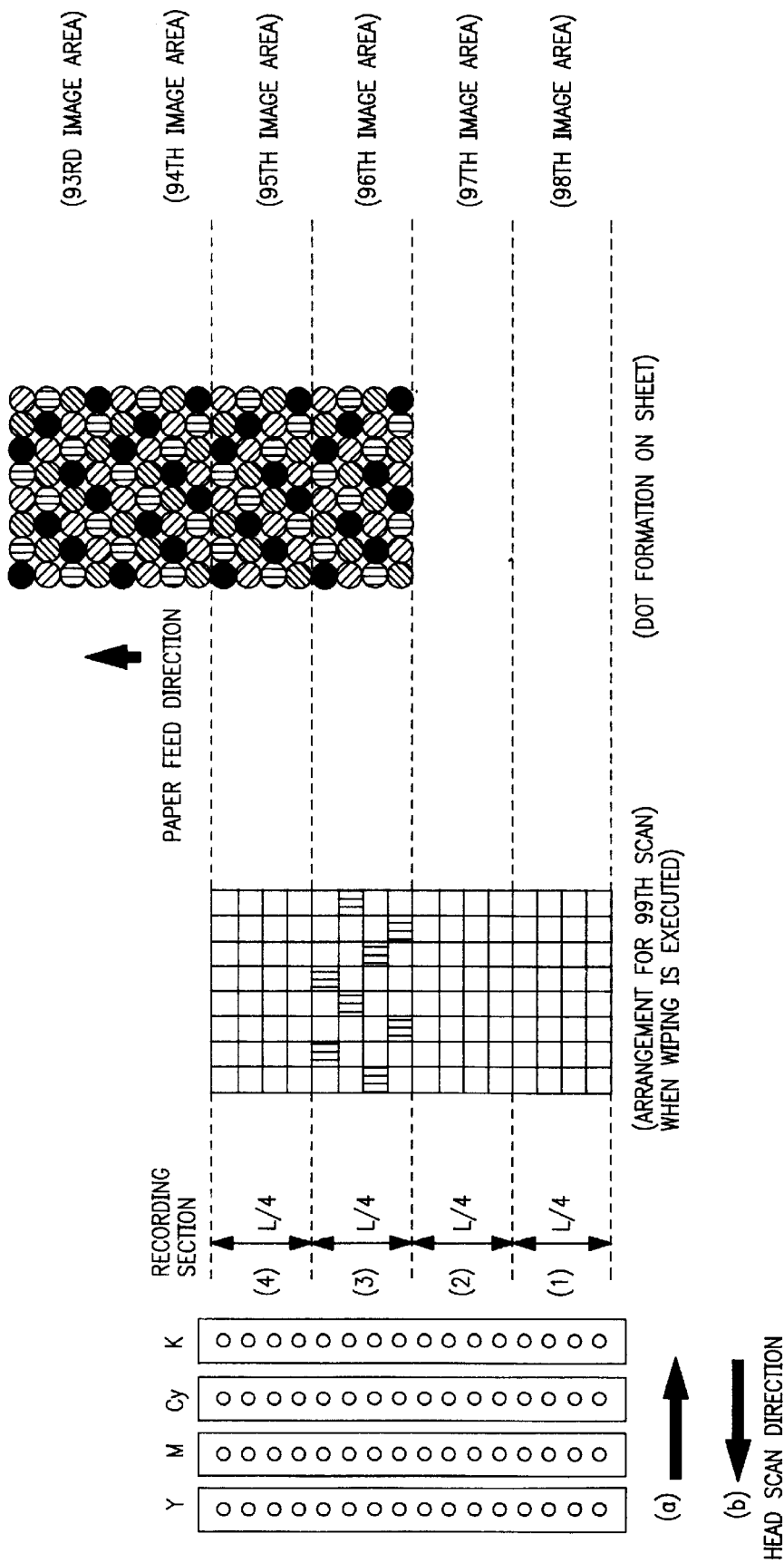

As shown in FIG. 31, in the 97th record scan for partially completing recording, after a predetermined paper feed operation (L/4 width), the recording operation is performed on image areas before the 96th image area, for which areas recording has already been started. Similarly, in the 98th record scan shown in FIG. 32, after a predetermined paper feed operation (L/4 width), the recording operation is performed on the 96th and 95th image areas using the recording sections (3) and (4). In the 99th scan, the recording operation is performed on the 96th image area using only the recording section (3), as shown in FIG. 33, without executing a paper feed operation. Therefore, since the 96th image area is subjected to recording using the same recording section twice in the four-divided record scans, the effect of nozzle unevenness reduction is relatively impaired but is satisfactory as compared to the two-divisional recording in the above embodiment. Thus, no problem is posed in a practical use.

Figure 34:
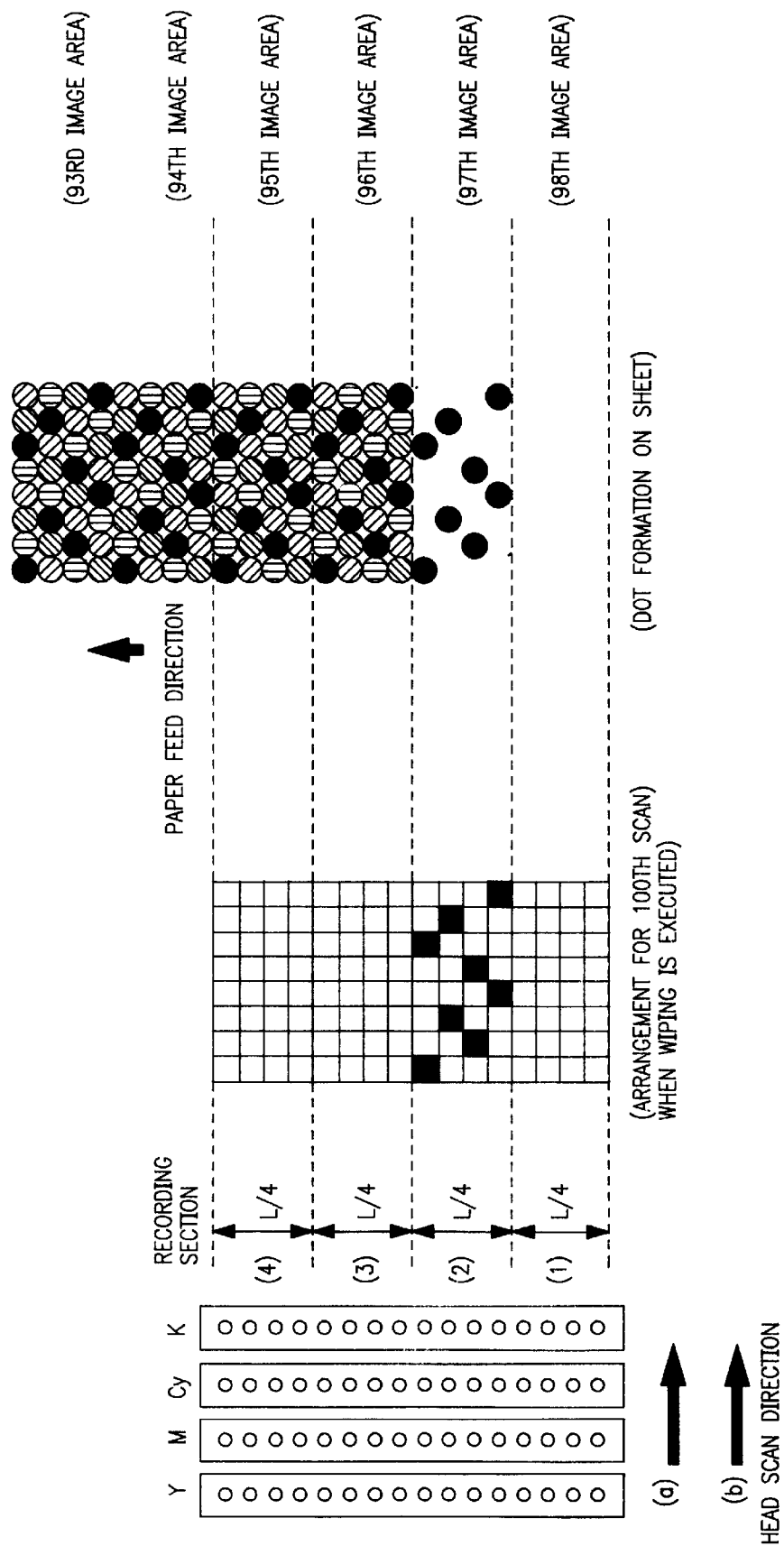
Figure 35:
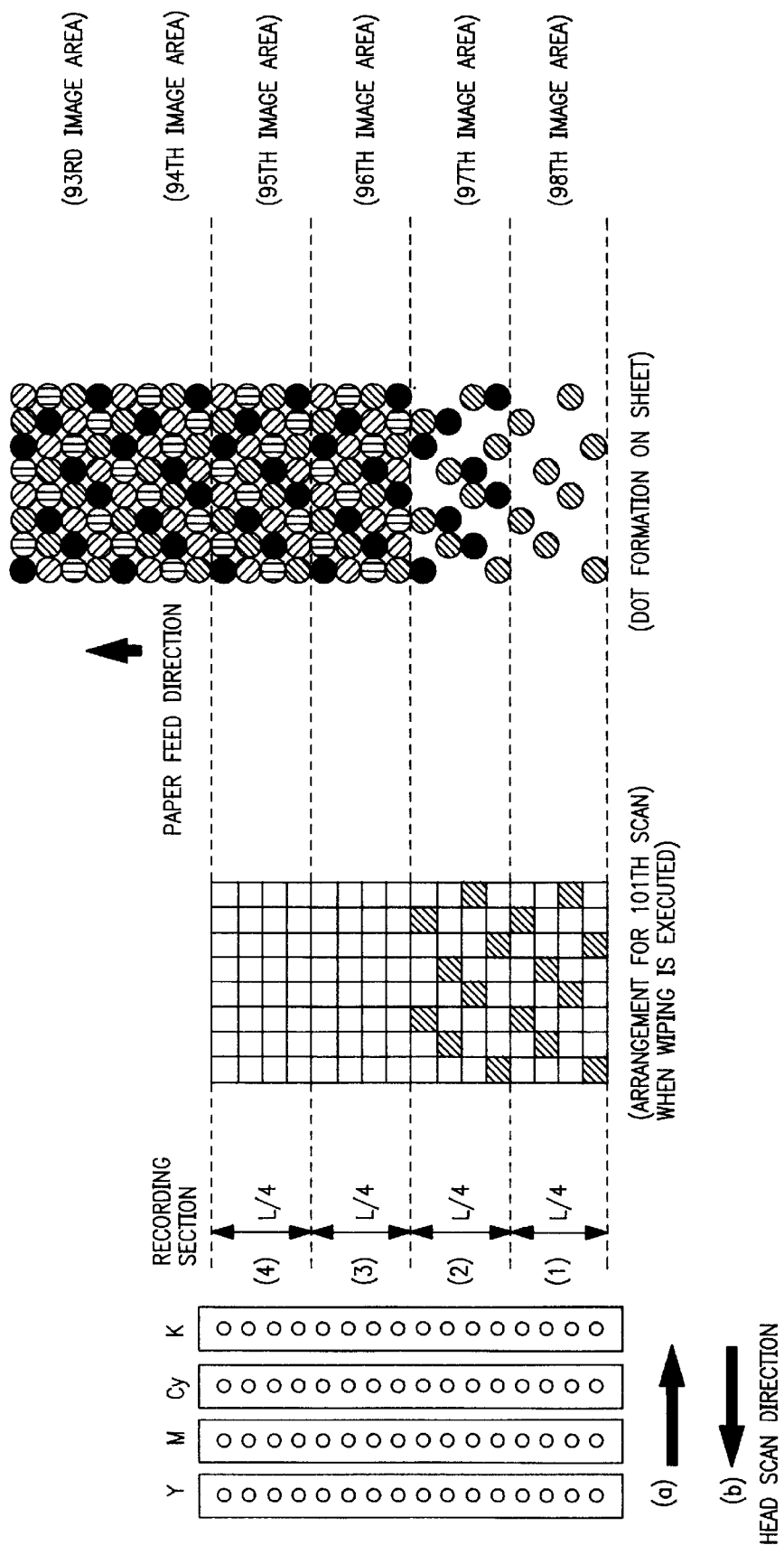
Figure 36:
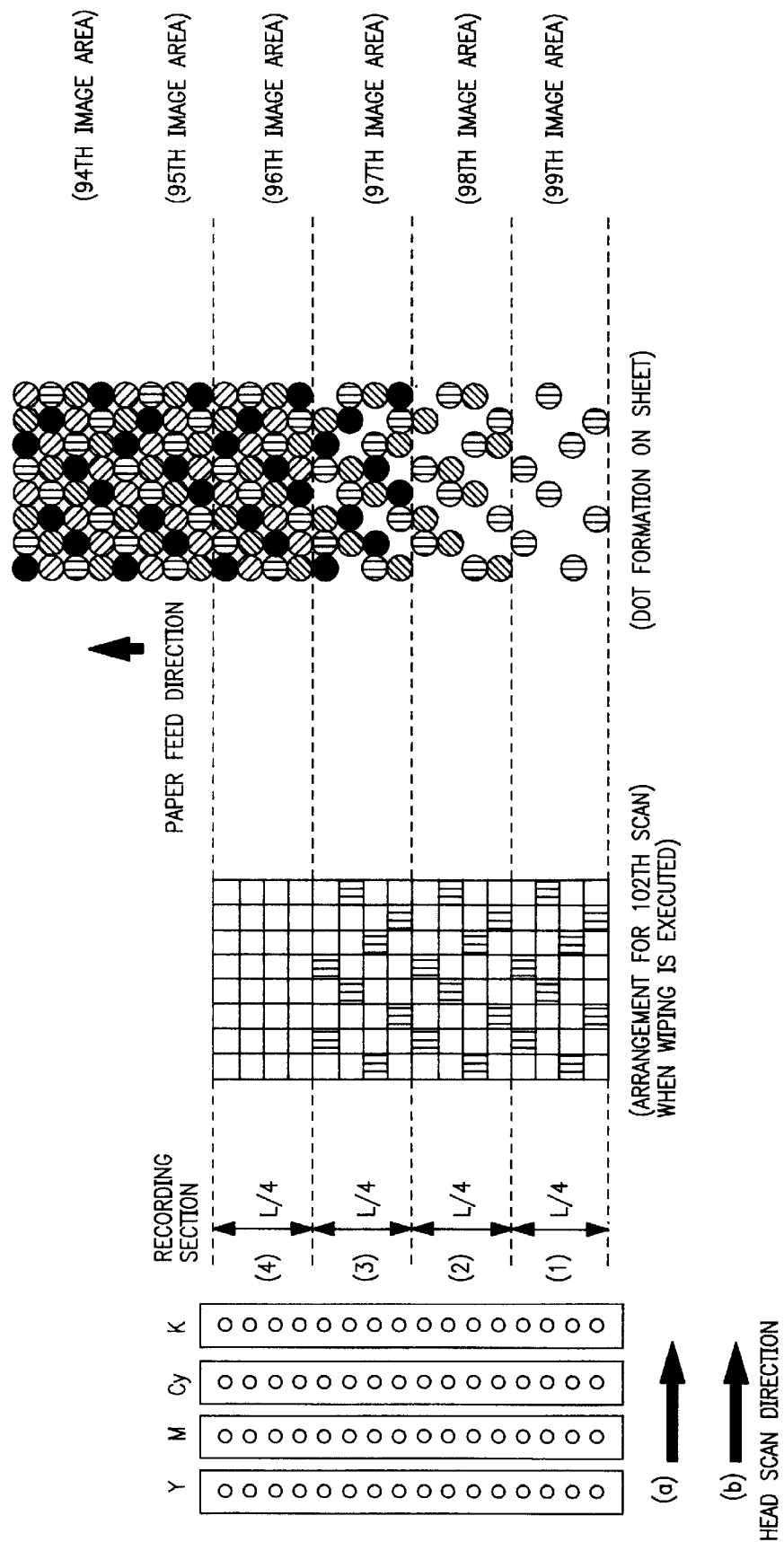

In this manner, after the image on the 96th image area is completed, wiping or data waiting processing for a long period of time is executed. After execution of the wiping or necessary data is input, the record scan is restarted. FIG. 34 shows a recording state in the 100th record scan after the record scan is restarted. Since no paper feed operation is performed, the recording operation is performed on the 97th image area using the recording section (2). Subsequently, the 101st scan is executed to perform recording on the 97th and 98th image areas, as shown in FIG. 35, while adjusting the scan interval timing without executing a paper feed operation. Thereafter, a predetermined paper feed operation (L/4 width) is performed, and recording is performed using recording sections (1) to (3), as shown in FIG. 36. Thereafter, as shown in FIGS. 37 and 38, the normal record scan, i.e., the 103rd and 104th scans are sequentially executed.

In this manner, according to this embodiment, scan interval density unevenness can be efficiently prevented although the number of times of scans is relatively large, and an image is relatively deteriorated since a portion where the scan interval is prolonged is recorded using the same recording section.

As described above, since one pixel of original data is recorded by four different nozzles, density unevenness caused by the nozzles or a stripe pattern caused by the paper feed operation can be further suppressed, and a high-quality image can be obtained. In this embodiment, since the ink ejection quantity per scan is decreased as compared to the first embodiment, boundary blurring is further difficult to occur, and generation of scan interval density unevenness itself caused by absorption•evaporation characteristics of the ink is suppressed. For this reason, sufficiently high-quality recording can be realized even though the scan interval management means is simplified.

(Third Embodiment)

This embodiment comprises a scan interval timer as a scan interval management means for limiting variations of scan intervals of a plurality of number of times of record scans for a single image area to fall within a predetermined time range. Using this timer, a record scan at a scan interval below the lower limit of the predetermined time range is inhibited in such a manner that the control waits until the interval falls within the predetermined time range. When the scan interval exceeds the upper limit of the predetermined time range, the record scan is executed for only image areas on which image formation can be completed, and after the image is completed, data waiting processing or recovery processing is executed.

Figure 40:
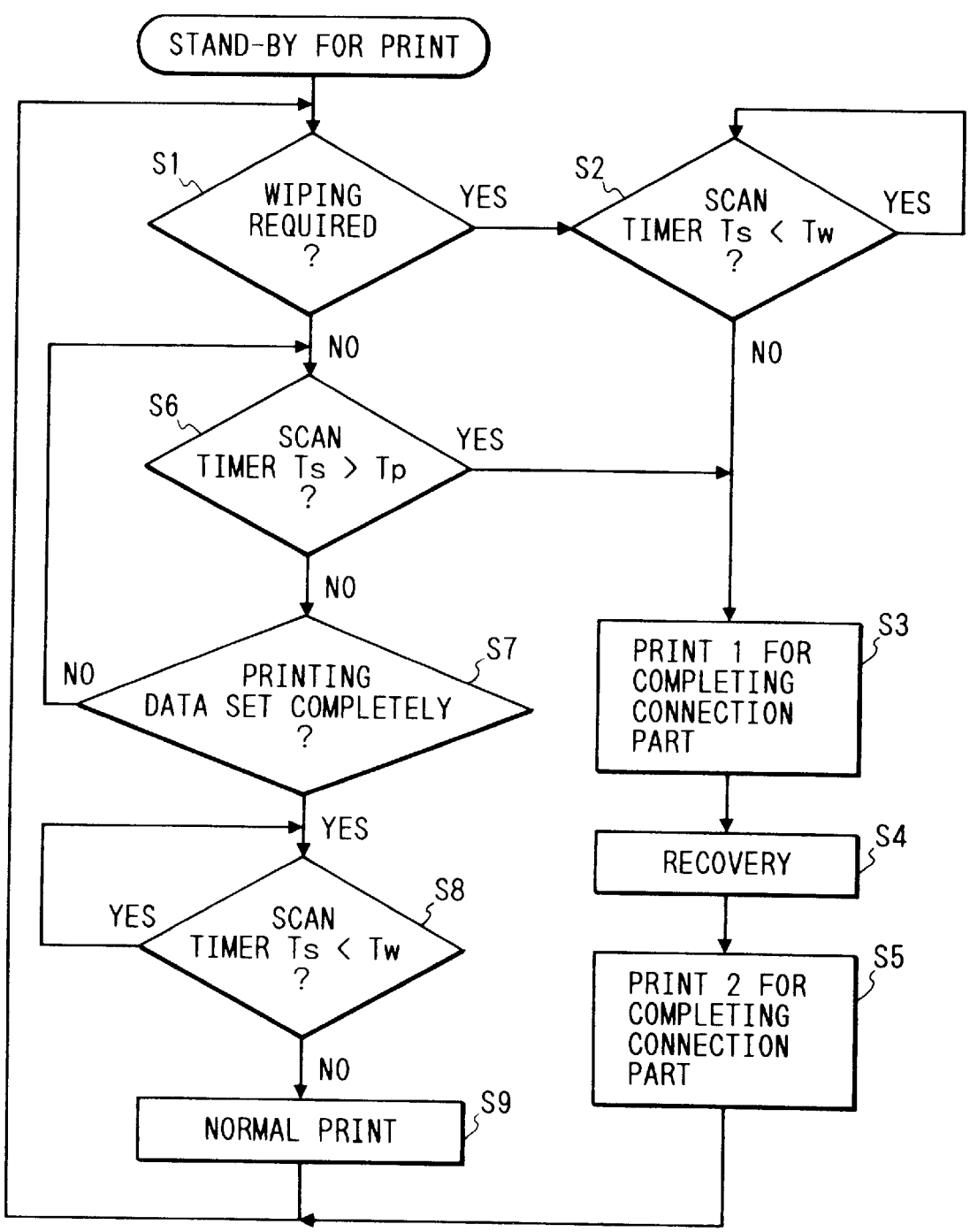
FIG. 40 is a flow chart showing scan interval management using a scan interval timer in the third and sixth embodiments.

FIG. 40 is a flow chart for executing scan interval management using the scan interval timer. In FIG. 40, prior to each record scan, it is checked if wiping is required (step S1). If wiping is required, the scan interval timer (Ts) is checked (step S2). If Ts is equal to or smaller than a predetermined minimum scan interval (Tw), the control waits until Ts exceeds the minimum scan interval (Tw). Thereafter, a partially recorded image on image areas, associated with the wiping timing, is completed before wiping (step S3), and no paper feed operation is performed. Upon completion of wiping (step S4), recording on the next image area is started (step S5). In this case, since recording is performed on the basis of image data already transferred from a host apparatus, no data waiting•check processing is required. Note that the scan interval timer (Ts) is reset and started when each record scan is started.

If it is determined in step S1 that wiping is not required, data waiting•check processing is performed. If data to be recorded is transferred from the host apparatus, and is converted into data suitable for recording, the scan interval timer (Ts) is checked (step S8). If Ts is equal to or smaller than the predetermined minimum scan interval (Tw), the control waits until Ts exceeds the minimum scan interval (Tw), and thereafter, a record scan and a paper feed operation are executed (step S9). If data to be recorded is not transferred yet, further data waiting•check processing is executed (step S7). However, when data is not transferred after Ts exceeds a predetermined maximum scan interval (Tp) (step S6), a partially recorded image on image areas, which are planned to be subjected to recording in a corresponding record scan, is completed, and thereafter, the data waiting•check processing is continued without executing a paper feed operation (steps S3 to S5).

According to this embodiment, since the scan interval timer (Ts) is used, even when the data transfer time from the host apparatus or the image processing time is long, scan interval management for suppressing scan interval density unevenness can be realized by a simple arrangement. As has been described in the above embodiments, since the degree of scan interval density unevenness varies depending on the color or monochrome recording mode, the two- or four-divisional print mode, the type of recording sheet, and the like, the setting time of the scan interval timer (Ts) may be changed according to these conditions.

(Fourth Embodiment)

The fourth embodiment of the present invention will be described below with reference to FIG. 8. In this embodiment, color recording is performed by back-and-forth scans. As indicated by a head scan direction (b) in FIG. 8, an odd-numbered scan is a forward scan, and an even-numbered scan is a backward scan. In this case, the ink ejection order of inks in each record scan is Bk→Cy→M→Y in the forward scan, and is reversed in the backward scan, i.e., Y→M→Cy→Bk.

First, on the first image area, a print operation is performed according to a pattern obtained by thinning out original image data to a checker pattern using lower half nozzles in a recording section (1) of each recording head by the first scan (forward scan). At this time, dot images thinned out to the checker pattern are formed on the first image area in the order of Bk→Cy→M→Y. Then, a recording sheet is fed by an L/2 width. In the second scan (backward scan), image data is thinned out to a reverse checker pattern to complement that in the first scan, and each recording head performs a print operation on an area corresponding to the recording section (1) using upper half nozzles and on an area corresponding to the recording section (2) using lower half nozzles. At this time, on the first image area, dots obtained by thinning out image data to the reverse checker pattern are formed on recording pixels, which are not printed in the first scan, in the order of Y→M→Cy→Bk, thus completing image data recording. In this case, dots recorded on the first image area are printed on recording pixels in the checker pattern in the landing order of Bk→Cy→M→Y, and are also printed on recording pixels in the reverse checker pattern, which complements the checker pattern, in the landing order of Y→M→Cy→Bk.

After the recording sheet is fed by another L/2 width, in the third scan, image data is thinned out to a checker pattern like in the first scan, and a print operation is performed on the second image area using the upper half nozzles and on the third image area using the lower half nozzles. An image on the second image area is completed by the third scan. In this case, dots recorded on the second image area are printed on recording pixels in the reverse checker pattern in the landing order of Y→M→Cy→Bk, and are printed on recording pixels in the checker pattern, which complements the reverse checker pattern, in the landing order of Bk→Cy→M→Y. Thereafter, image areas divided in correspondence with the ½ width (L/2 width) of the recording head are sequentially subjected to recording by repeating the above-mentioned operation, and recording of all the image data is completed.

In this embodiment, in order to uniform the number of landing dots in each record scan, as shown in FIG. 12, an ink jet recording head having a recording density twice that of image data is also used, and one pixel of image data is recorded while being divided into four recording pixels subjected to the same recording operation. The head scan direction is indicated by (b) in FIG. 12.

The reason why no color tone difference is generated by back-and-forth record scans in the color ink jet recording apparatus of the present invention will be described below. In this embodiment, since 180-dpi image data is printed at a recording density of 360 dpi, the numbers of dots landing on the first image area in the first scan (forward scan) and the second scan (backward scan) are equal to each other regardless of the arrangement of pixels of image data, as described above. Therefore, the color tone of the first image area corresponds to an average of the color tone of dots formed on recording pixels in the checker pattern in the landing order of Bk→Cy→M→Y in the forward scan, and the color tone of dots formed on recording pixels in the reverse checker pattern in the landing order of Y→M→Cy→Bk in the backward scan. Similarly, the color tone of the second image area corresponds to an average of the color tone of dots formed on recording pixels in the reverse checker pattern in the landing order of Y→M→Cy→Bk in the backward scan, and the color tone of dots formed on recording pixels in the checker pattern in the landing order of Bk→Cy→M→Y in the forward scan. For this reason, the color tones of the first and second image areas are equal to each other although the thin-out print order is reversed.

Figure 13:
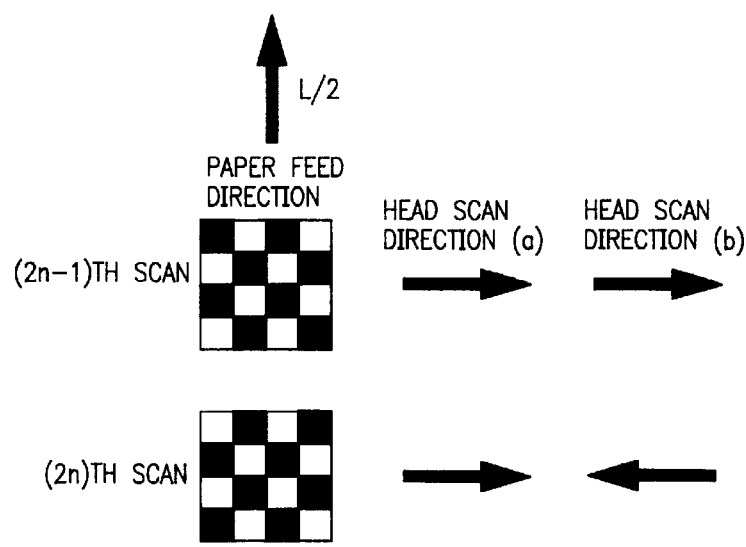
FIG. 13 is an explanatory view of a thin-out method of the first embodiment.

The effect of the present invention in this embodiment will be described in detail below. For the sake of simplicity, a case will be described in detail below 180-dpi image data is recorded using 360-dpi multi-nozzle (8-nozzle) heads. In the following description, an intermediate color (yellowish green) obtained by overlapping Cy and Y at print duties of 62.5% and 100% is printed as a recording image as in the description of the prior art. In this case, since the recording density of each recording head is twice the density of image data, recording pixels of single data are always constituted by adjacent 2×2, i.e., four pixels, as shown in FIG. 12. FIG. 13 shows 360-dpi thin-out patterns in this embodiment. In FIG. 13, the head scan direction is indicated by (b).

Figure 41:
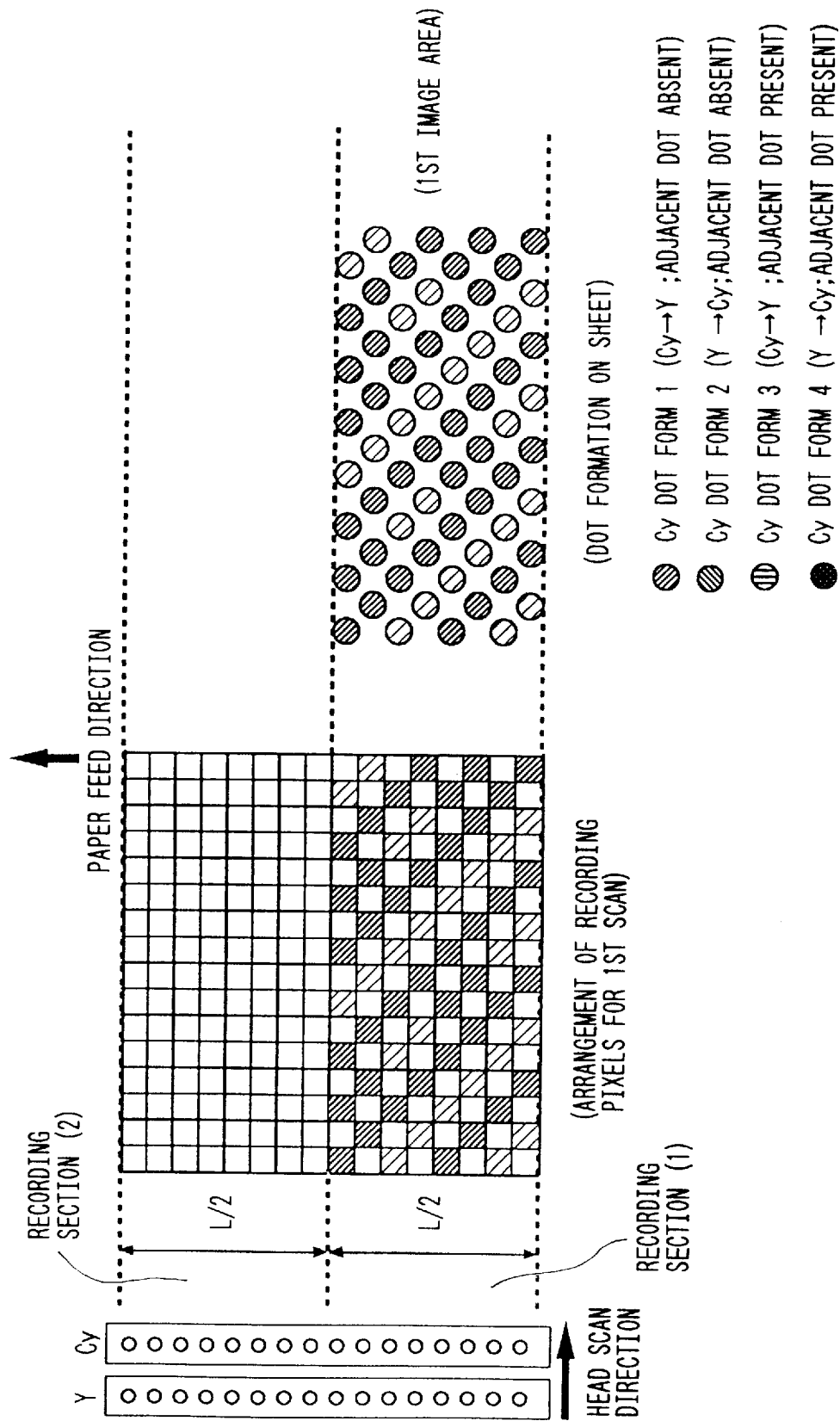
FIGS. 41 to 43 are views showing dot formation states in the first to third scans in the fourth embodiment.

FIG. 41 illustrates recording pixels recorded by Cy and Y recording heads in the first scan of the L/2 paper feed print method of this embodiment, and a dot formation state on a recording medium as a recording result. In FIG. 41, a dense-hatched pattern represents that Cy and Y dots are recorded on a single recording pixel. In the first scan, each recording head uses four nozzles in the recording section (1), and the inks are ejected in the order of Bk→Cy→M→Y onto recording pixels in the checker pattern on the first image area. As a result, in a recording pixel where Cy and Y image data overlap each other, the Y ink spreads around and below the Cy dot. More specifically, since Cy dots recorded on the first image area in the first scan land on a recording medium where no inks, i.e., no adjacent pixels are present, they have a relatively sharp form (Cy dot form 1). Then, the recording medium is fed by an L/2 width, and the first image area which is subjected to recording in the first scan is shifted to the recording section (2).

Figure 42:
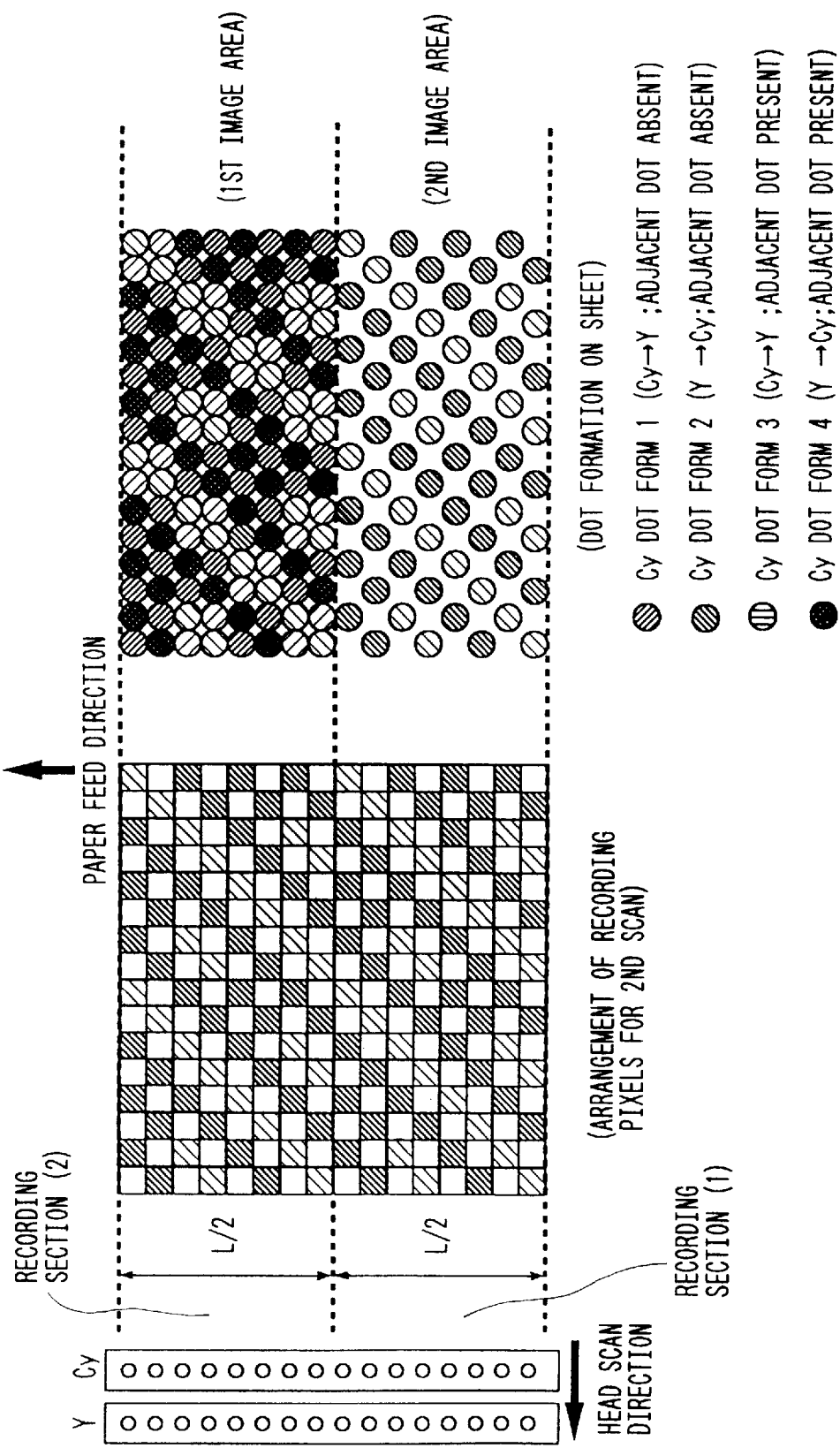

FIG. 42 illustrates recording pixels recorded in the second scan, and a dot formation state on the recording medium as a recording result. In the second scan (backward scan), the inks are ejected onto recording pixels in the reverse checker pattern in the order of Y→M→Cy→Bk using four nozzles in the recording section (2) for the first image area, and four nozzles in the recording section (1) for the second image area. In this case, Cy dots recorded on the first image area in the second scan are recorded on blank portions adjacent to the Y dots which landed in the checker pattern in the first scan immediately after Y dots land in the reverse checker pattern in the second scan. For this reason, each Cy dot has a relatively large and blurred form (Cy dot form 4). Since Cy dots recorded on the second image area in the second scan are recorded immediately after Y dots land, they have a form (Cy dot form 2), whose sharpness is relatively inferior to that of the Cy dot form 1 but whose blurred state is relatively superior to that of the Cy dot form 4. The recording medium is fed by another L/2 width, so that the second image area is shifted to the recording section (2), and the third image area is shifted to the recording section (1).

Figure 43:
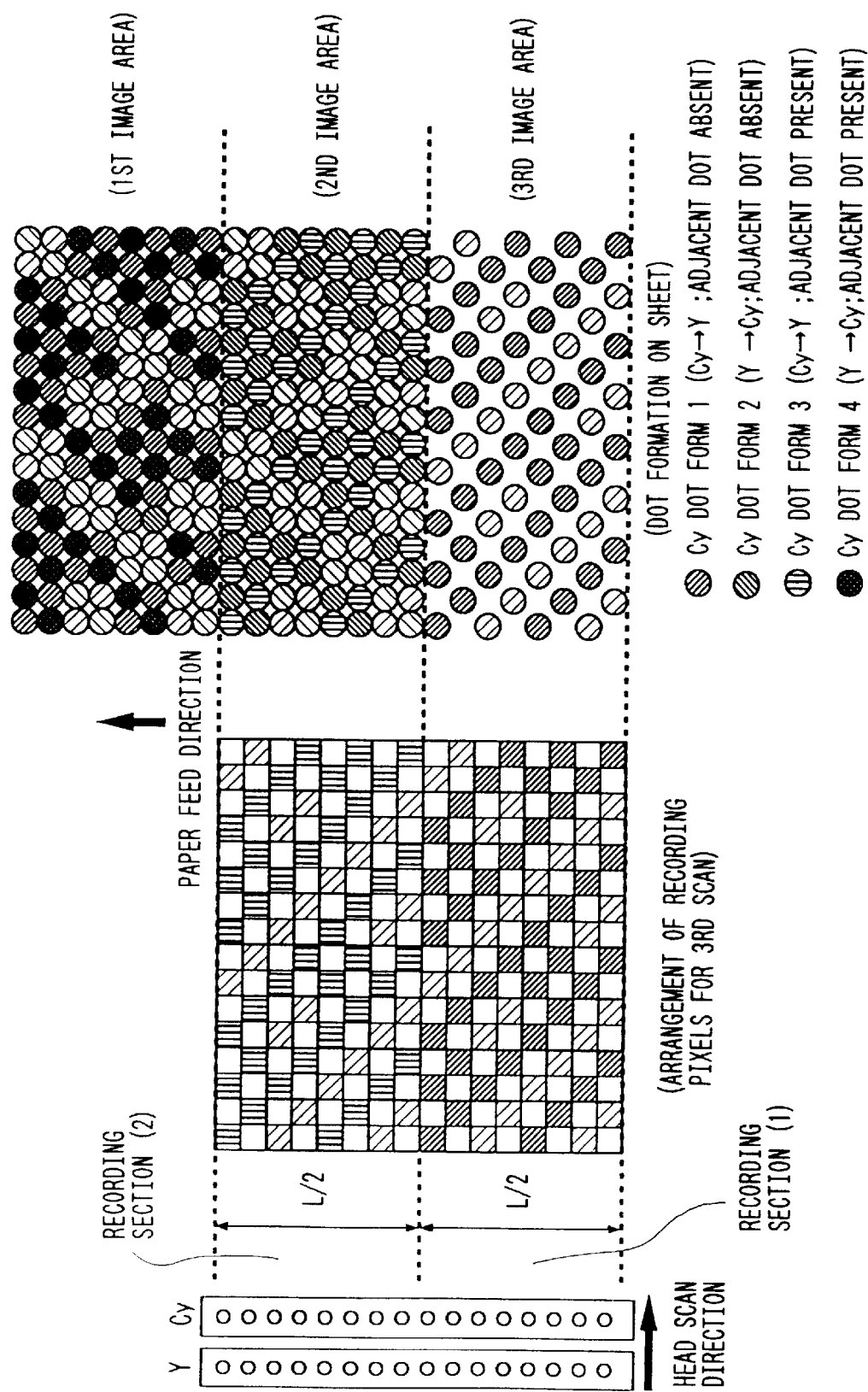

FIG. 43 illustrates recording pixels recorded in the third scan, and a dot formation state on the recording medium as a recording result. In the third scan (forward scan), the inks are ejected onto recording pixels in the checker pattern in the order of Bk→Cy→M→Y using four nozzles in the recording section (2) for the second image area, and four nozzles in the recording section (1) for the third image area. Since Cy dots recorded on the second image area in the third scan are recorded on blank portions adjacent to Y dots which landed in the reverse checker pattern in the second scan, they have a form (Cy dot form 3) whose blurred state is equivalent to or relatively inferior to that of the Cy dot form 2. Since Cy dots recorded on the third image area in the third scan land on the recording medium where no inks, i.e., adjacent pixels are present like in the first image area in the first scan, they have a relatively sharp form (Cy dot form 1). Furthermore, the recording medium is fed by another L/2 width, and the following image areas are subjected to recording by two each recording head scans, i.e., forward and backward scans.

As described above, in this example, Cy dots having four different forms are distributed on each image area. However, in this example, the image areas have the same number of Cy dots since uniform yellowish green image data is printed. Furthermore, as described above, the number of Cy dots is the same in every record scan since the print operation is performed according to checker and reverse checker thin-out patterns using the recording heads each having a recording density twice that of image data. The distribution state of Cy dot forms on each image area will be examined below. Image data is recorded on the odd-numbered image area to have 40 each of Cy dot forms 1 and 4, and is recorded on the even-numbered image area to have 40 each of Cy dot forms 2 and 3.

As for the order of sharpness of Cy dot forms, the Cy dot form 1 is the sharpest, and the dot form is sequentially blurred as the numerical value is increased. For this reason, if Cy dot forms in each image area seem to have average sharpness from a macroscopic viewpoint, it can be considered that the Cy dot forms in any image areas are equivalent to each other from a macroscopic viewpoint. Therefore, as can be understood from the above description, even when color recording which may easily cause color shading in back-and-forth scans is performed, color tone differences among image areas are small.

In this embodiment, the print operation is performed based on image data thinned out to a simple checker pattern such as checker and reverse checker patterns. However, the thin-out pattern is not limited to the checker pattern since image data need only be thinned out to obtain almost uniform numbers of dots in units of record scans. More specifically, the recording sections (1) and (2) need only have a complementary relationship therebetween, and the numbers of dots upon execution of divisional recording of image data need only be almost equal to each other. In the description of this embodiment, a general control method associated with back-and-forth recording, e.g., a correction method of registration data of recording heads between the forward and backward scans in association with the interval between adjacent recording heads and the print start position, and back-and-forth correction of the driving order in association with time-divisional driving of multi-nozzle recording heads will be omitted.

Even in a case wherein an image is completed on a single image area by a plurality of number of times of back-and-forth record scans, when the interval between adjacent record scans varies according to a time required for recovery processing of a recording head, which processing is performed during such interval between adjacent record scans, or a time required for image processing or transfer of image data to be recorded, as described above, the landing times of adjacent dots on a recording sheet consequently vary in units of divided image areas, and density unevenness caused by different penetration•fixing states of the ink on the recording sheet may occur. The scan interval density unevenness is further conspicuous in back-and-forth color recording of this embodiment.

In this embodiment, a recording section (L) of each recording head is divided into n sections, and the recording operation is achieved by a plurality of number of times of back-and-forth record scans of the recording head for each of image areas obtained by dividing the entire image area in units of L/n widths, while a recording sheet is sequentially fed by the L/n width. In addition, a back-and-forth scan interval management means for limiting variations of scan intervals of the plurality of number of times of record scans for a single image area to fall within a predetermined time range is arranged to suppress scan interval density unevenness. More specifically, as the back-and-forth scan interval management means, an image memory for the entire image area to be subjected to divisional recording is provided, and the record scan timing including a paper feed time and a recovery processing time of the recording head is set in advance. The back-and-forth scan interval management means of this embodiment will be described in detail below.

FIG. 44 shows visual discrimination results of a density difference-color tone difference when adjacent image areas are subjected to back-and-forth color recording in various combinations of scan interval time differences, i.e., time differences between checker and reverse checker print operations on the image areas upon back-and-forth color recording as in FIG. 14. Thus, it shows an estimation of monochrome back-and-forth scan interval density unevenness. In the back-and-forth color recording, since the landing order of inks is changed in units of scans, and the absolute value of the scan interval becomes smaller than that in a unidirectional print method, a density difference•color tone difference caused by variations of scan intervals appears more seriously than in the unidirectional print method.

Figure 15:
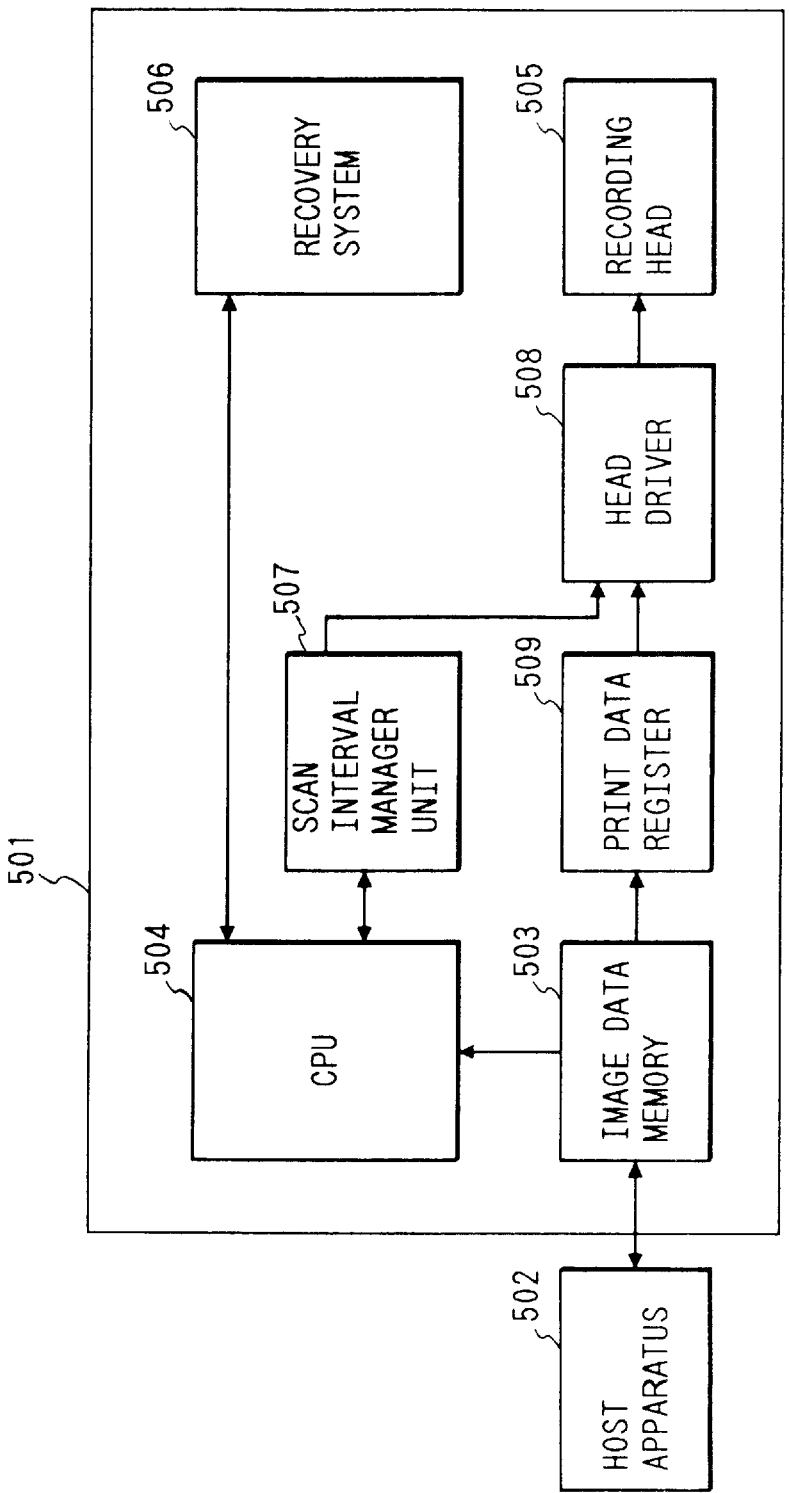
FIG. 15 is a block diagram showing a control arrangement of an ink jet recording apparatus of the first embodiment.
Figure 16:
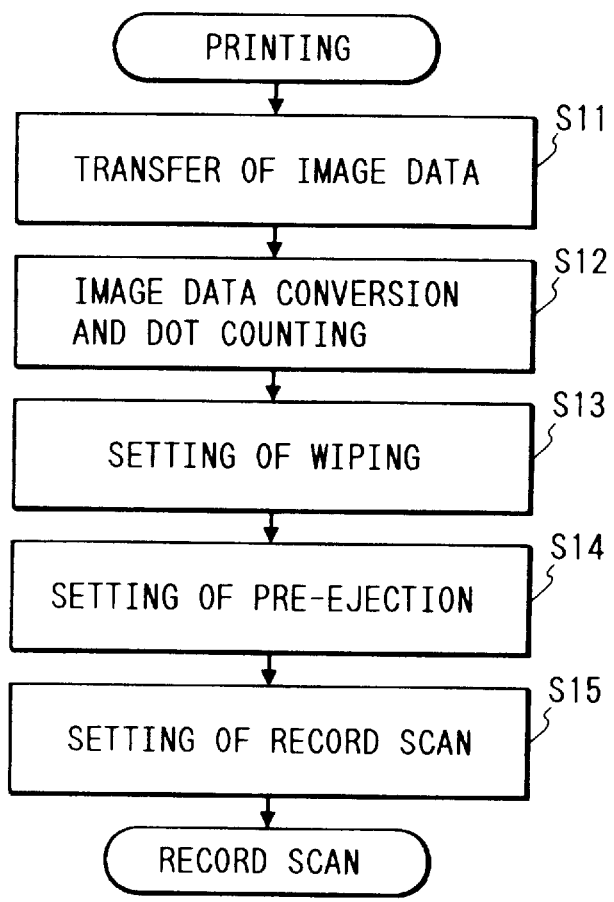
FIG. 16 is a flow chart showing scan interval management in the first embodiment.

The control arrangement and the control flow of this embodiment are the same as those of the first embodiment shown in FIGS. 15 and 16, and a detailed description thereof will be omitted. In this embodiment, the record scan timings are set after the recovery processing timings are set. In this embodiment, the wiping timing is set first. Since recovery processing is executed at the home position, the recovery processing is performed at a timing slightly shifted from a timing to be described later when the recording head reaches the home position.

The setting operation of the record scan timings will be described below. In this embodiment, the unit record scan time including the paper feed time and excluding the recovery processing time is constant, i.e., 0.7 sec. Therefore, when the pre-ejection (required time=0.5 sec) is performed after a given scan, the record scan time requires 1.2 sec (0.7+0.5); when the wiping (required time=2.9 sec) is performed, it requires 3.6 sec (0.7+2.9). Therefore, as shown in FIG. 44, scan interval density unevenness occurs in either case, and image quality is considerably deteriorated.

In this embodiment, the record scan timings are set so as not to deteriorate image quality before recording is started. In this embodiment, different record scan timing correction methods are selected with reference to the degree of image deterioration in FIG. 44 in correspondence with the pre-ejection mode and the wiping mode, respectively.

In the wiping mode, since the time difference from the normal scan time becomes large, the density difference•color tone difference becomes conspicuous. For this reason, an image in an image area associated with the wiping timing is formed before wiping, and after the end of wiping, recording on the next image area is started.

An explanation will be given below with reference to FIGS. 17 and 18 as in the first embodiment. Note that the head scan direction is indicated by (b) in FIGS. 17 and 18. For example, when wiping is planned upon completion of the 48th scan (backward scan) for performing image formation on the 47th and 48th image areas, no recording is performed on the 48th image area in the 48th scan, and an image in the 47th image area is completed using the upper half nozzles in the recording section (2), as shown in FIG. 17. After the 48th scan is completed, wiping is executed at the home position. In the 49th scan, in order to perform recording by a backward scan, a carriage for holding the recording heads is moved to the side opposite to the home position, and thereafter, recording is performed on the 48th image area using the lower half nozzles in the recording section (1), as shown in FIG. 18. During this interval, no paper feed operation (L/2 width) is performed. After the 49th scan is completed, a paper feed operation (L/2 width) is performed. Thereafter, in the 50th scan, an image on the 48th image area is completed, and a new image is formed on the 49th image area. Therefore, in this embodiment, the number of times of record scans is increased by one when the wiping is executed. Note that FIG. 19 (head scan direction (b)) shows a recording state in the 48th scan when no wiping is executed.

Since the scan interval upon execution of pre-ejection has a relatively small time difference from the normal scan interval, the density difference•color tone difference is not conspicuous. In addition, the frequency of pre-ejection is higher than that of wiping. For these reasons, in order to eliminate the density difference•color tone difference without increasing the number of times of scans, the scan intervals are gradually increased toward a record scan corresponding to the execution timing of pre-ejection according to the table shown in FIG. 44, and the scan intervals after execution of pre-ejection are gradually decreased.

For example, as shown in FIG. 45, when pre-ejection is planned after completion of the 32nd scan (backward scan), a wait time of 0.1 sec is sequentially added to the basic scan time (0.7 sec) from the 28th scan, so that a total wait time of 0.4 sec is added to set the scan time of 1.1 sec in the 31st scan. Contrary to this, the wait time is gradually subtracted from the scan time by 0.1 sec from the 33rd scan, so as to restore the normal scan interval (0.7 sec) from the 37th scan. As described above, since the record scan intervals before and after the scan interval (1.2 sec) upon execution of pre-ejection are caused to gradually approach the target scan interval, any difference between adjacent image areas where the density difference-color tone difference is particularly conspicuous can be decreased. Therefore, an image free from such a problem can be formed.

Thus, the third and fourth embodiments pertain to an ink jet recording apparatus which includes a scan interval management device for managing a scan interval. The scan interval is managed so that the difference between a relatively long scan interval and a relatively short scan interval relating to continuous record scans of a plural number of times of record scans for an image area by an image forming means falls within a predetermined time range. This is done by varying an interval between continuous record scans, so that the scan interval comprises a record scan time and the interval between continuous record scans, and during the interval a process other than a recording process, such as recovery or wiping, can be performed.

Note that various modifications of this embodiment are the same as those in the first embodiment, and a detailed description thereof will be omitted.

FIG. 46 shows visual discrimination results of a density difference when adjacent image areas are subjected to back-and-forth recording in various combinations of scan interval time differences, i.e., time differences between checker and reverse checker print operations on the image areas upon monochrome recording. In FIG. 46, the discrimination results are expressed by the same estimation criterions as those in FIG. 44, and so it shows estimation of monochrome back-and-forth scan interval density unevenness. Therefore, the record scan timing correction in the above embodiment can be relatively simplified. For example, correction upon execution of the pre-ejection may be omitted. More specifically, different back-and-forth scan interval management methods may be selected in correspondence with the color recording mode and the monochrome recording mode, respectively.

In this embodiment, the ink jet recording apparatus having the image memory for one A4-size page has been exemplified. When the capacity of the image memory is smaller than one A4-size page, the record scan intervals may be set for each recording image area according to the capacity of the image memory, and thereafter, the print operation may be sequentially executed. In this case, the recovery timings are set by accumulating information associated with recovery processing, and the same record scan as that in the wiping mode is executed at the final line of the recording image area according to the capacity of the image memory, thereby eliminating scan interval density unevenness caused by the data transfer wait time or the image processing time.

As described above, in this embodiment, color image recording can be satisfactorily realized without causing regular color shading, which tends to occur upon printing of a solid image in mixed color, in such a manner that different color inks are printed at proper overlapping and adjacent positions, and back-and-forth scan interval management is executed, while utilizing the feature of the L/n paper feed print method, which can eliminate density unevenness caused by landing precision (e.g., a variation in nozzle positions) and the ejection quantity. Therefore, image quality can be improved while minimizing a decrease in recording speed as much as possible.

(Fifth Embodiment)

A recording method according to the fifth embodiment of the present invention will be described below. Like in the second embodiment shown in FIGS. 23 to 29, In this method, a recording section (L) of each recording head is divided into four sections. Each recording head records recording pixels thinned out to 25% in the first scan, and thereafter, a recording sheet is fed by an L/4 width. In the second scan, each recording head prints another 25% recording pixels using different nozzles, and the recording sheet is fed by another L/4 width. In the third scan, each recording head prints still another 25% recording pixels, and the recording sheet is fed by another L/4 width. In the fourth scan, each recording head prints the remaining 25% recording pixels, thus completing the print operation. As indicated by the head scan direction (b) in FIGS. 23 to 29, back-and-forth recording in which the recording direction is reversed in units of scans is performed. More specifically, in FIGS. 25, 27, and 28, recording is performed by a head scan in a direction opposite to the direction (a).

In FIG. 29, paying attention to the dot formation state on the first to third image areas on which recording has already been completed, dots are formed on recording pixels, where pixels of original image data are adjacent to each other, in four different forward or backward record scans. For this reason, any color tone difference caused by the back-and-forth scans can be uniformed from a macroscopic viewpoint. In addition, even when the above-mentioned recovery processing is performed in at least one of the four record scans, the degree of density difference-color tone difference caused by a difference in scan interval becomes about half that in the fourth embodiment. As compared to the above embodiment, since recording pixel arrays in the scan direction are recorded by four different nozzles, density unevenness caused by nozzles and stripe patterns caused by the paper feed operation can be further eliminated, and higher image quality can be obtained. In this embodiment, since the ink ejection quantity per scan is suppressed as compared to the fourth embodiment, a problem associated with the ink ejection quantity such as boundary blurring can also be eliminated.

As for scan interval density unevenness, the scan interval upon execution of pre-ejection in this embodiment does not seriously influence the density difference•color tone difference in consideration of the above situation. For this reason, in this embodiment, the record scan timing is corrected as in the above embodiment only when wiping is executed. Since the setting operation of record scan timings is simplified, the record scan timings can be easily corrected even if recovery processing timings are not set in advance. For this reason, when wiping is required during recording, an image in an image area, associated with the wiping timing is completed before execution of the wiping, and recording for the next image area is started after the wiping is completed. For this reason, scan interval density unevenness can be suppressed even when an image data memory has a small capacity.

However, since this embodiment executes the four-divisional print operation, a relatively complicated record scan is required so as to complete an image before wiping unlike in the above embodiment. This control will be described below with reference to FIGS. 30 to 39 like in the second embodiment. FIG. 30 shows a normal record scan (backward scan) state in the 96th scan. When a long scan interval is required since, for example, wiping is required upon completion of the 96th scan, or since no image data is transferred, record scans shown in FIGS. 31 to 38 are executed. Note that FIG. 39 shows a normal recording state in the 97th scan (forward scan), and the head scan direction is indicated by (b).

As shown in FIG. 31, in the 97th record scan for partially completing recording, after the predetermined paper feed operation (L/4 width), the recording operation is performed by the forward scan on image areas before the 96th image area, for which areas recording has already been started. Similarly, in the 98th record scan shown in FIG. 32, after the predetermined paper feed operation (L/4 width), the recording operation is performed by the backward scan on the 96th and 95th image areas using the recording sections (3) and (4). In the 99th scan, the recording operation is performed by the forward scan on the 96th image area using only the recording section (3), as shown in FIG. 33, without executing the paper feed operation. Therefore, since the 96th image area is subjected to recording using the same recording section twice in the four-divided record scans, the effect of nozzle unevenness reduction is relatively impaired but is satisfactory as compared to the two-divisional recording in the above embodiment. Thus, no problem is posed in a practical use.

In this manner, after the image on the 96th image area is completed, the recording heads return to the home position, and wiping or data waiting processing for a long period of time is executed. After execution of the wiping or necessary data is input, the record scan is restarted. FIG. 34 shows a recording state in the 100th record scan after the record scan is restarted. Since no paper feed operation is performed, the recording operation is performed by the forward scan on the 97th image area using the recording section (2). Subsequently, the 101st scan is executed to perform recording on the 97th and 98th image areas by the backward scan, as shown in FIG. 35, while adjusting the scan interval timing without executing the paper feed operation. Thereafter, the predetermined paper feed operation (L/4 width) is performed, and recording is performed by the forward scan using recording sections (1) to (3), as shown in FIG. 36. Thereafter, as shown in FIGS. 37 and 38, the normal record scan, i.e., the 103rd scan (backward scan) and 104th scan (forward scan) are sequentially executed.

In this manner, according to this embodiment, scan interval density unevenness can be efficiently prevented although the number of times of scans is relatively large, and an image is relatively deteriorated since a portion where the scan interval is prolonged is recorded using the same recording section. In addition, since the ink ejection quantity per scan is decreased as compared to the first embodiment, boundary blurring is further difficult to occur, and generation of scan interval density unevenness itself caused by absorption•evaporation characteristics of the ink is suppressed. For this reason, sufficiently high-quality recording can be realized even though the scan interval management means is simplified.

(Sixth Embodiment)

This embodiment comprises a scan interval timer as a scan interval management means for limiting variations of scan intervals of a plurality of number of times of record scans for a single image area to fall within a predetermined time range like in the third embodiment. Using this timer, a record scan at a scan interval below the lower limit of the predetermined time range is inhibited in such a manner that the control stands by until the interval falls within the predetermined time range. When the scan interval exceeds the upper limit of the predetermined time range, the record scan is executed for only image areas on which image formation can be completed, and after the image is completed, data waiting processing or recovery processing is executed.

Since the back-and-forth scan interval management means of this embodiment uses the scan interval timer like in the third embodiment, the control flow is the same as that shown in FIG. 40, and a detailed description thereof will be omitted. According to this embodiment, since the scan interval timer is used, even when the data transfer time from the host apparatus or the image processing time is long, scan interval management for suppressing scan interval density unevenness can be realized by a simple arrangement. As has been described in the above embodiments, since the degree of scan interval density unevenness varies depending on the color or monochrome recording mode, the two- or four-divisional print mode, the type of recording sheet, and the like, the setting time of the scan interval timer may be changed according to these conditions.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure wave of the thermal energy is formed corresponding to the ejection portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

As has been described above, according to the present invention, satisfactory image recording free from scan interval density unevenness in thin-out multi-pass recording, density unevenness caused by landing precision (e.g., a variation in nozzle position) and the ejection quantity of the recording head, and regular color shading caused by the ink ejection order can be realized. When back-and-forth record scans are executed, the recording speed can be prevented from being considerably decreased.

What is claimed is:

1. An ink jet recording apparatus for performing recording by ejecting an ink onto a recording medium using a recording head having a plurality of ink ejection portions, comprising:

image forming means for completing image formation on the recording medium by performing a plurality of number of times of record scans of the recording head for an image area; and scan interval management means for managing a scan interval so that a difference between scan intervals relating to continuous record scans of the plurality of number of times of record scans for the image area by said image forming means falls within a predetermined time range, wherein said scan interval comprises a record scan time and an interval between said continuous record scans, and wherein during an interval a process other than a recording process can be performed, wherein said scan intervals, which correspond to said record scans respectively, include a relatively long scan interval and relatively shorter scan intervals, and said scan interval management means varies the intervals between continuous record scans so that the relatively short scan intervals before and after the relatively longer scan intervals are caused to gradually approach the relatively longer interval.

2. An apparatus according to claim 1, wherein said scan interval management means sets in advance a record scan timing including a paper feed time and a recovery processing time of said recording head for each of said record scans.

3. An apparatus according to claim 2, wherein said scan interval management means comprises an image memory for all of said image areas to be subjected to image formation.

4. An ink jet recording apparatus for performing recording by electing an ink onto a recording medium using a recording head having a plurality of ink election portions, comprising:

image forming means for completing image formation on the recording medium by performing a plurality of number of times of record scans of the recording head for an image area; and scan interval management means for managing a scan interval so that a difference between scan intervals relating to continuous record scans of the plurality of number of times of record scans for the image area by said image forming means falls within a predetermined time range, said scan interval management means comprising a scan interval timer, and when a given said scan interval becomes shorter than a lower limit of the predetermined time range, a corresponding said record scan is caused to wait, and when said given scan interval becomes longer than an upper limit of the predetermined range, a corresponding said record scan is performed for only a particular image area whose image formation can be completed so as to complete an image and thereafter a further said record scan is caused to wait, wherein said scan interval comprises a record scan time and an interval between said continuous record scans, and wherein during an interval a process other than a recording process can be performed, and wherein said scan intervals, which correspond to said record scans respectively, include a relatively long scan interval and relatively shorter scan intervals, and said scan interval management means varies the intervals between continuous record scans so that the relatively short scan intervals before and after the relatively longer scan intervals are caused to gradually approach the relatively longer interval.

5. An ink let recording apparatus for performing recording by electing an ink onto a recording medium using a recording head having a plurality of ink election portions, comprising:

image forming means for completing image formation on the recording medium by performing a plurality of number of times of record scans of the recording head for an image area; and scan interval management means for managing a scan interval so that a difference between scan intervals relating to continuous record scans of the plurality of number of times of record scans for the image area by said image forming means falls within a predetermined time range, wherein said scan interval comprises a record scan time and an interval between said continuous record scans, and wherein during an interval a process other than a recording process can be performed, wherein said scan intervals, which correspond to said record scans respectively, include a relatively long scan interval and relatively shorter scan intervals, and said scan interval management means varies the intervals between continuous record scans so that the relatively short scan intervals before and after the relatively longer scan intervals are caused to gradually approach the relatively longer interval, and wherein said scan interval management means predicts a predicted record scan interval including a recovery processing time of said recording head, and when the predicted record scan interval is larger than an upper limit of the predetermined time range, a given record scan is performed for only a particular image area whose image formation can be completed so as to complete an image and thereafter, recovery processing of said recording head is performed.

6. An apparatus according to claim 1, wherein said image forming means complementarily sets substantially a same number of landing dots, which are recorded on said single image area in different said record scans.

7. An apparatus according to claim 1, wherein said image forming means performs recording on said single image area using different said divided sections of said recording head in different record scans.

8. An apparatus according to claim 1, wherein said image forming means performs said record scans in only one direction.

9. An apparatus according to claim 1, wherein said image forming means performs said record scans in two, bilateral directions.

10. An apparatus according to claim 1, wherein said recording head sequentially ejects different color inks.

11. An apparatus according to claim 1, wherein said recording head causes a change in state in an ink by heat, and ejects the ink from said ejection portions on the basis of the change in state.

12. An ink jet recording method for performing recording by ejecting an ink onto a recording medium using a recording head having a plurality of ink ejection portions, comprising the steps of:

performing first recording on an image area corresponding to each of a plurality of divided sections obtained by dividing a recording section of said recording head;

causing said recording head to wait for a predetermined period of time after the first recording step;

performing second recording on said image area by scanning said recording head after the waiting step, the recording in the second recording step complementing the recording in the first recording step; and repeating the second recording step and the waiting step to complete an image on said image area;

wherein the waiting step includes the step of causing said recording head to wait for the predetermined period of time, so that a difference between a relatively lone scan interval and a relatively short interval relating to continuous recording steps of the recording steps for said image area falls within a predetermined time ranges, wherein said scan interval comprises a record scan time and an interval between said continuous record scans, and wherein during an interval a process other than a recording process can be performed.

13. A method according to claim 12, wherein each of the recording steps includes the step of performing recording on said image area using different recording sections of said recording head in different record scans.

14. A method according to claim 12, wherein each of the recording steps includes the step of performing a record scan in only one direction.

15. A method according to claim 12, wherein each of the recording steps includes the step of performing a record scan in a direction opposite to that in the immediately preceding recording step to achieve bilateral recording.

16. A method according to claim 12, wherein said recording head sequentially ejects different color inks.

17. A method according to claim 12, wherein said recording head causes a change in state in an ink by heat, and ejects the ink from said ejection portions on the basis of the change in state.

18. An ink jet recording apparatus comprising:
a recording head for ejecting an ink from a plurality of ink ejection portions upon a record scan;
image forming means for completing image formation on an image area corresponding to a recording section of said recording head by executing a plurality of number of times of record scans of said recording head using a plurality of complementary thin-out patterns, said image forming means having a variation in scan intervals; and
scan interval management means for varying an interval between continuous said record scans of said recording head, said scan interval management means managing a scan interval so that a difference between a relatively long scan interval and a relatively short scan interval relating to said continuous record scans of the plurality of number of times of record scans for the image area by said image forming means to fall within a predetermined time range,
wherein said scan interval comprises a record scan time and an interval between said continuous record scans, and wherein during an interval a process other than a recording process can be performed.

19. An ink jet recording apparatus comprising:
a recording head having a plurality of ink ejection portions;
image forming means for completing image formation on image areas divided in correspondence with recording sections of said recording head by executing a plurality of number of times of record scans of said recording head using a plurality of complementary thin-out patterns, said image forming means having a variation in scan intervals; and
scan interval management means for varying an interval between continuous record scans of said recording head, said scan interval management means managing a scan interval so that a difference between a relatively long scan interval and a relatively short scan interval relating to said continuous record scans of the plurality of number of times of record scans for the image area by said image forming means to fall within a predetermined time range,
wherein said scan interval comprises a record scan time and an interval between said continuous record scans, and wherein during an interval a process other than a recording process can be performed.

20. An ink jet recording apparatus comprising:
a recording head, having a recording section (L), for ejecting an ink from a plurality of ink ejection portions;
image forming means for completing image formation on n image areas divided in correspondence with the recording section (L) of said recording head by executing recording in a plurality of number of times of record scans of said recording head using a plurality of complementary thin-out patterns, and sequentially executing a paper feed operation by an L/n width, said image forming means having a variation in scan intervals; and
scan interval management means for varying an interval between continuous said record scans of said recording head, said scan interval management means managing a scan interval so that a difference between a relatively long scan interval and a relatively short scan interval relating to said continuous record scans of the plurality of number of times of record scans for the image area by said image forming means to fall within a predetermined time range,
wherein said scan interval comprises a record scan time and an interval between said continuous record scans, and wherein during an interval a process other than a recording process can be performed.

21. An apparatus according to claim 20, wherein said scan interval management means comprises an image memory for an entire image area to be subjected to image formation, and sets in advance a record scan timing including at least a paper feed time and a recovery processing time of said recording head.

22. An ink jet recording apparatus comprising:
a recording head, having a recording section (L), for electing an ink from a plurality of ink election portions;
image forming means for completing image formation on n image areas divided in correspondence with the recording section (L) of said recording head by executing recording in a plurality of number of times of record scans of said recording head using a plurality of complementary thin-out patterns, and sequentially executing a paper feed operation by an L/n width, said image forming means having a variation in scan intervals; and
scan interval management means for varying an interval between continuous said record scans of said recording head, said scan interval management means managing a scan interval so that a difference between a relatively long said scan interval and a relatively short said scan interval relating to said continuous record scans of the plurality of number of times of record scans for the image area by said image forming means falls within a predetermined time range, said scan interval management means comprising a scan interval timer, and when a given said scan interval becomes shorter than a lower limit of the predetermined time range, a corresponding said record scan is caused to wait, and when said given scan interval becomes longer than an upper limit of the predetermined range, a corresponding said record scan is performed for only an image area whose image formation can be completed so as to complete an image, and thereafter, a further said record scan is caused to wait,
wherein said scan interval comprises a record scan time and an interval between said continuous record scans, and wherein during an interval a process other than a recording process can be performed.

23. An ink jet recording apparatus comprising:
a recording head, having a recording section (L), for electing an ink from a plurality of ink election portions;
image forming means for completing image formation on n image areas divided in correspondence with the recording section (L) of said recording head by executing recording in a plurality of number of times of record scans of said recording head using a plurality of complementary thin-out patterns, and sequentially executing a paper feed operation by an L/n width, said image forming means having a variation in scan intervals; and scan interval management means for varying an interval between continuous said record scans of said recording head, said scan interval management means managing a scan interval so that a difference between a relatively long said scan interval and a relatively short said scan interval relating to said continuous record scans of the plurality of number of times of record scans for the image area by said image forming means falls within a predetermined time range, wherein said scan interval comprises a record scan time and an interval between said continuous record scans, and wherein during an interval a process other than a recording process can be performed, and wherein said scan interval management means predicts a record scan interval including at least a recovery processing time of said recording head, and when the predicted record scan interval is larger than an upper limit of the predetermined time range, a corresponding said record scan is preferentially performed for only an image area whose image formation can be completed so as to complete an image, and thereafter, recovery processing of said recording head is performed.

24. An apparatus according to claim 20, wherein said image forming means sets substantially a same numbers of landing dots, which are recorded on a single image area in different record scans.

25. An apparatus according to claim 20, wherein said recording head sequentially ejects different color inks.

26. An apparatus according to claim 20, wherein said image forming means performs said record scans in only one direction.

27. An apparatus according to claim 20, wherein said image forming means performs said record scans in two, bilateral directions.

28. An apparatus according to claim 20, wherein said recording head causes a change in state in an ink by heat, and ejects the ink from said ejection portions on the basis of the change in state.

29. An ink jet recording apparatus for performing recording using a recording head having a plurality of ink ejection portions, comprising:

image forming means for completing image formation by complementarily performing a plurality of number of times a record scan for an image area, said image area corresponding to each of a plurality of sections obtained by dividing a recording section of said recording head; and scan interval management means for controlling a scan interval between adjacent said record scans of said recording head, said scan interval management means managing a scan interval so that a difference between a relatively long and a relatively short scan interval relating to continuous record scans of the plurality of number of times of said record scans for the single image area by said image forming means falls within a predetermined time range, said scan interval management means comprising a scan interval timer such that when a given said scan interval becomes shorter than a lower limit of the predetermined time range, a corresponding said record scan is caused to wait, and when said given scan interval becomes longer than an upper limit of the predetermined range, a particular said record scan is performed for only an image area whose image formation can be completed so as to complete an image, and thereafter a further said record scan is caused to wait, wherein said scan interval comprises a record scan time and an interval between said continuous record scans, and wherein during an interval a process other than a recording process can be performed.

30. An ink jet recording apparatus for performing recording using a recording head having a plurality of ink ejection portions, comprising:

image forming means for completing image formation by complementarily performing a plurality of number of times of record scans for an image area, said image area corresponding to each of a plurality of sections obtained by dividing a recording section of said recording head; and scan interval management means for controlling an interval between adjacent said record scans of said recording head, said scan interval management means controlling scan intervals, so that a difference in scan intervals between said scan intervals of continuous said record scans of the plurality of number of times of said record scans for a the image area by said image forming means falls within a predetermined time range, wherein said scan interval management means predicts a predicted record scan interval including a recovery processing time of said recording head, and when the predicted record scan interval is larger than an upper limit of the predetermined time range, a corresponding record scan is preferentially performed for only an image area whose image formation can be completed so as to complete an image, and thereafter, recovery processing of said recording head is performed.

31. An ink jet recording apparatus comprising:

a recording head, having a recording section (L), for ejecting an ink from a plurality of ink ejection portions;

image forming means for completing image formation on n image areas divided in correspondence with the recording section (L) of said recording head by executing recording in a plurality of number of times of record scans of said recording head using a plurality of complementary thin-out patterns, and sequentially executing a paper feed operation by an L/n width; and scan interval management means for limiting a variation in said scan intervals of the plurality of number of times of said record scans for the image area by said image forming means so as to fall within a predetermined time range, said scan interval management means comprising a scan interval timer, when a scan interval becomes shorter than a lower limit of the predetermined time range, a corresponding record scan is caused to wait, and when a scan interval becomes longer than an upper limit of the predetermined range, a record scan is performed for only an image area whose image formation can be completed so as to complete an image, and thereafter, a further record scan is caused to wait.

32. An ink jet recording apparatus comprising:

a recording head, having a recording section (L), for ejecting an ink from a plurality of ink ejection portions;

image forming means for completing image formation on n image areas divided in correspondence with the recording section (L) of said recording head by executing recording in a plurality of number of times of record scans of said recording head using a plurality of complementary thin-out patterns, and sequentially executing a paper feed operation by an L/n width; and scan interval management means for managing a scan interval so that a difference between a relatively long scan interval and a relatively short scan interval relating to continuous record scans of the plurality of number of times of record scans for the image area by said image forming means to fall within a predetermined time range, wherein said scan interval management means predicts a record scan interval including at least a recovery processing time of said recording head, and when the predicted record scan interval is larger than an upper limit of the predetermined time range, a given record scan is performed for only a particular image area whose image formation can be completed so as to complete an image, and thereafter, recovery processing of said recording head is performed, wherein said scan interval comprises a record scan time and an interval between said continuous record scans, and wherein during an interval a process other than a recording process can be performed.

33. An ink jet recording apparatus according to claim 1, wherein images are formed onto the recording medium complementarily by a plurality of record scans.

34. An ink jet recording apparatus according to claim 33, wherein images are complementarily formed onto said recording medium by mutually different ink ejection portions.

35. An ink jet recording apparatus for performing recording by ejecting ink onto a recording medium using a recording head having a plurality of ink ejection portions, comprising:

image forming means for completing image formation on the recording medium by performing a plurality of number of times of record scans of the recording head for an image area; and scan interval management means for managing a scan interval so that a difference between a relatively long scan interval and a relatively short scan interval relating to continuous record scans of the plurality of number of times of record scans for the image area by said image forming means falls within a predetermined time range by varying an interval between continuous record scans, wherein said scan interval comprises a record scan time and an interval between said continuous record scans, and wherein during an interval a process other than a recording process can be performed.

36. An ink jet recording method for reducing variations in density between divisional recorded areas recorded by ejecting an ink onto a recording medium using a recording head having a plurality of ink ejection portions, comprising the steps of:

completing image formation on the recording medium by performing a plurality of number of times of record scans of the recording head for an image area; and managing a scan interval so that a difference between said scan intervals relating to continuous record scans of the plurality of number of times of record scans for the image are in said completing image formation step falls within a predetermined time range, wherein said scan interval comprises a record scan time and an interval between continuous record scans, and during the interval a process other than a recording process can be performed, wherein said scan intervals, which correspond to said record scans respectively, include a relatively long scan interval and relatively shorter scan intervals, and said scan interval management means varies the intervals between continuous record scans so that the relatively short scan intervals before and after the relatively longer scan intervals are caused to gradually approach the relatively longer interval.

* * * * *

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

It is certified that error appears in the above-identified patent and that said Letters Patent is hereby corrected as shown below:

COLUMN 9

Line 27, "be 25" should read --be--.

COLUMN 13

Line 7, "criterions" should read --criteria--; and
Line 66, "the" (first occurrence) should be deleted.

COLUMN 21

Line 63, "criterions" should read --criteria--.

COLUMN 25

Line 52, "a" (first occurrence) should be deleted.

COLUMN 26

Line 2, "is" (first occurrence) should read --in--.

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

It is certified that error appears in the above-identified patent and that said Letters Patent is hereby corrected as shown below:

COLUMN 26

Line 61, "relatively long" should be deleted;
Line 62, "interval and relatively shorter" should read --interval of a predetermined time and a plurality of-- and "intervals, and" should read --intervals which are shorter than the scan interval of the predetermined time, and--;
Line 64, "relatively" should be deleted;
Line 65, "short" should be deleted and "intervals before and after the relatively" should read --intervals may be gradually increased toward the scan interval of the predetermined time before execution of a record scan corresponding to the scan interval of the predetermined time and may be gradually decreased after execution of the record scan corresponding to the scan interval of the predetermined time as the record scans proceed.--; and
Lines 66-67 should be deleted.

COLUMN 27

Line 7, "all" should read --a plurality--;
Line 10, "electing" should read --ejecting--;
Line 11, "election" should read --ejection--;
Line 38, "relatively long" should be deleted;

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

It is certified that error appears in the above-identified patent and that said Letters Patent is hereby corrected as shown below:

COLUMN 27 (Cont.)

Line 39, "interval and relatively shorter" should read --interval of a predetermined time and a plurality of-- and "intervals, and" should read --intervals which are shorter than the scan interval of the predetermined time, and--;
Line 41, "relatively" should be deleted;
Line 42, "short" should be deleted and "intervals before and after the relatively" should read --intervals may be gradually increased toward the scan interval of the predetermined time before execution of a record scan corresponding to the scan interval of the predetermined time and may be gradually decreased after execution of the record scan corresponding to the scan interval of the predetermined time as the record scans proceed.--;
Lines 43-44 should be deleted;
Line 45, "let" should read --jet--;
Line 46, "electing" should read --ejecting--;
Line 47, "election" should read --ejection--;
Line 65, "relatively long" should be deleted; and
Line 66, "interval and relatively shorter" should read --interval of a predetermined time and a plurality of-- and "intervals," should read --intervals which are shorter than the scan intervals of the predetermined time,--.

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

It is certified that error appears in the above-identified patent and that said Letters Patent is hereby corrected as shown below:

COLUMN 28

Line 1, "relatively" should be deleted;
Line 2, "short" should be deleted and "intervals before and after the relatively" should read --intervals may be gradually increased toward the scan interval of the predetermined time before execution of a record scan corresponding to the scan interval of the predetermined time and may be gradually decreased after execution of the record scan corresponding to the scan interval of the predetermined time as the record scans proceed.--;
Line 3 should be deleted;
Line 4, "the relatively longer interval, and" should read --and--;
Line 51, "time, so that a difference between a relatively lone scan" should read --time by varying an interval between continuous recording scans gradually, and optionally, at a predetermined rate, as said recording scans proceed,--; and
Lines 52-54 should be deleted.

COLUMN 29

Line 22, "interval so that a difference between a relatively" should read --interval by varying an interval between--;
Line 23 should be deleted;

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

Page 5 of 8

It is certified that error appears in the above-identified patent and that said Letters Patent is hereby corrected as shown below:

COLUMN 29 (Cont.)

Line 24, "relating to said continuous record scans of the plurality" should read --recording scans gradually, and optionally, at a predetermined rate, as said recording scans proceed,--;
Lines 25-27 should be deleted;
Line 46, "interval so that a difference between a relatively" should read --interval by varying an interval between--;
Line 47 should be deleted;
Line 48, "relating to said continuous record scans of the plurality" should read --recording scans gradually, and optionally, at a predetermined rate, as said recording scans proceed,--; and
Lines 49-51 should be deleted.

COLUMN 30

Line 4, "interval so that a difference between a relatively" should read --interval by varying an interval between--;
Line 5 should be deleted;
Line 6, "relating to said continuous record scans of the plurality" should read --recording scans gradually, and optionally, at a predetermined rate, as said recording scans proceed,--;
Lines 7-9 should be deleted;

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

It is certified that error appears in the above-identified patent and that said Letters Patent is hereby corrected as shown below:

COLUMN 30

Line 22, "electing" should read --ejecting-- and "election" should read --ejection--;
Line 35, "interval so that a difference between a relatively" should read --interval by varying an interval between--;
Line 36 should be deleted; and
Line 37, "interval relating to said continuous record scans of the" should read --recording scans gradually, and optionally, at a predetermined rate, as said recording scans proceed,--.

COLUMN 31

Line 4, "interval so that a difference between a relatively" should read --interval by varying an interval between--;
Line 5 should be deleted;
Line 6, "interval relating to said continuous record scans of the" should read --recording scans gradually, and optionally, at a predetermined rate, as said recording scans proceed,--;
Lines 7-9 should be deleted;
Line 23, "numbers" should read --number--;
Line 50, "interval so that a difference between" should read --interval by varying an interval between--;
Line 51 should be deleted;

UNITED STATES PATENT AND TRADEMARK OFFICE
CERTIFICATE OF CORRECTION

PATENT NO. : 5,841,451

DATED : November 24, 1998

INVENTORS : Hiromitsu Hirabayashi

It is certified that error appears in the above-identified patent and that said Letters Patent is hereby corrected as shown below:

COLUMN 31

Line 52, "relating to continuous record scans of the plurality of" should read --recording scans gradually, and optionally, at a predetermined rate, as said recording scans proceed,--;
   Lines 53-54 should be deleted; and
   Line 55, "predetermined time range," should be deleted.

COLUMN 32

Line 62, "interval so that a difference between a relatively long" should read --interval between--;
   Line 63 should be deleted;
   Line 64, "to continuous record scans of the plurality of number of" should read --between continuous recording scans gradually, and optionally, at a predetermined rate, as said recording scans proceed,--; and
   Lines 65-67 should be deleted.

COLUMN 33

Line 30, "interval so that a difference between a relatively long" should read --interval between--;
   Line 31 should be deleted;
   Line 32, "to continuous record scans of the plurality of number of" should read --between continuous recording scans gradually, and optionally, at a predetermined rate, as said recording scans proceed,--; and
   Line 33 should be deleted.

UNITED STATES PATENT AND TRADEMARK OFFICE
CERTIFICATE OF CORRECTION

PATENT NO. : 5,841,451
DATED : November 24, 1998
INVENTOR(S) : Hiromitsu Hirabayashi It is certified that error appears in the above-identified patent and that said Letters Patent is hereby corrected as shown below:

COLUMN 34

Lines 1-2 should be deleted;
Line 3, "scans," should be deleted;
Line 26, "relatively long" should be deleted;
Line 27, "interval and relatively shorter" should read
 --interval of a predetermined time and a plurality of--
 and "intervals, and" should read --intervals which are
 shorter than the scan interval of the predetermined time,
 and--;
Line 28, "relatively" should be deleted;
Line 29, "short" should be deleted and "intervals before
 and after the relatively" should read --intervals may be
 gradually increased toward the scan interval of the
 predetermined time before execution of a record scan
 corresponding to the scan interval of the predetermined
 time and may be gradually decreased after execution of the
 record scan corresponding to the scan interval of the
 predetermined time as the record scans proceed.--; and
Lines 30-31 should be deleted.

Signed and Sealed this

Twentieth Day of June, 2000

Attest:

Q. TODD DICKINSON

*Attesting Officer*            *Director of Patents and Trademarks*